(12) United States Patent
Keller

(10) Patent No.: US 12,446,712 B2
(45) Date of Patent: Oct. 21, 2025

(54) DISPLAY PANEL CONNECTING RODS

(71) Applicant: Jeffrey Steffen Keller, Logan, UT (US)

(72) Inventor: Jeffrey Steffen Keller, Logan, UT (US)

( * ) Notice: Subject to any disclaimer, the term of this patent is extended or adjusted under 35 U.S.C. 154(b) by 67 days.

(21) Appl. No.: 18/330,865

(22) Filed: Jun. 7, 2023

(65) Prior Publication Data
US 2023/0309717 A1 Oct. 5, 2023

Related U.S. Application Data

(63) Continuation of application No. 17/393,170, filed on Aug. 3, 2021, now Pat. No. 11,672,361, which is a continuation of application No. 16/522,023, filed on Jul. 25, 2019, now Pat. No. 11,089,885.

(51) Int. Cl.
*A47F 5/08* (2006.01)
*A47F 5/00* (2006.01)
*A47F 7/14* (2006.01)
*A47G 25/06* (2006.01)

(52) U.S. Cl.
CPC .......... *A47F 5/0846* (2013.01); *A47F 5/0853* (2013.01); *A47F 5/00* (2013.01); *A47F 5/08* (2013.01); *A47F 5/0876* (2013.01); *A47F 7/143* (2013.01); *A47G 25/06* (2013.01)

(58) Field of Classification Search
CPC ........ A47F 5/0846; A47F 5/0853; A47F 5/00; A47F 5/08; A47F 5/0876; A47F 7/14; A47G 24/06
See application file for complete search history.

(56) References Cited

U.S. PATENT DOCUMENTS

| | | | | |
|---|---|---|---|---|
| 4,308,961 | A | | 1/1982 | Kunch |
| 4,805,784 | A | * | 2/1989 | Solheim ................ A47F 5/0846 211/94.01 |
| 5,060,897 | A | * | 10/1991 | Thalenfeld ................ A47F 5/08 248/220.22 |
| 5,657,884 | A | * | 8/1997 | Zilincar, III .......... A47F 5/0815 211/86.01 |
| 5,678,794 | A | * | 10/1997 | Kump ................... A47F 5/0869 248/220.31 |
| 5,687,856 | A | | 11/1997 | Kendrena |
| 5,897,002 | A | | 4/1999 | Carlino |

(Continued)

OTHER PUBLICATIONS

Non-Final Office Action, U.S. Appl. No. 16/522,023, mailed on Jul. 17, 2020.

(Continued)

*Primary Examiner* — Monica E Millner
(74) *Attorney, Agent, or Firm* — Quarles & Brady LLP

(57) ABSTRACT

Embodiments include display panel connecting rod assemblies and display panel systems including display panel connecting rod assemblies. Alternative embodiments include methods of assembling a display panel system using connecting rod assemblies. Display panel connecting rod assemblies may include a central rod portion, a first terminal baseplate connected to a first end of the central rod portion, and a second terminal baseplate connected to a second end of the central rod portion, positioned away from the first end of the central rod portion. The first and second terminal baseplates are configured to engage with and support corresponding display panels, in some cases without the use of tools.

20 Claims, 45 Drawing Sheets

(56) References Cited

U.S. PATENT DOCUMENTS

| | | | |
|---|---|---|---|
| 5,906,283 A * | 5/1999 | Kump | A47F 1/128 312/71 |
| 6,006,463 A * | 12/1999 | Mueller | A47F 5/0869 40/658 |
| 6,134,846 A | 10/2000 | Lamb | |
| 6,289,618 B1 * | 9/2001 | Kump | A47F 5/0823 248/220.42 |
| 6,612,057 B2 * | 9/2003 | Shoemaker | G09F 7/18 40/608 |
| 6,763,957 B1 | 7/2004 | Mullerleile | |
| 7,228,977 B2 | 6/2007 | Perkins et al. | |
| 8,033,404 B2 | 10/2011 | Keller | |
| 9,182,076 B2 * | 11/2015 | Simon | F16M 11/2014 |
| 10,968,936 B2 * | 4/2021 | Boo | A47B 96/201 |
| 2003/0189019 A1 | 10/2003 | Campbell et al. | |
| 2003/0189020 A1 | 10/2003 | Secondino | |
| 2004/0124163 A1 | 7/2004 | Perkins et al. | |
| 2004/0149669 A1 | 8/2004 | Tomonari et al. | |
| 2005/0006539 A1 | 1/2005 | Fischer | |
| 2005/0029208 A1 | 2/2005 | Paiste et al. | |
| 2005/0247653 A1 | 11/2005 | Brooks | |
| 2008/0061018 A1 | 3/2008 | Keller | |
| 2012/0244920 A1 | 9/2012 | Lee | |
| 2021/0022527 A1 | 1/2021 | Keller | |
| 2021/0361082 A1 | 11/2021 | Keller | |

OTHER PUBLICATIONS

Final Office Action, U.S. Appl. No. 16/522,023, mailed on Jan. 11, 2021.
Notice of Allowance, U.S. Appl. No. 16/522,023, mailed on Apr. 20, 2021.
Non-Final Office Action, U.S. Appl. No. 17/393,170, mailed on Mar. 14, 2022.
Non-Final Office Action, U.S. Appl. No. 17/393,170, mailed on Jul. 7, 2022.
Final Office Action, U.S. Appl. No. 17/393,170, mailed on Oct. 21, 2022.
Notice of Allowance, U.S. Appl. No. 17/393,170, mailed on May 9, 2023.

* cited by examiner

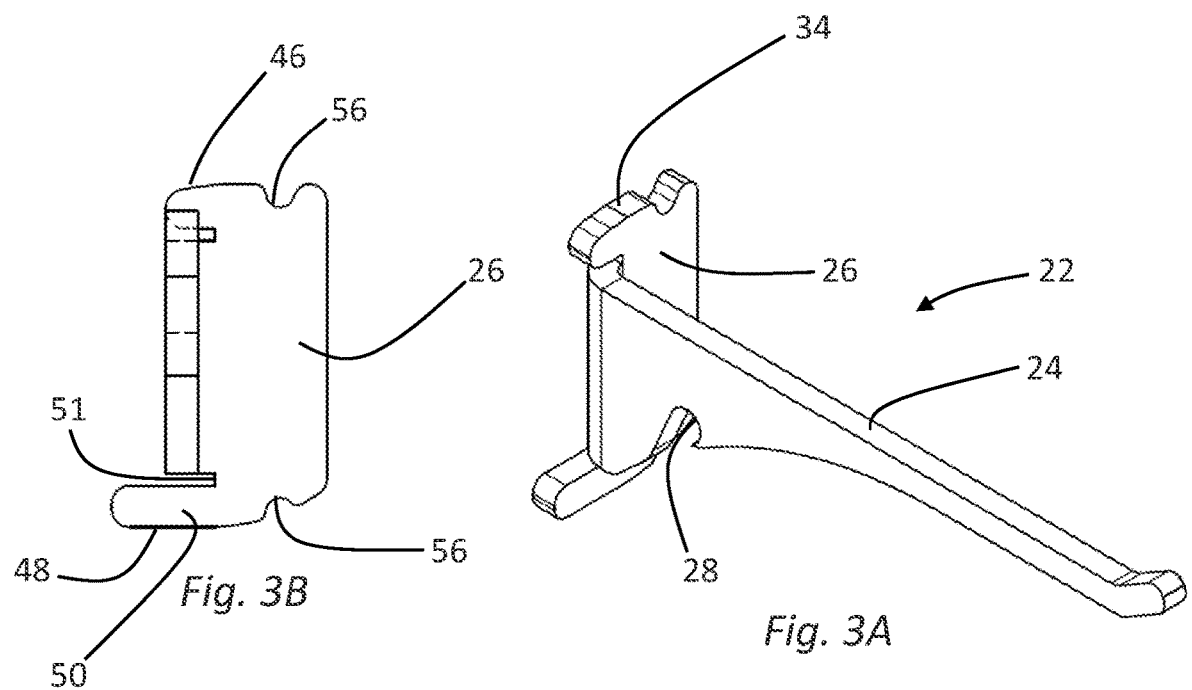
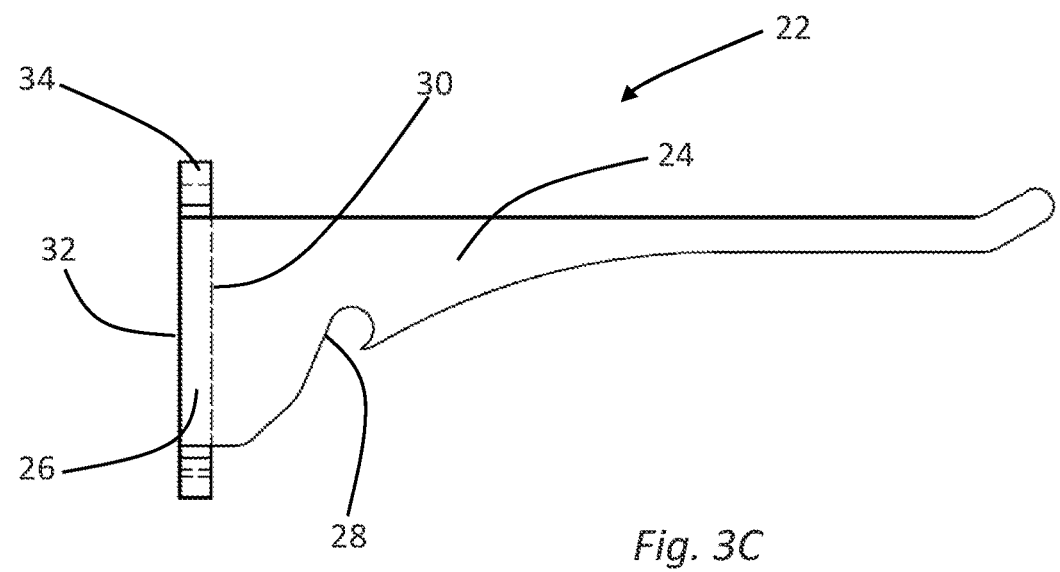

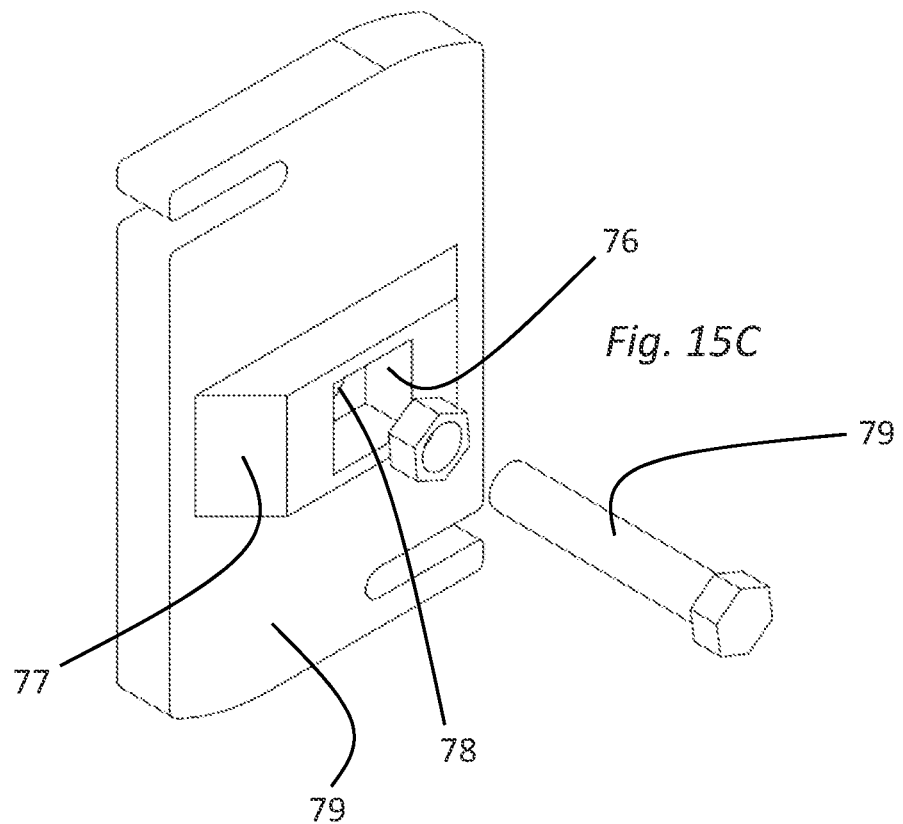
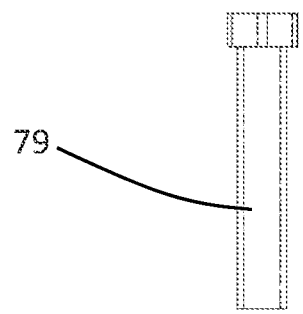
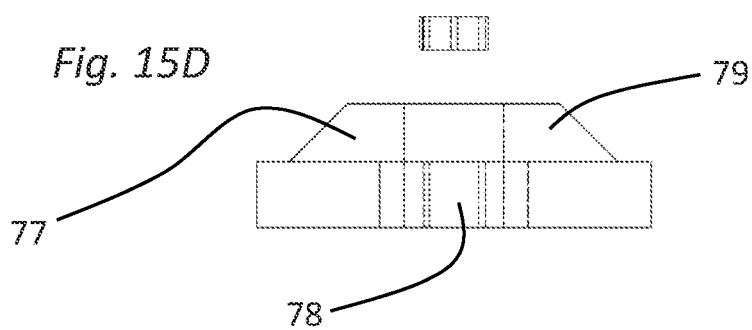

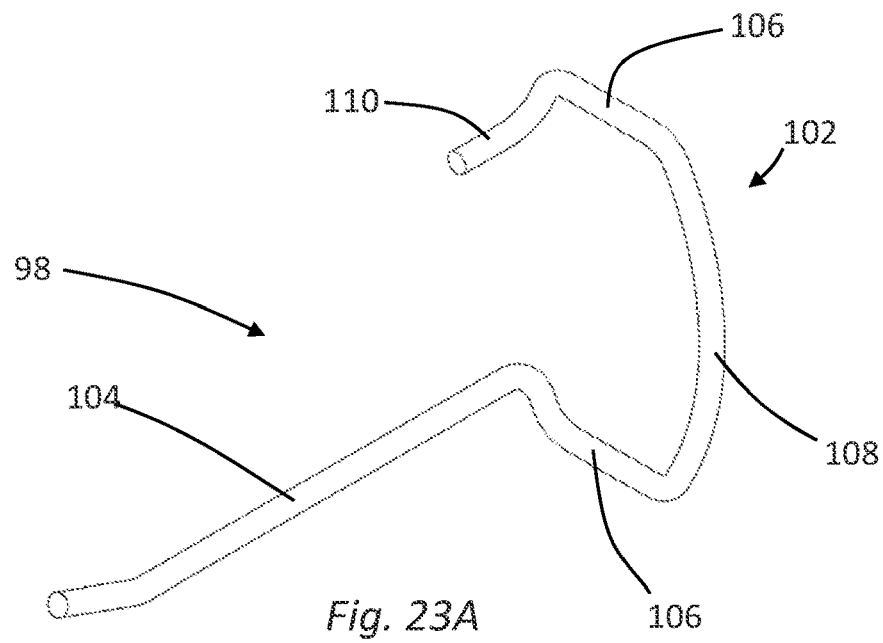
Fig. 23A
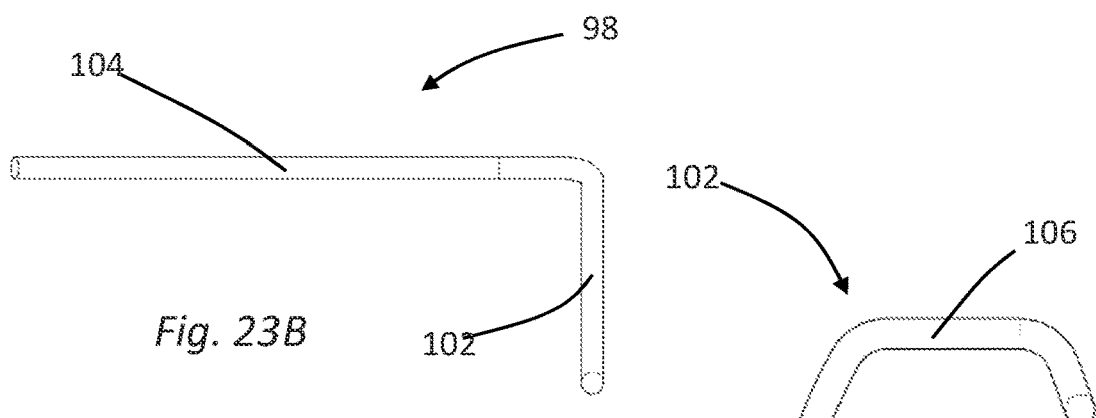
Fig. 23B
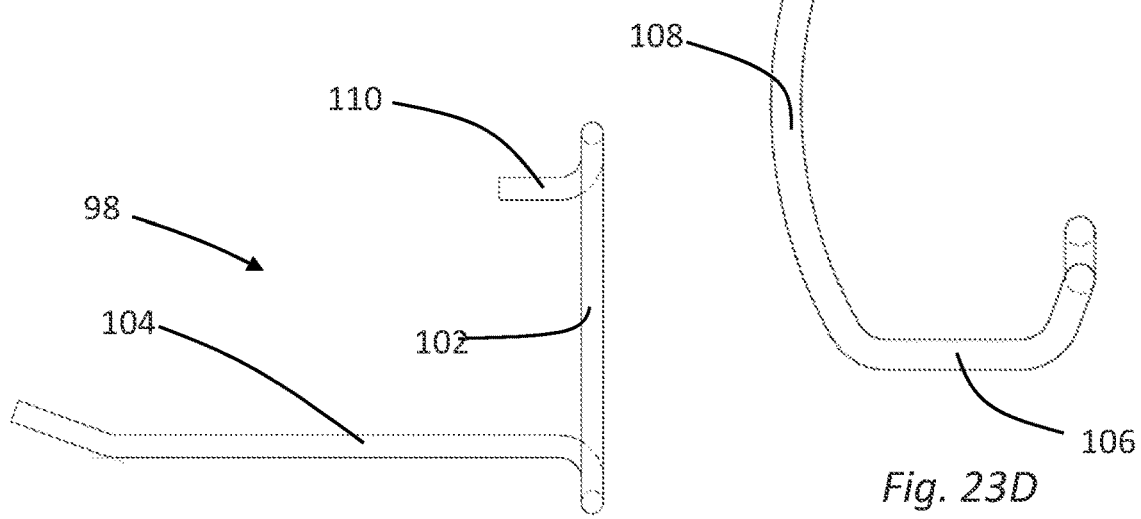
Fig. 23C
Fig. 23D

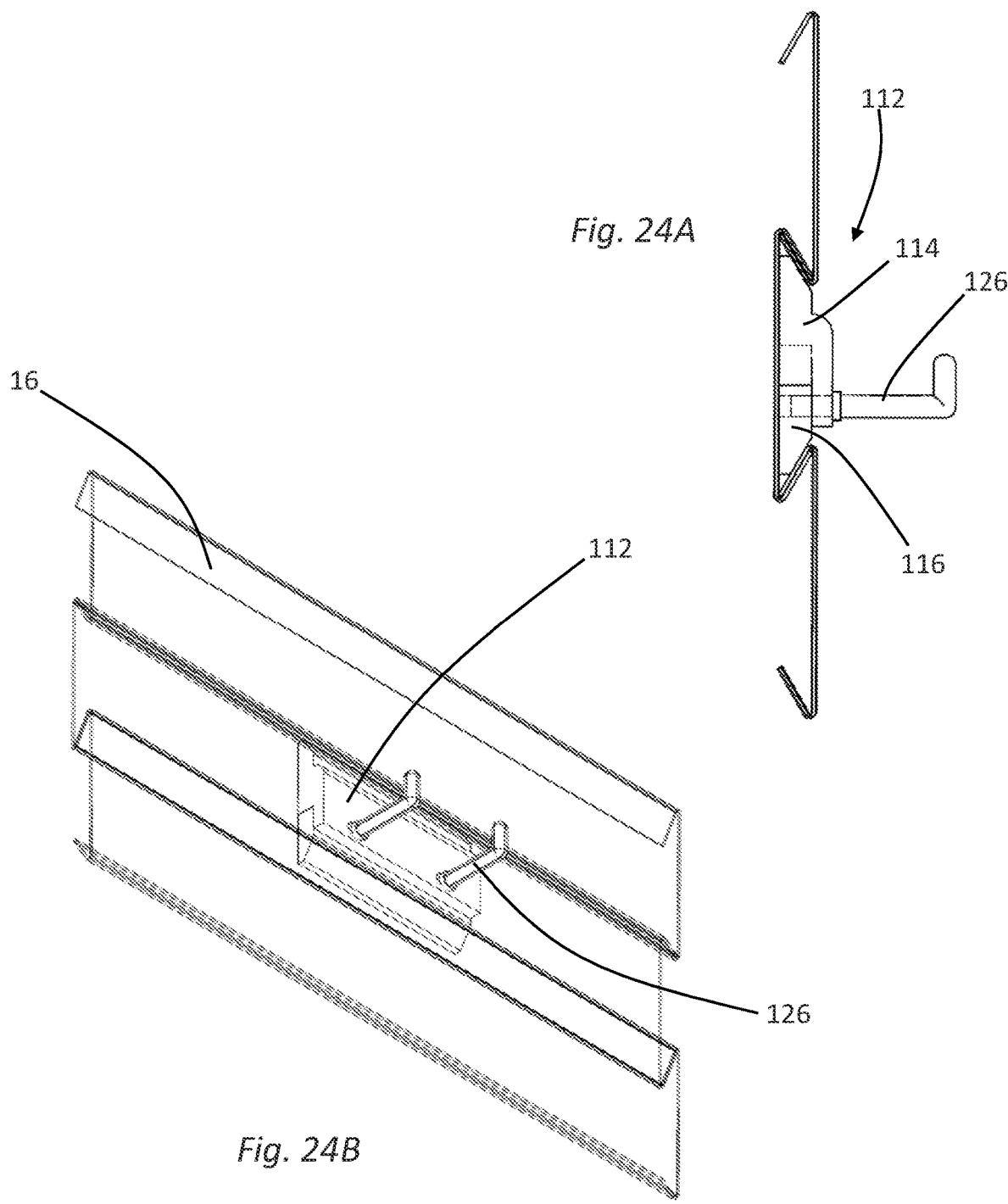

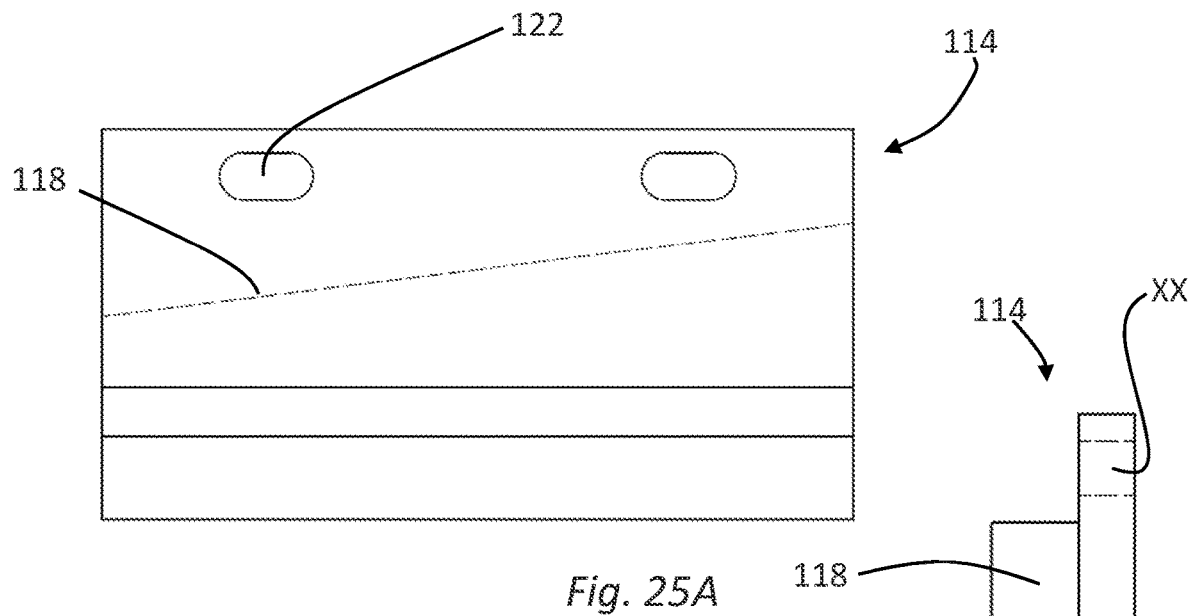
*Fig. 25A*
*Fig. 25B*
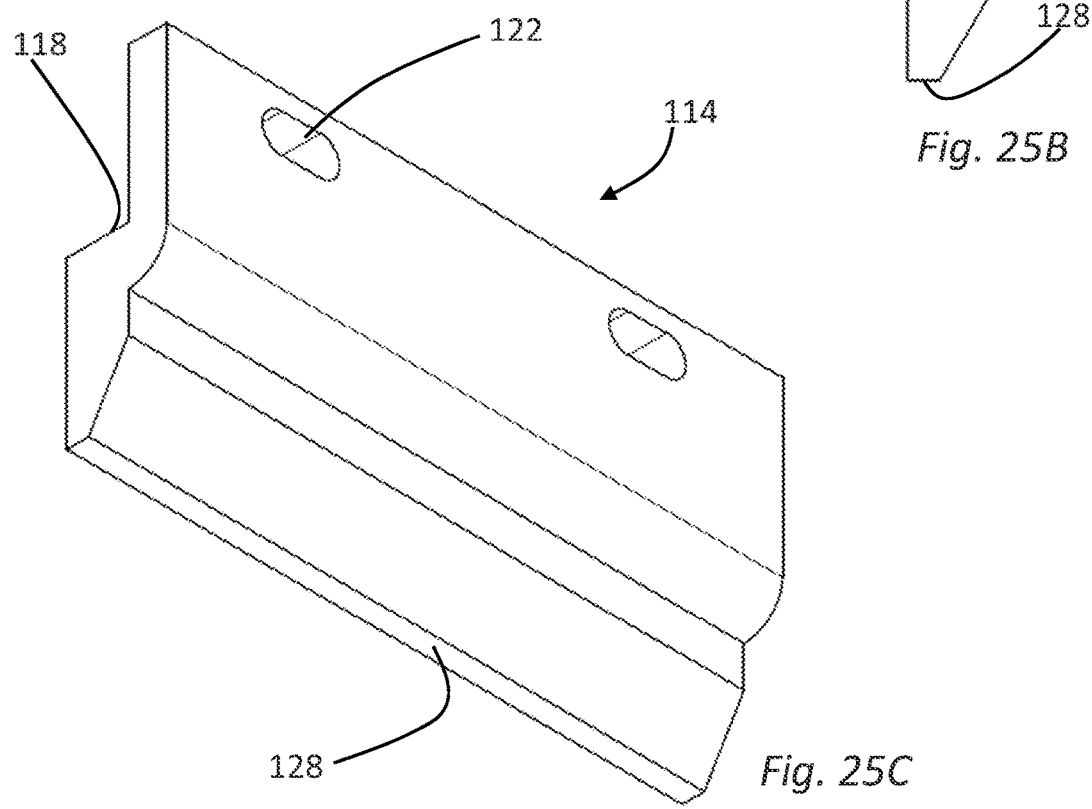
*Fig. 25C*

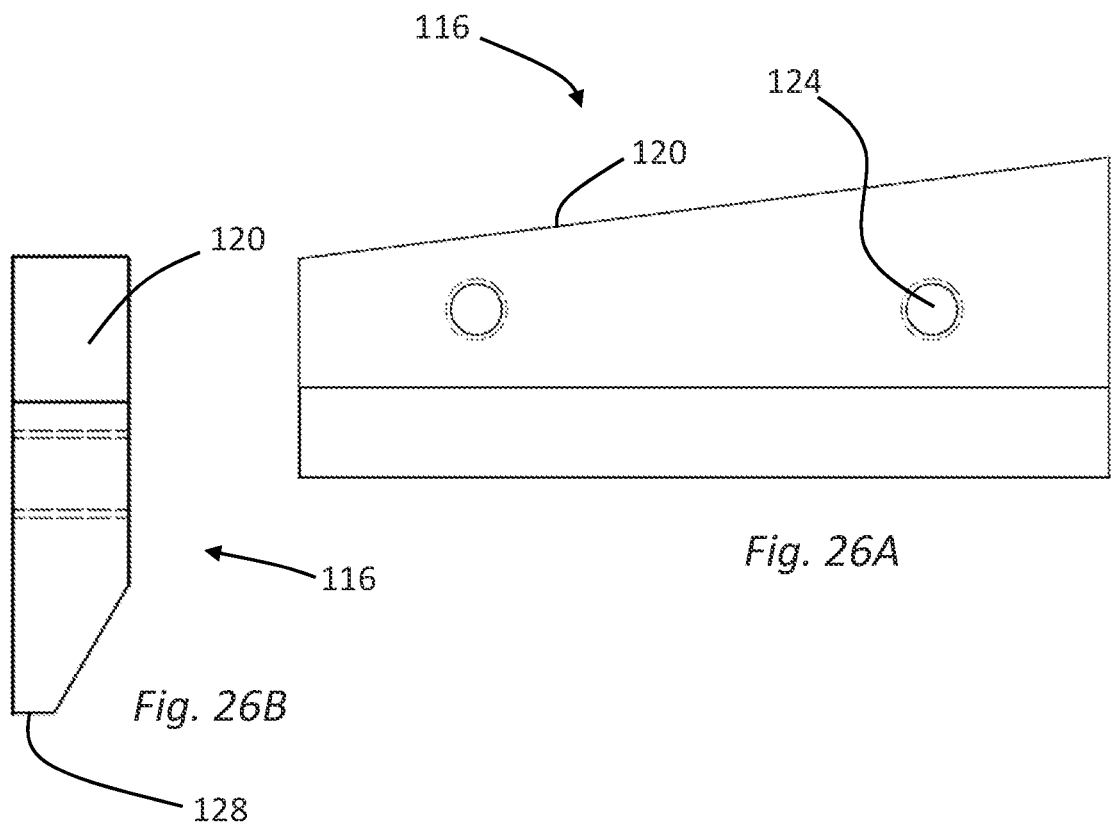
Fig. 26A
Fig. 26B
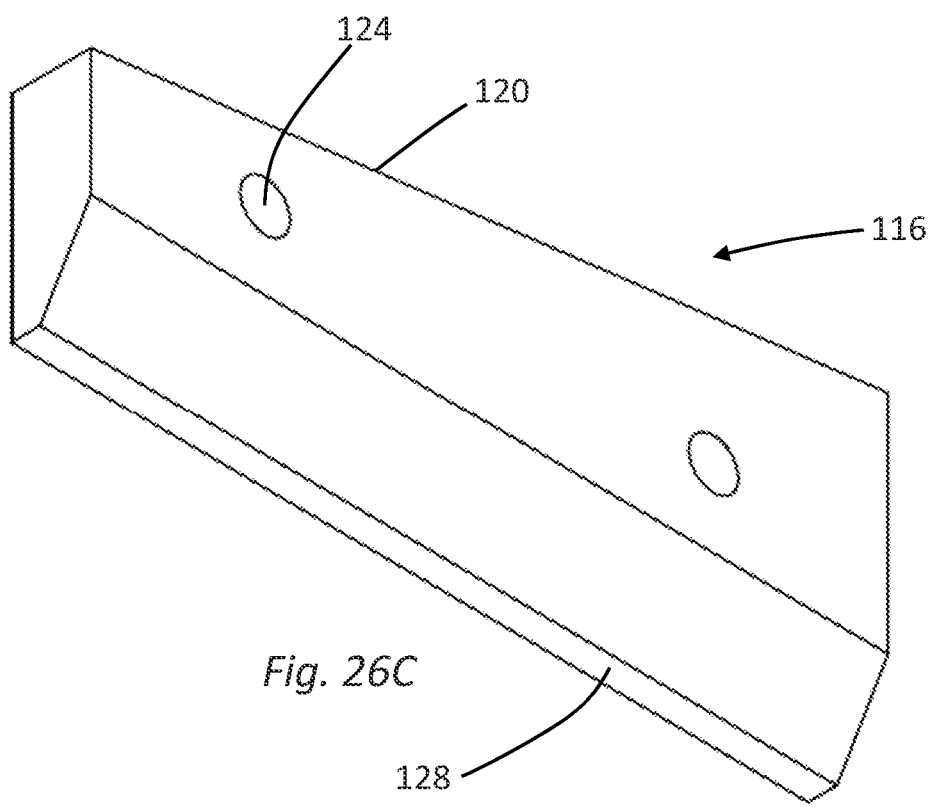
Fig. 26C

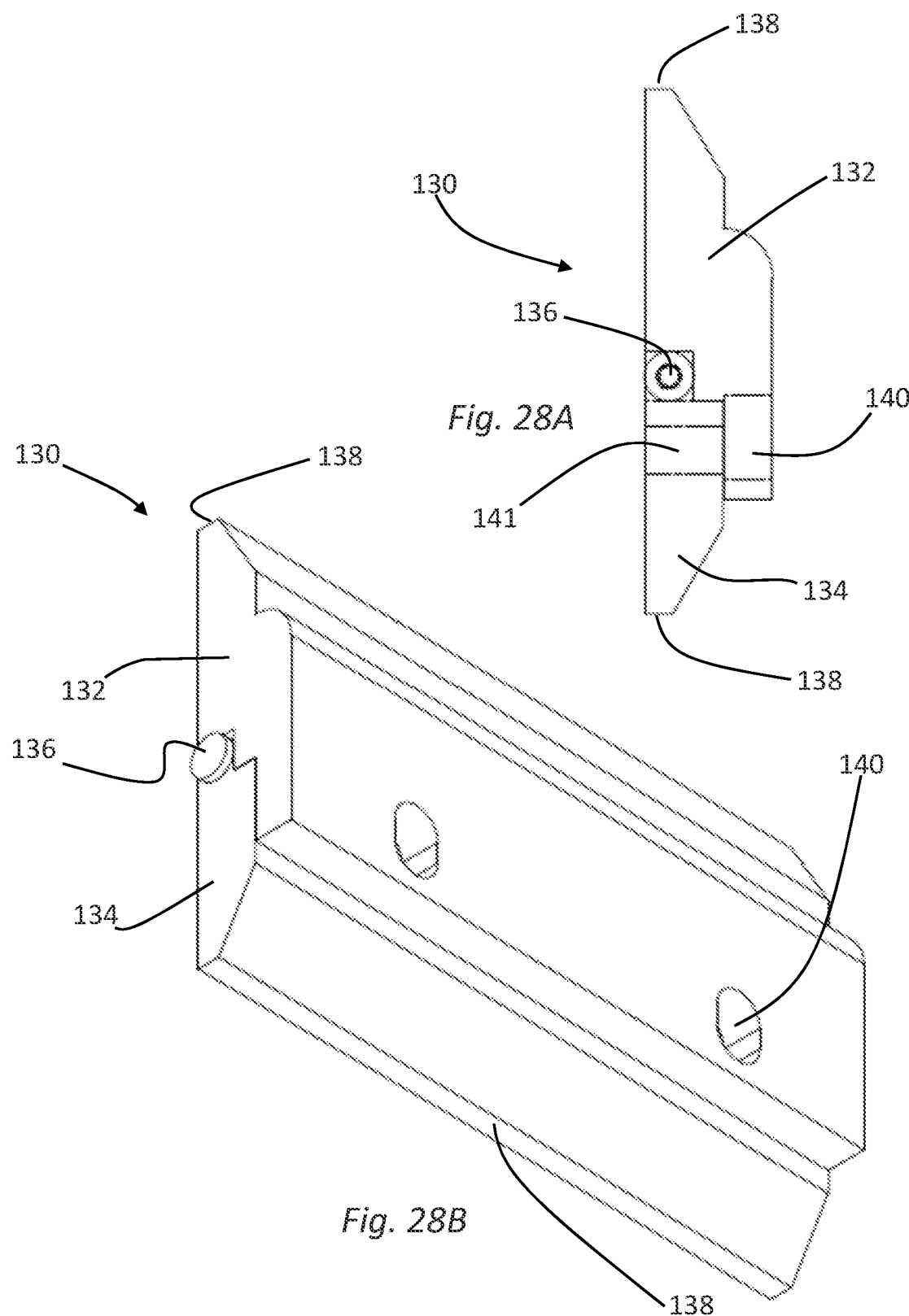

DISPLAY PANEL CONNECTING RODS

CROSS REFERENCE TO RELATED APPLICATION

This application is a continuation of U.S. application Ser. No. 17/393,170 titled "Display Panel Attachment Methods" filed on Aug. 3, 2021, issued as U.S. Pat. No. 11,672,361 on Jun. 13, 2023, which is a continuation of U.S. application Ser. No. 16/522,023 titled "Display Panel Attachments", filed on Jul. 25, 2019, and issued on Aug. 17, 2021, as U.S. Pat. No. 11,089,885, both of which applications are incorporated herein by reference in their entirety.

FIELD OF THE INVENTION

The present disclosure relates to systems, apparatus and methods of providing and using attachments to or with a display panel. The disclosure relates particularly to display panel attachments that provide structural support to the display panel, in addition to serving as attachment points for ancillary articles and/or attachments that are used as tools for assembling a display panel in addition to serving as attachment points to the display panel.

BACKGROUND

Retailers frequently use slatwall panels or similar structures to hold and display merchandise. Homeowners may use slatwall panels or individual slat systems to hold and store tools, equipment and the like. Similarly, warehouses, factories, other structures and commercial vehicles may be outfitted with slatwall panels or similar fixtures to hold, display, store, or organize objects of any sort. A conventional slatwall features panels which are fabricated from wood, metal or another suitable material that have T-slots or other openings milled or otherwise formed into a face of the slatwall. The slots formed in the slatwall are configured to receive display hooks, shelves or other supports. The slots and structures defining the slots are permanently formed into a conventional slatwall panel and therefore, are not movable with respect to other slots or other panel structures. Typical slatwall slots are integrated into the panel and cannot easily be repaired. The panel itself is usually somewhat rigid and provides structure to the slatwall.

Typical slatwalls may be fabricated as panels of various sizes which are secured to existing interior building walls or, alternatively, assembled into free-standing structures. Typical slatwall panels can be large or heavy and thus inconvenient to move, limiting the utility of conventional slatwall structures for temporary use such as at a tradeshow, for customized installations, or for installations that are regularly reconfigured. In addition, typical slatwalls, particularly those fabricated from particleboard or a similar material can be relatively fragile and suffer from pegboard or slatwall hook break out under load. Typical slatwalls and pegboards, and the hooks used with these structures, are configured to support a load pulling downward on a slatwall mounted parallel to a building wall. Lateral forces, upward forces or rotational forces applied to a conventional slatwall or pegboard hook or fixture will typically dislodge or remove the hook. In addition, in many instances, it is impossible to retain a load bearing hook or other attachment in a slatwall or pegboard mounted to a ceiling, floor or other horizontally oriented structure when the load on the hook or other fixture tends to pull away from the plane of the slatwall or pegboard.

A unique modular double-sided display panel is described in U.S. Pat. No. 8,033,404 titled; "Modular Double-Sided Display Panel." The display panel described in the U.S. Pat. No. 8,033,404 includes a series of interconnected slats that are movable with respect to each other. Thus, the modular display panel of the U.S. Pat. No. 8,033,404 can be formed into double-sided hanging curtains, panels, freestanding structures, dividing walls and the like with a substantially unlimited variety of configurations available. Although conventional slatwall hooks and fixtures may be used with display panels described in the U.S. Pat. No. 8,033,404, conventional hooks and fixtures typically do not provide any structural support to the display panel and cannot be used as a tool when assembling a panel.

The embodiments disclosed herein are directed toward overcoming one or more of the problems noted in the prior art above.

SUMMARY

Various embodiments disclosed herein provide improved apparatus and methods for implementing or using a display attachment. In one embodiment, a display attachment includes a baseplate having a front surface, a back surface away from the front surface, and a rotational axis around which the baseplate may be rotated. The display attachment also includes a perimeter edge between the front and back surfaces, which defines at least one clearance portion. The clearance portion is configured to provide clearance between the baseplate perimeter edge and a display engagement region on a display panel when the baseplate is rotated in a forward rotational direction around the baseplate axis. Embodiments of display attachment also include at least one engagement portion, said engagement portion limiting the baseplate from being rotated around the baseplate axis in the forward rotational direction, upon the engagement of the engagement portion with an engagement region on a display.

Various embodiments of display attachment also include an attachment portion which may be implemented as any one or more of a hook, clamp, bracket, rod, bolt, tray, shelf, bin, support, hanger, connecting rod, or similar structure extending away from the baseplate.

In some embodiments of display attachment, the perimeter edge defining the clearance portion defines a curve having a radius equal to or less than the distance between the rotational axis of the baseplate and the clearance portion. A baseplate may have multiple clearance portions, for example, a first clearance portion positioned away from a second clearance portion. In such an embodiment, the perimeter edge defining the first clearance portion may define a first curve having a radius equal to or less than a distance between the rotational axis and the first clearance portion, and the perimeter edge defining the second clearance portion may define a second curve having a radius equal to or less than a distance between the rotational axis and the second clearance portion. The first and second clearance portion curves, if present, may have any desired shape. In one embodiment, the first curve and the second curve define segments of a circle. In other embodiments, the perimeter edge defining the clearance portion defines a complex curve having a varying radius. The portion of the perimeter edge defining the engagement portion can have any suitable shape, for example in some embodiments of display attachment, the perimeter edge defining the engagement portion is linear.

Selected embodiments of the display attachment may have a baseplate including a bendable tab defined at least in part by the perimeter edge, such that the bendable tab may be bent by a user to enhance the fit of the display attachment to a display. A bendable tab may be bent in any desired direction or to any desired degree. For example, the bendable tab may be bent out of or away from a plane defined by at least one of the front surface and the back surface of the baseplate. Alternatively, the bendable tab may be bent within the baseplate plane, but nearer to or further from a central region of the baseplate. In other embodiments, the bendable tab may be bent in multiple planes or in multiple directions. In some embodiments having a bendable tab, the bendable tab is in part defined by a slot opening between the front surface and the back surface of the baseplate.

Some embodiments of display attachment will include a baseplate having one or more spreader notches defined by the perimeter edge. For example, selected base plates may include first and second spreader notches, such that the first spreader notch may be engaged with a first engagement region of a display, and the second spreader notch may be engaged with a second engagement region of a display, to cause the second engagement region to move away from the first engagement region. This type of engagement between spreader notches and a display is useful when assembling the display.

Some embodiments of display attachment include a baseplate having a central socket which may be used for mounting auxiliary items or used to receive a tool for rotating the baseplate into an operative position. In some display attachment embodiments, the attachment portion includes a tool.

Other embodiments of display attachment include, but are not limited to, dedicated display slat spreading tools. Some display attachments include base plates with attachment flanges, central openings, auxiliary clamp plates, wedge or hinge engagement portions clamps and similar structures. The attachment portion of certain display attachments may secure an auxiliary bracket, tray, bin, drawer, shelf, hanger, and the like. Other display attachments may include connecting rod assemblies configured to join two or more displays together in any orientation.

Alternative embodiments include methods of attaching any type of auxiliary, product, item, fixture, or equipment to a display, at least in part using the display attachments disclosed herein.

Various modifications and additions can be made to the embodiments discussed without departing from the scope of the invention. For example, while the embodiments described above refer to particular features, the scope of this invention also includes embodiments having different combination of features and embodiments that do not include all of the above-described features.

BRIEF DESCRIPTION OF THE DRAWINGS

FIG. 3A is a perspective view of a representative display attachment.

FIG. 3B is a rear elevation view of the display attachment of FIG. 3A.

FIG. 3C is a side elevation view of the display attachment of FIG. 3A.

FIG. 15C is a perspective exploded view of the baseplate embodiment of FIG. 15B.

FIG. 15D is a plan exploded view of the baseplate embodiment of FIG. 15B.

FIG. 23A is a front perspective view of a spring hook display attachment.

FIG. 23B is a plan view of the spring hook display attachment of FIG. 23A.

FIG. 23C is a side elevation view of the spring hook display attachment of FIG. 23A.

FIG. 23D is a rear elevation view of the spring hook display attachment of FIG. 23A.

FIG. 24A is a side elevation view of a wedge baseplate embodiment engaged with a display.

FIG. 24B is a front perspective view of the wedge baseplate embodiment of FIG. 24A engaged with a display.

FIG. 25A is a front elevation view of a first body portion of a wedge baseplate.

FIG. 25B is a side elevation view of the first body portion of FIG. 25A.

FIG. 25C is a front perspective view of the first body portion of FIG. 25A.

FIG. 26A is a front elevation view of a second body portion of a wedge baseplate.

FIG. 26B is a side elevation view of the second body portion of FIG. 26A.

FIG. 26C is a front perspective view of the second body portion of FIG. 26A.

FIG. 28A is a side elevation view of a hinge baseplate.

FIG. 28B is a front perspective view of the hinge baseplate of FIG. 28A.

DETAILED DESCRIPTION OF THE EMBODIMENTS

Figure 1:
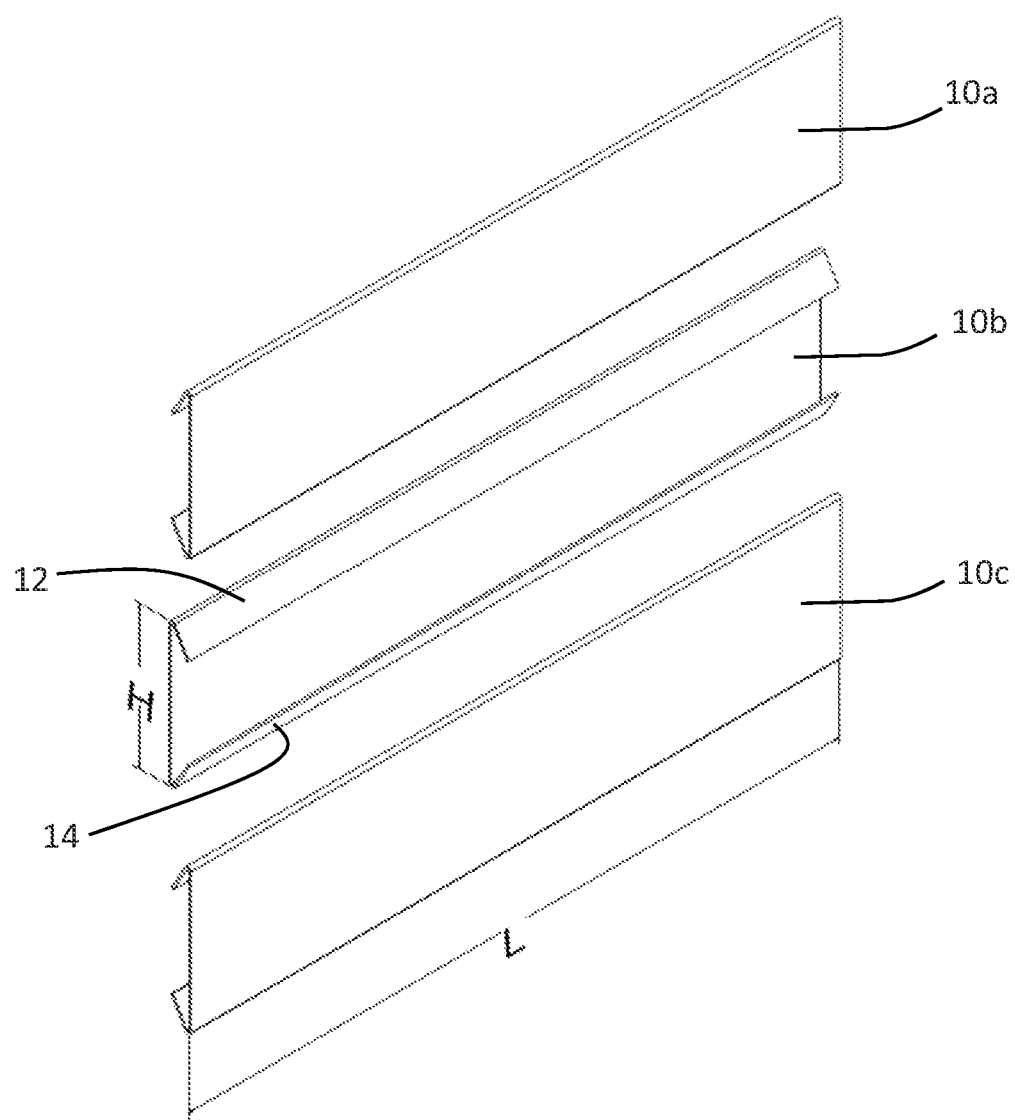
FIG. 1 is an exploded perspective view of a prior art display.

In the following description, for the purposes of explanation, numerous specific details are set forth in order to provide a thorough understanding of the described embodiments. It will be apparent to one skilled in the art, however, that other embodiments of the present invention may be practiced without some of these specific details. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

The embodiments disclosed herein provide a variety of hooks, fixtures, assemblies, brackets, shelves, attachment points, and similar apparatus that may be connected to a slatwall or similar display panel. Collectively, the hooks, fixtures, assemblies, brackets, shelves and the like are referred to herein as "attachments." Many of the disclosed attachments, when connected to a slatwall, function in the conventional manner, to support and/or display merchandise, tools, shelves, bins, equipment or other objects on a slatwall. When the disclosed attachments are connected to a slatwall at a location and in an orientation suitable to support one or more objects, the attachments are described herein as being positioned in an "operative orientation," or "operatively positioned." Many of the disclosed attachments also function to support, engage, strengthen, or otherwise structurally enhance certain types of slatwall when operatively positioned. In addition, some of the disclosed attachments perform specific alternative functions. For example, some of the disclosed attachments function as tools during the assembly of certain types of slatwall.

The disclosed attachments can be used with any suitable slatwall. The disclosed attachments are particularly well-suited for use with the modular slatwall systems described in U.S. Pat. No. 8,033,404 titled; "Modular Double-Sided Display Panel." The entire disclosure of U.S. Pat. No. 8,033,404 is incorporated herein by reference for all matters disclosed therein.

U.S. Pat. No. 8,033,404 describes slatwall structures assembled from individual slats that interconnect with each other. One nonlimiting embodiment of slat described in U.S. Pat. No. 8,033,404 is illustrated in FIG. 1. FIG. 1 is a perspective view of three slat members 10a-c. The slat members 10 have a length (L) which is typically greater than the slat member 10 height (H). Some or all slat members 10 includes an upper engagement portion 12 and a lower engagement portion 14.

Figure 2:
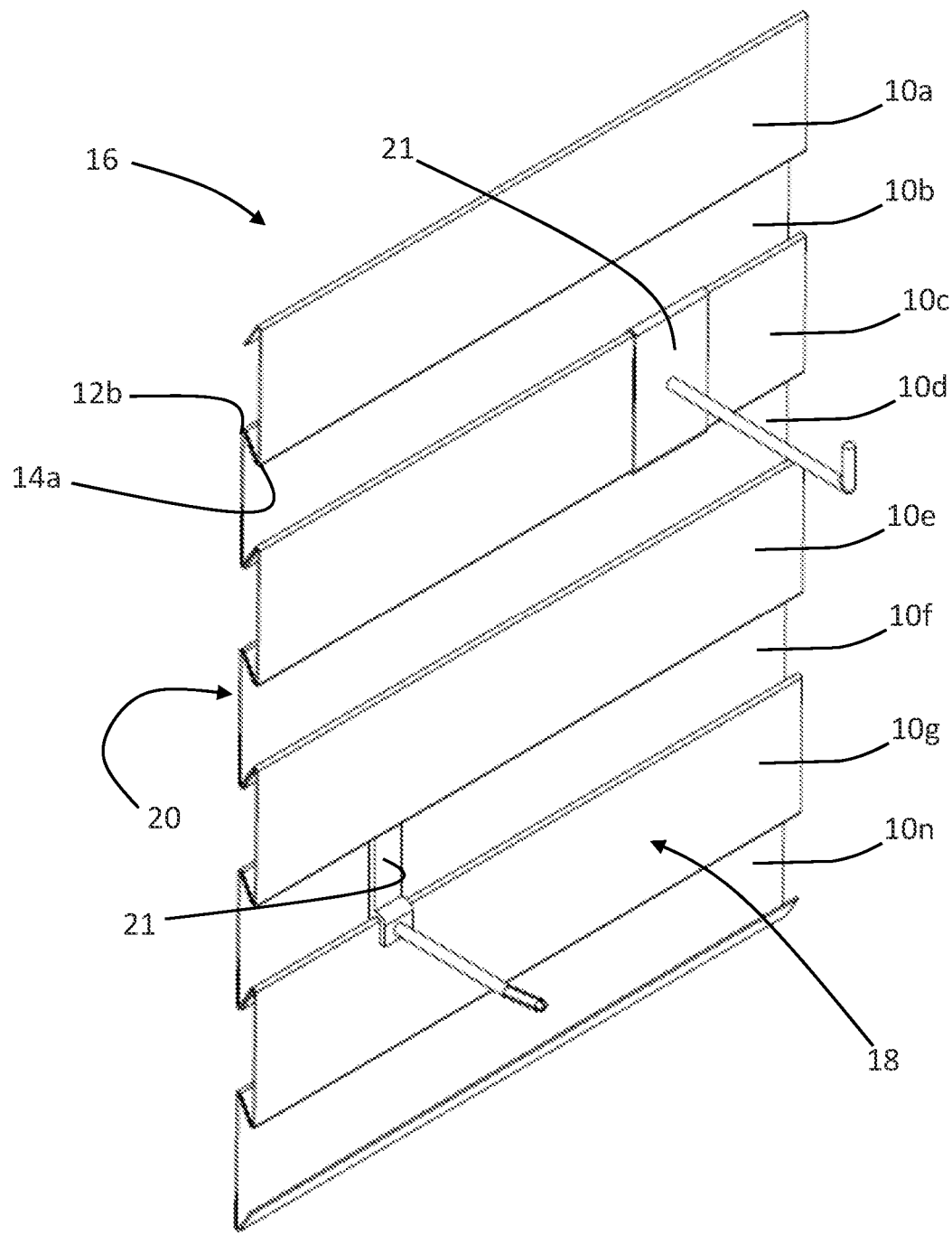
FIG. 2 is a perspective view of a prior art display showing prior art slatwall hooks attached thereto.

As shown in FIG. 2, multiple slat members 10 (a, b, . . . n) may be interconnected to form a display panel 16. The display panel may be formed by interconnecting the lower engagement portion of a first slat member (for example, lower engagement portion 14(a)) with the upper engagement portion 12 of an adjacent slat member (for example, upper engagement portion 12(b) of FIG. 2).

The upper engagement portion 12 and lower engagement portion 14 of respective slat members 10 are configured in the embodiment of FIGS. 1 and 2 to interconnect by directly placing one engagement portion over another. Thus, it is unnecessary to slide any slat member 10 transversely with respect to another slat member 10 to accomplish interconnection or engagement.

As shown on FIG. 2, the serially interconnected slat members 10 define opposing front and back hook receiving surfaces 18 and 20, respectively. In certain slatwall embodiments, the slat members 10 of a slatwall are supported only at the upper and lower engagement portions 12, and 14 respectively. In such an embodiment, some of the slatwall attachments disclosed herein serve to structurally enhance the slatwall. In other slatwall embodiments, the slatwall members 10 are bolted, screwed, or otherwise attached to a frame or wall, typically at the edges. In this family of embodiments, it is desirable to firmly press an upper engagement portion 12 into firm engagement with an adjacent lower engagement portion 14 as the respective slats 10 are mounted to a frame or wall. Conventional slatwall hooks 21, brackets, and fixtures as described in the U.S. Pat. No. 8,033,404 do not provide structural enhancement, and cannot assist with the assembly or mounting of a slatwall. Various embodiments of slatwall attachment described herein serve a structural enhancement and/or assembly purpose in addition to functioning as slatwall hooks, fixtures, assemblies, brackets, shelves, attachment points, and the like.

Figure 4:
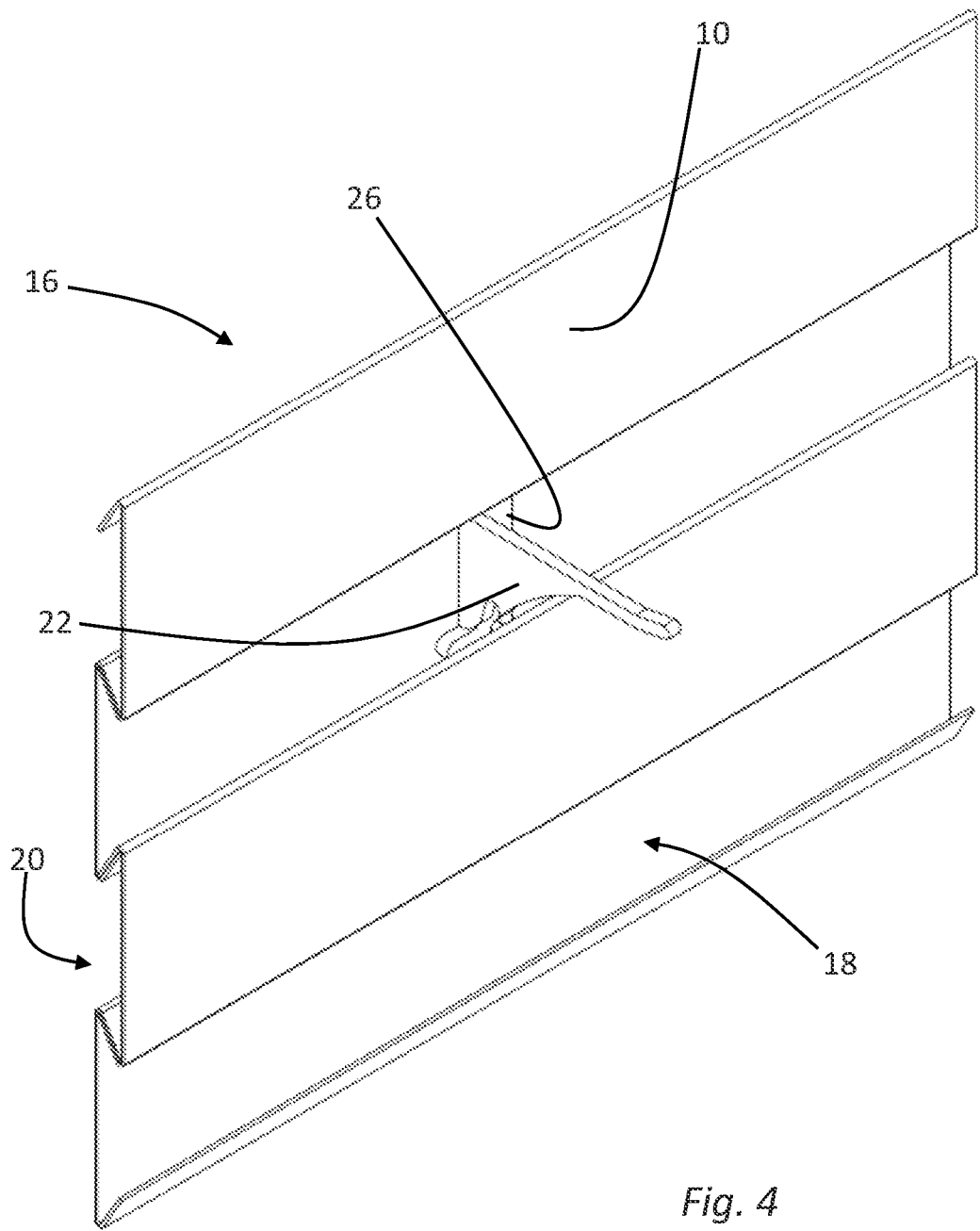
FIG. 4 is a perspective view of the display attachment of FIG. 3A engaged with a display.

One embodiment of a disclosed slatwall attachment is illustrated in FIGS. 3A-3C. This specific attachment 22 incudes a hook 24 extending away from a base plate 26. As illustrated in FIG. 4, the base plate 26 can be received within a front or back hook receiving surface 18, 20 of a display panel 16, such that the hook 24 extends away from the display panel 16 in an operational configuration. As described in detail below, the base plate 26 can be provided in various sizes and configurations. Similarly, the hook 24 extending from a base plate 26 in alternative embodiments, only some of which are discussed in detail herein, may be implemented as a bracket, shelf support, rod, clip, anchor, or other structure useful to support or attach merchandise, tools or other items to a display panel 16.

Figure 5A:
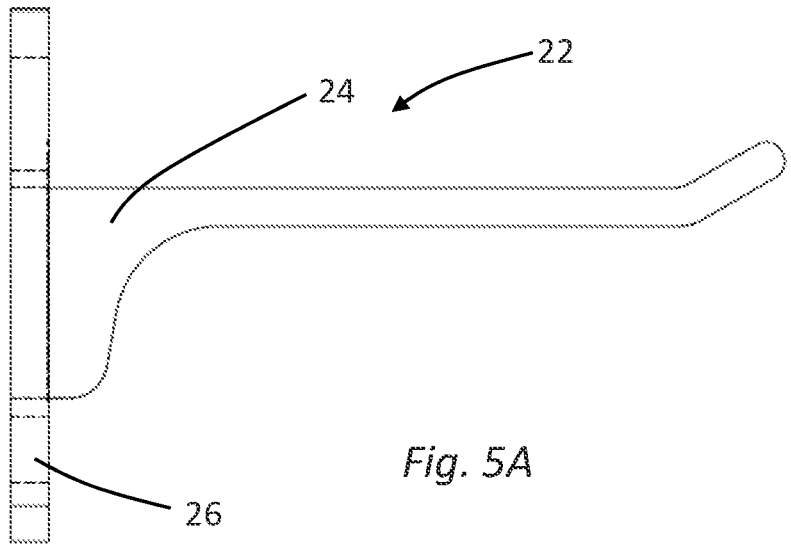
FIG. 5A is side elevation view of an alternative display attachment.
Figure 5B:
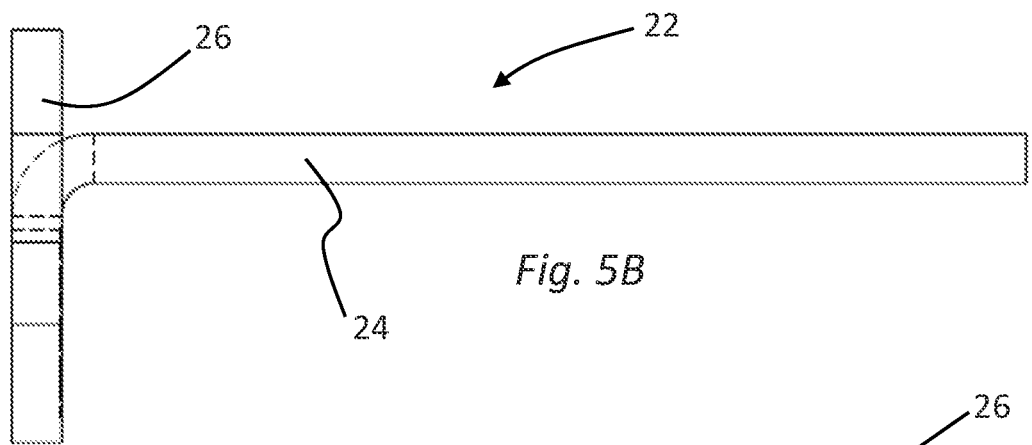
FIG. 5B is a plan view of the display attachment of FIG. 5A.
Figure 5C:
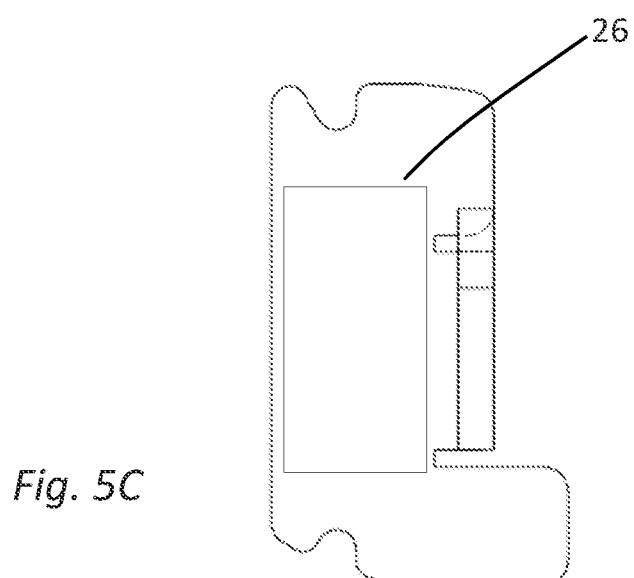
FIG. 5C is a rear elevation view of the display attachment of FIG. 5A

The hook 24 of FIGS. 3A-C functions primarily as a slatwall hook, but this embodiment also includes an ancillary tool, specifically bottle opener 28. Any type of ancillary tool may be included on or in association with an attachment 22, including but not limited to a screwdriver, nut driver, knife blade, saw, wire stripper, sizing gauge, light or outlet. The ancillary tool structure is optional. For example, the embodiment of FIGS. 5A-5C is a similar attachment 22, including a hook 24 without an ancillary tool.

Figure 6:
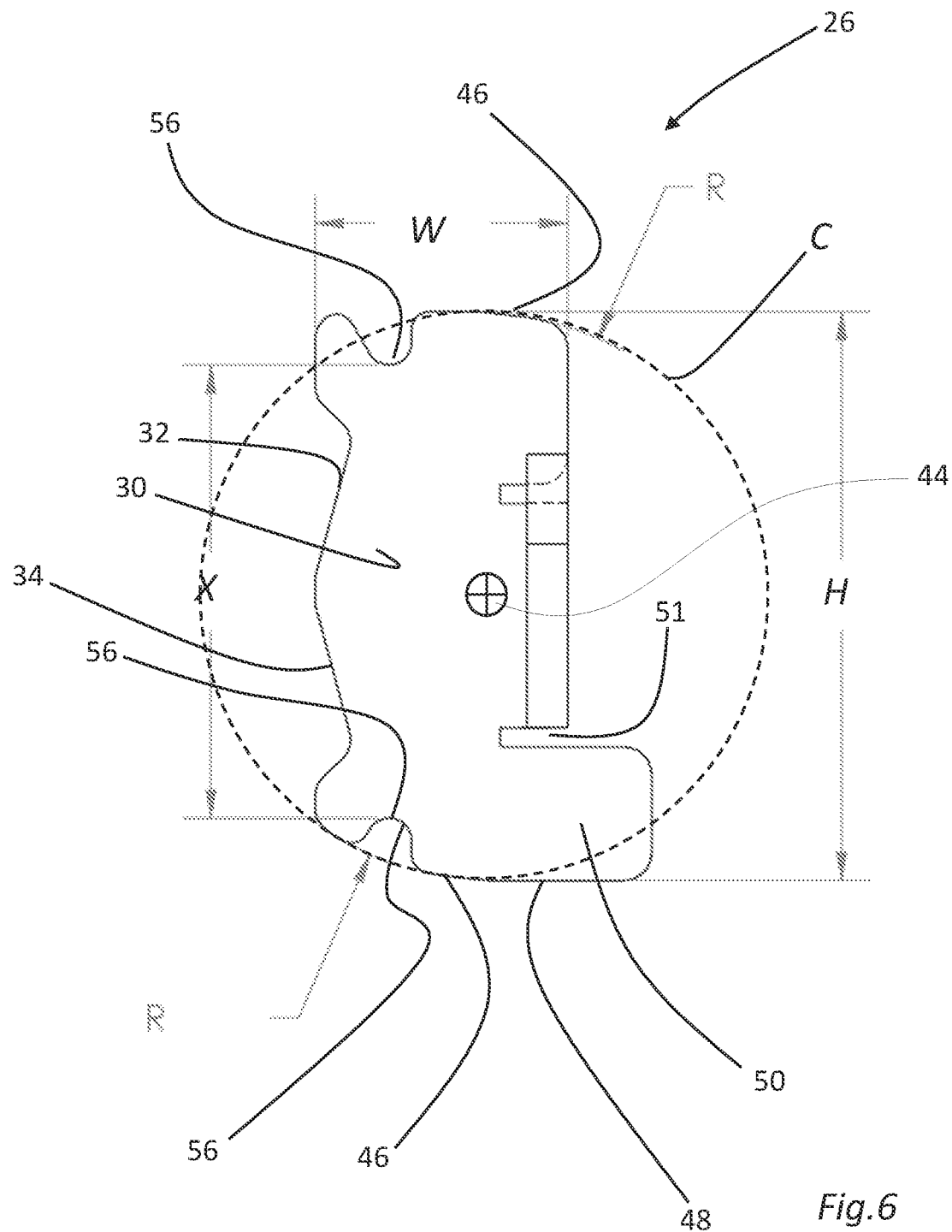
FIG. 6 is a front elevation view of a representative baseplate embodiment.

One configuration of base plate 26 is illustrated in detail in FIG. 6. This embodiment of base plate 26 includes a front surface 30, which faces away from the display panel 16 when an attachment 22 is installed an operative position to support or display merchandise or another item. Opposite the front surface 30 is a rear surface 32, which, when an attachment 22 is operatively installed, faces the display panel 16. The base plate 26 has a thickness, such that a perimeter edge 34 is defined between the front and rear surfaces. As shown in FIG. 6, a base plate 26 has a width "W" and a height "H." Both the base plate width and height may be of any suitable dimension, however these dimensions will typically match certain aspects of a slatwall into which the baseplate 26 will be mounted.

Figure 7A:
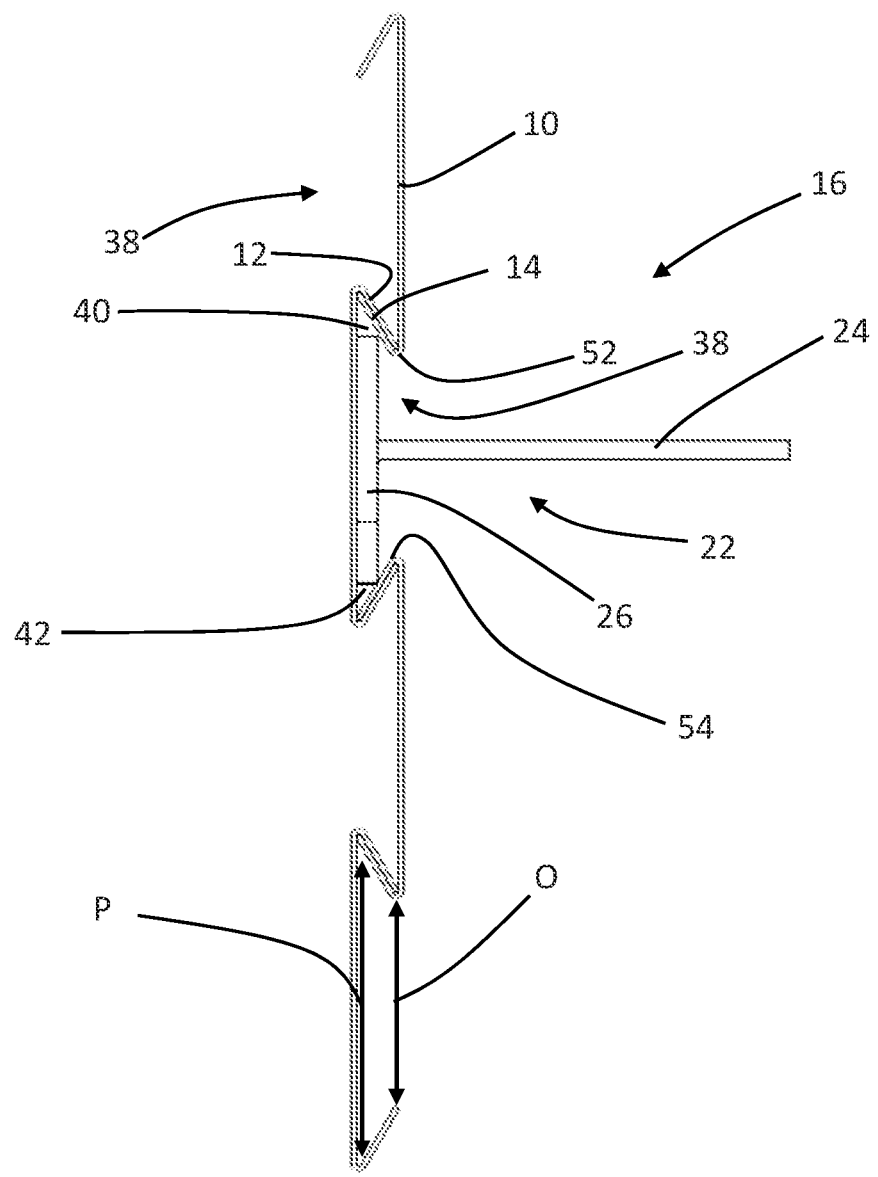
FIG. 7A is a side elevation view of a display attachment engaged with a display.

For example, FIG. 7A is a side view of a small portion of a display panel 16 assembled from slat members 10 as generally shown in FIG. 1 and FIG. 2. Three adjacent slats 10a, 10b, and 10c define a trapezoidal opening 38 that defines a lesser height "O" at the entrance to the opening 38 and further defines a greater height "P" at the base of the opening. In addition, As shown in the detailed view of FIG. 7B, adjacent slats 10 define an upper baseplate engagement region 40 and a lower baseplate engagement region 42. The upper and lower baseplate engagement regions 40, 42 are separated by a distance equal to or slightly less than the height "P." It is important to note that slats 10 engaged with each other define each upper baseplate engagement region 40 and each lower baseplate engagement region 42. Thus, the height "P" between the upper and lower baseplate engagement regions 40, 42 is determined by several factors including the slat height "h" (FIG. 1), the angle between the back of a slat and the upper or lower engagement portion 12, 14, and the thickness of the baseplate to be received in the opening.

Figure 7B:
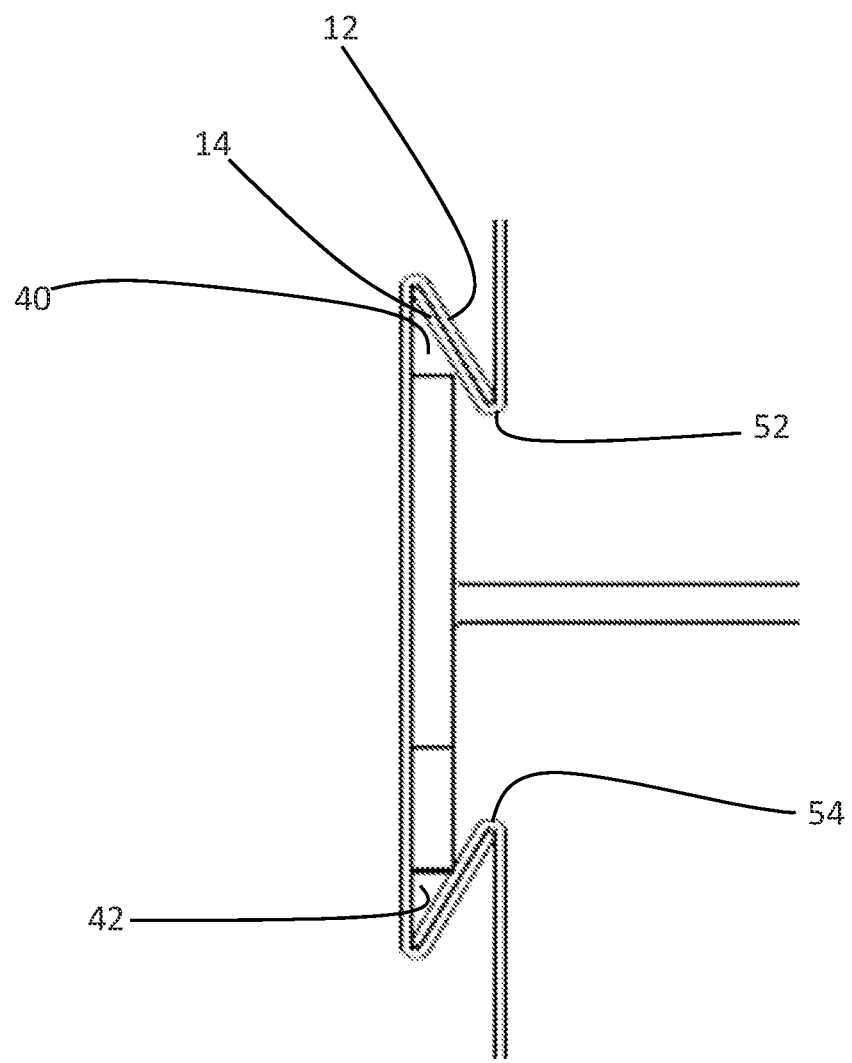
FIG. 7B is a close-up side elevation view of a display attachment engaged with a display.
Figure 8A:
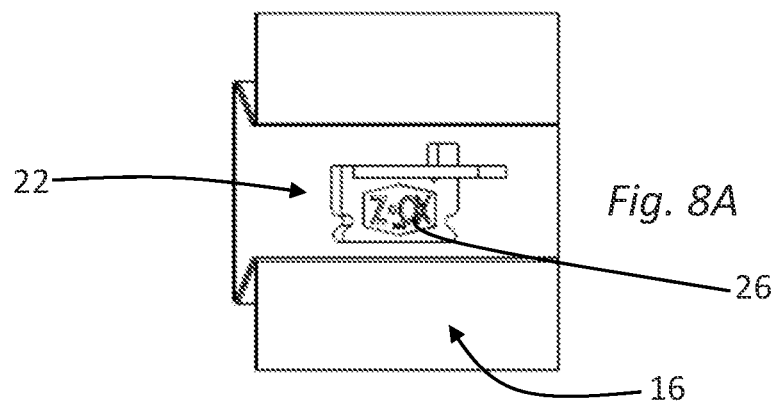
FIGS. 8A, 8B, 8C, and 8D are is a sequenced view of a display attachment being rotated into engagement with a display.
Figure 8B:
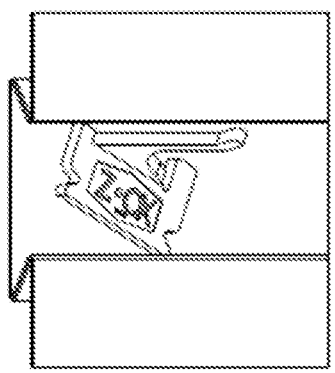
Figure 8C:
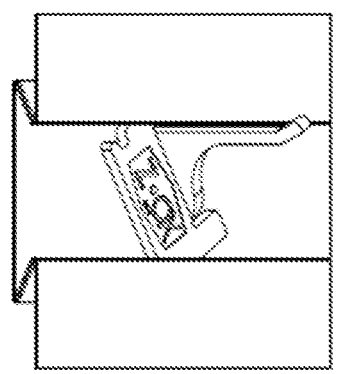
Figure 8D:
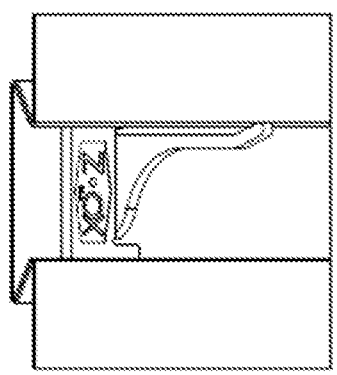

Returning to FIG. 6, the width "W" of a baseplate 26 will typically be selected to be less than the height "O" at the entrance of an opening 38 in a corresponding display panel 16. Therefore, an attachment 22 having a baseplate 26 can be inserted directly into an opening 38 when the attachment 22 and baseplate 26 are rotated at some angle, often but not exclusively 90 degrees away from the final installed operational position. After insertion into the opening 38, the attachment 22 and baseplate 26 may be rotated until the baseplate 26 engages with one or both of the upper and lower baseplate engagement regions 40, 42. Rotation of the attachment 22 and baseplate 26 into engagement with the engagement regions 40, 42 is described herein as "forward rotation" and is illustrated in FIGS. 8A-8D. Forward rotation may be clockwise or counterclockwise, depending upon the structure of the baseplate 26. Forward rotation accomplishes multiple goals. Forward rotation secures the attachment 22 into an operational configuration with respect to the display panel 16, for example, with the hook 24 extending out from and curving up from the display panel 16. Forward rotation also presses the upper engagement portion and lower engagement portion 12, 14 of adjacent slats 10 together with the baseplate 26, as shown in FIG. 7B.

Thus, an attachment 22 having an appropriately sized baseplate 26 may be easily and securely installed within an opening 38 and can also mechanically enhance the display panel 16 by moving the upper and lower engagement portions 12, 14 together. The base plates 26 illustrated in FIGS. 3-8 include several features that promote secure and easy installation and serve also to mechanically enhance a display panel 16. For example, in some embodiments, the front surface and rear surface 30, 32 of a baseplate 26 are parallel to each other. At least one of the front surface 30 and rear surface 32 of the base plate 26 will define a rotational axis 44 that is generally perpendicular the front surface 30, the rear surface 32, or both. The rotational axis of a baseplate 26 may, in some embodiments be located at or near the center of the base plate 26, in other embodiments however, the rotational axis of a baseplate 26 may be located at a perimeter edge 34 or anywhere in between the edge and center of a base plate 26. The position of a representative rotational axis 44 is identified in FIG. 6 and the axis would extend perpendicular to and through the plane defined by the page. In other embodiments, the rotational axis 44 may be located elsewhere on a baseplate 26, including but not necessarily at a perimeter edge 34.

In some baseplate embodiments, the perimeter edge 34 defines at least one clearance portion 46 providing for clearance as the base plate is rotated in the forward rotational direction around the base plate axis 44 between display engagement regions 40, 42. The clearance portion 46 can be an edge defining a segment of a circle having a radius R generally centered on the rotational axis 44. Alternatively, the clearance portion 46 can be any cut-away or trimmed area on the baseplate 26 that provides for clearance between the perimeter edge 34 and the engagement regions 40, 42 as the baseplate 26 is rotated into an operational position. The clearance portion can define a complex curve with a varying radius that forces the engagement portions 12, 14 toward tight engagement as forward rotation progresses.

In certain embodiments, two or more clearance portions 46 may be provided, typically on opposite sides of the rotational axis 44. In some embodiments having two or more clearance portions 46, each clearance portion 46 may define a segment of a circle having a radius equal to or slightly less than the distance between the rotational axis and the clearance portion 46. Thus, the first and second clearance portions 46 may define segments of a circle centered upon the rotational axis 44 of the baseplate 26. Clearance is facilitated if the distance between two clearance portions 46, or the diameter of any circle defined by any two clearance portions is equal to or slightly less than the height "P" between upper and lower baseplate engagement regions 40, 42.

Many baseplate embodiments will also include at least one engagement portion 48, also defined by the perimeter edge 34. An engagement portion 48 is a structure that limits, restricts or in some cases prohibits the baseplate 26 from being rotated around the baseplate axis in the forward direction when the engagement portion 48 becomes engaged with a baseplate engagement region 40, 42. The engagement portion 48 can be but, is not necessarily, a linear surface formed by the perimeter edge 34. Selected points on the engagement portion 48 may be at a distance from the rotational axis 44 equal to or greater than ½ of the height P. Thus, as shown in FIG. 8, some length of the engagement portion 48 extends away from the rotational axis 44 sufficiently to limit or prevent additional forward rotation when the attachment 22 is fully installed. The engagement portion 48 does not however, prevent or limit rotation in a reverse direction, thus the engagement portion does not affect removal the attachment 22 buy rotation in the reverse direction. As noted above, the engagement portion 48 is seated against one of the upper or lower baseplate engagement regions 40, 42 when the attachment 22 is fully installed. The engagement portion therefore forces the upper and lower engagement portions 12, 14 into engagement, and prevents adjacent slats 10 into which the attachment 22 has been installed from collapsing toward each other. A baseplate 26 may include any suitable number of engagement portions 48. Most typically, a baseplate 26 will include one engagement portion 48 or two opposing engagement portions 48.

Figure 9A:
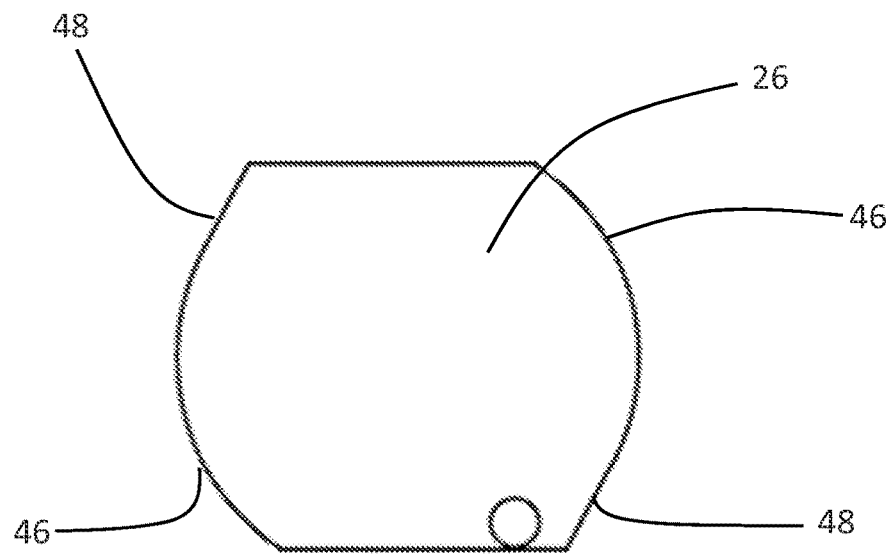
FIG. 9A is a front elevation view of an alternative baseplate embodiment.
Figure 9B:
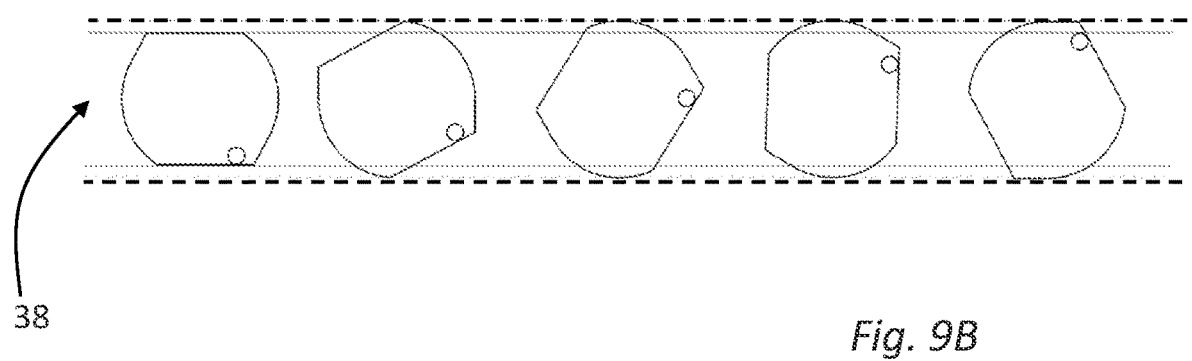
FIG. 9B is a sequenced view of the baseplate embodiment of FIG. 9A being rotated into engagement with a display.

Certain base plates such as that depicted in FIGS. 3, 4, 5, and 6 include an engagement portion 48 which defines a linear segment of perimeter edge 34 that limits or prevents rotation of the baseplate 26 after forward rotation of about 90 degrees. 90° rotation after insertion into full engagement is illustrated in FIGS. 8A-8D. Other baseplate configurations may limit or prevent forward rotation after about 30°, 45°, 60°, 85° 95°, 100°, 105°, 100° 115°, 120° or any other suitable rotational range has been accomplished. For example, the schematic illustration of FIGS. 9A and 9B shows a baseplate 26 having clearance portions 46 and opposing engagement portions 48 configured to permit forward rotation of about 120° after the baseplate 26 is inserted into an opening 38.

Certain baseplate embodiments also include one or more bendable tabs 50. A bendable tab 50 may be located in the region of the engagement portion 48 or located away from the engagement portion 48. One embodiment of bendable tab 50 is configured to be bent to a greater or lesser angle away from a plane defined by at least one of the front surface 30 or back surface 32 of the baseplate 26. Thus, the bendable tab 50 can increase the functional thickness of the baseplate 26 causing the baseplate 26 to fit more securely within an opening 38. Other bendable tab embodiments are bent generally within a plane defined by at least one of the front surface 30 or back surface 32. In these embodiments, bending the bendable tab increases the width W or height H illustrated on FIG. 6. Other bendable tab embodiments may be bent in multiple planes or directions. In some embodiments, the bendable tab may be in part defined by an optional slot 51 formed within the baseplate 26.

As noted above, a display panel 16 such as shown in FIG. 2 may be free-hanging, or screwed, bolted or otherwise attached to a wall, perimeter frame, or other structure. Prior to the attachment of a display panel 16 to a wall or frame, it is advantageous to force the upper corner edge 52 and lower corner edge 54 associated with each opening 38 away from each other, thereby assuring a secure, uniformly sized, and tight fit between the upper engagement portion 12 and lower engagement portion 14 of adjacent slats.

Figures 10A, 10B:
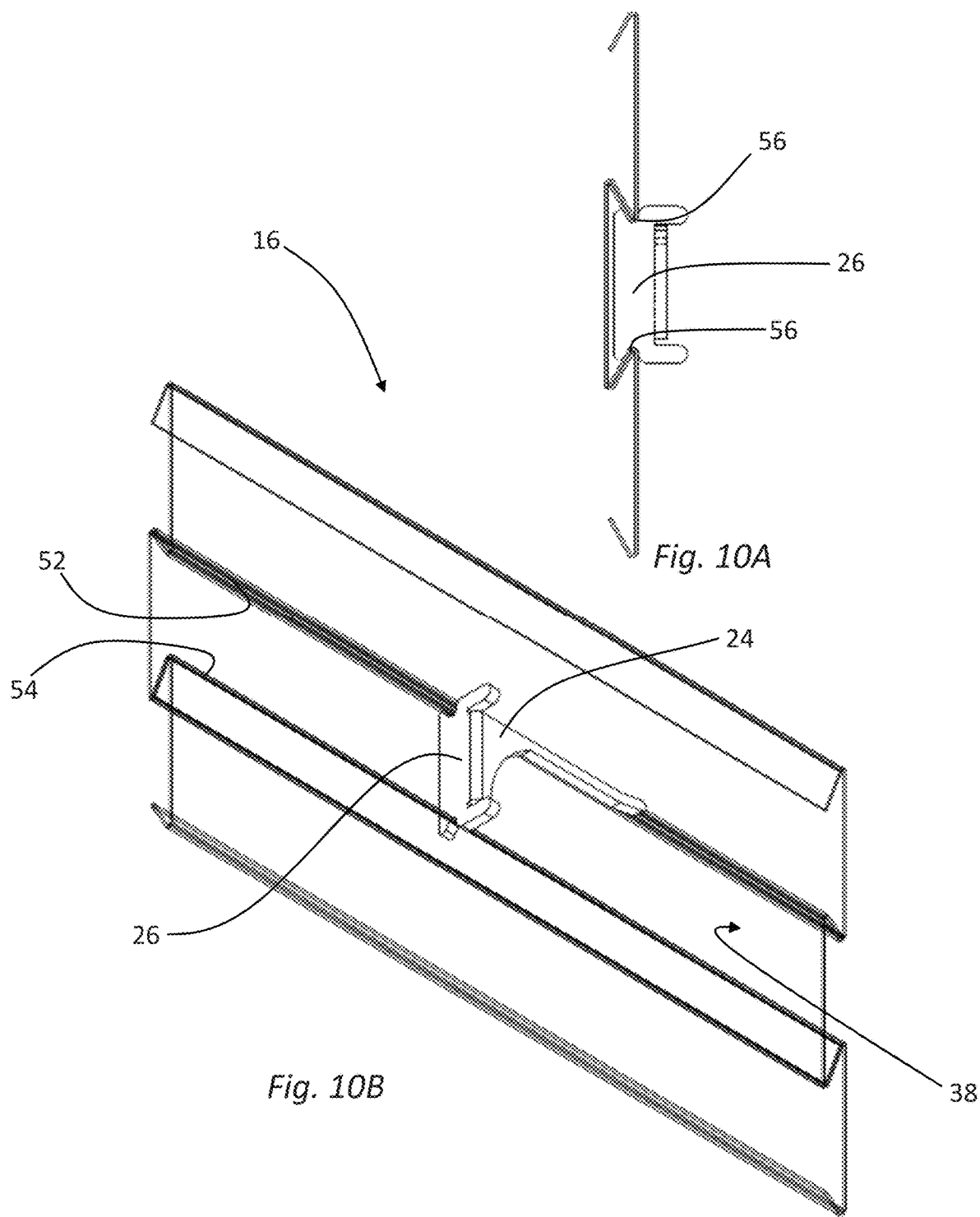
FIG. 10A is a side elevation view of a display attachment with spreader notches engaged with a display.
FIG. 10B is a perspective view of the display attachment of FIG. 10A engaged with a display.

Certain baseplate embodiments may include one or more spreader notches 56 defined by the perimeter edge. Spreader notches 56, as shown in FIG. 6, can be positioned at a selected distance apart from each other which corresponds to the desired distance between an upper corner edge 52 and lower corner edge 54 (See FIG. 7A) when a display panel 16 is assembled. Thus, as shown in FIGS. 10A and 10B, an attachment 22 having a baseplate 26 with one or more spreader notches 56 may be used as an assembly tool to force the upper and lower corner edges 52, 54 apart, while also forcing the corresponding upper engagement and lower engagement portions 12, 14 into engagement during panel assembly. Specifically, the spreader notches 56 may be loosely engaged with the upper corner edge 52 and lower corner edge 54 of a selected opening 38. The hook 24 may then be used as a handle to leverage the baseplate 26 into a vertical orientation, with the hook 24 generally parallel to the slats 10, forcing the upper and lower corners edges 52, 54 apart. Screws, bolts or other fasteners may then be secured to attach the spread apart slats 10 to a frame, wall or other structure. The hook 24 may then be rotated up or down to remove the attachment 22, permitting the attachment 22 to be repositioned to another location as the display panel 16 is assembled. When panel assembly is complete, the attachment 22 may be installed in an operational configuration and used as a hook extending from the display panel 16.

FIGS. 11-14 illustrate alternative embodiments of dedicated assembly tools which may be used to more conveniently install a large display panel 16 or system of display panels 16. For example, the assembly tool 58 of FIGS. 11 and 12 includes a base 59 and two legs 60 that are attached to the base in a hinged connection using hinge pins 61. The assembly tool 58 also includes a central bolt 62 and optional washer 63 which are received in a threaded hole 64 or a threaded nut, or another threaded assembly associated with the base 59. A shoulder on the bolt 62, or the optional washer 63 is positioned to engage with a leverage bar 65 at the top of each leg 60. The central bolt 62 may terminate opposite the threads in a ring, hook or other attachment structure. When the bolt 62 is threaded further into the threaded hole 64, the bolt 62 forces the leverage bar 65 of each leg toward the base 59, causing the end of each leg 60 opposite the leverage bar 65 to pivot away from the base 59.

Figure 11A:
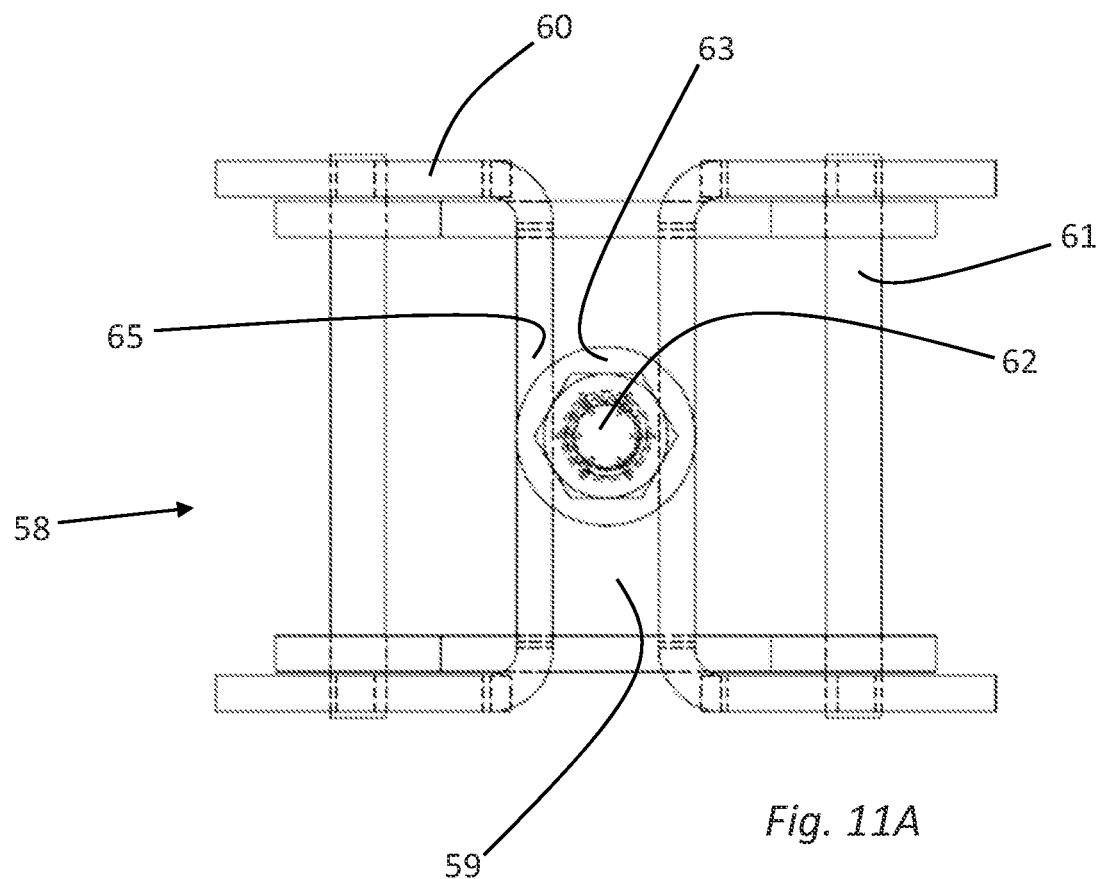
FIG. 11A is a plan view of a first spreader tool embodiment.
Figure 11B:
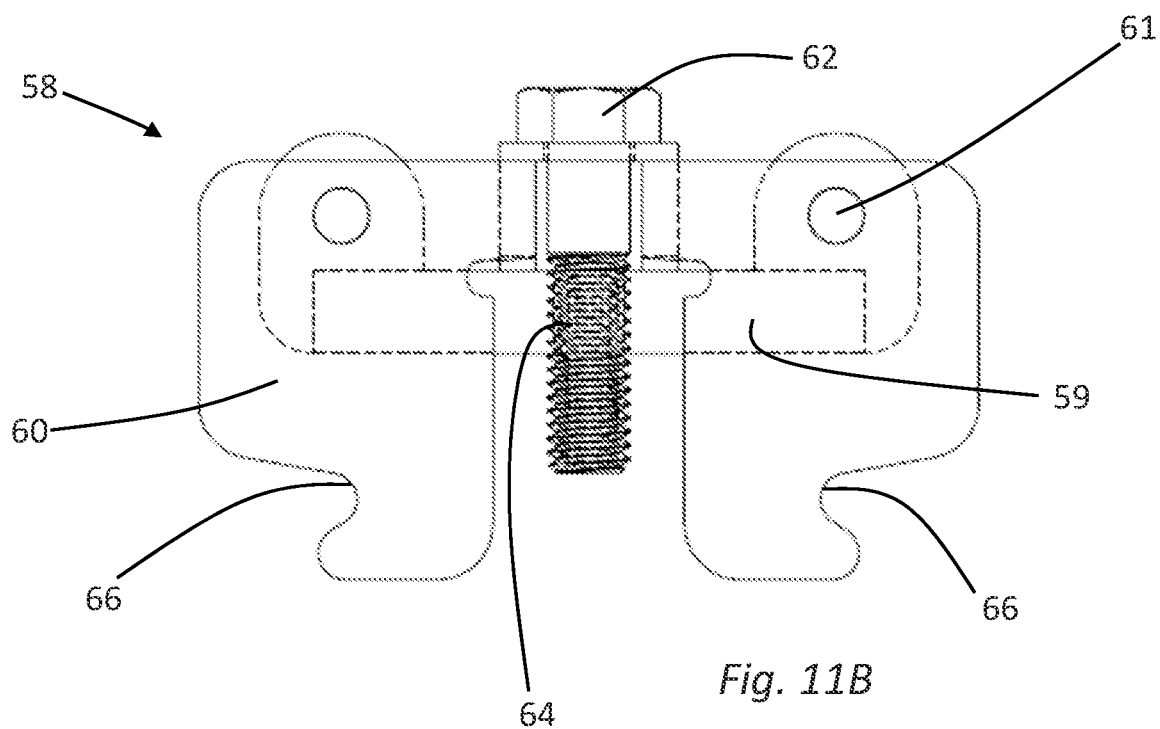
FIG. 11B is a side elevation view of the spreader tool embodiment of FIG. 11A.
Figure 11C:
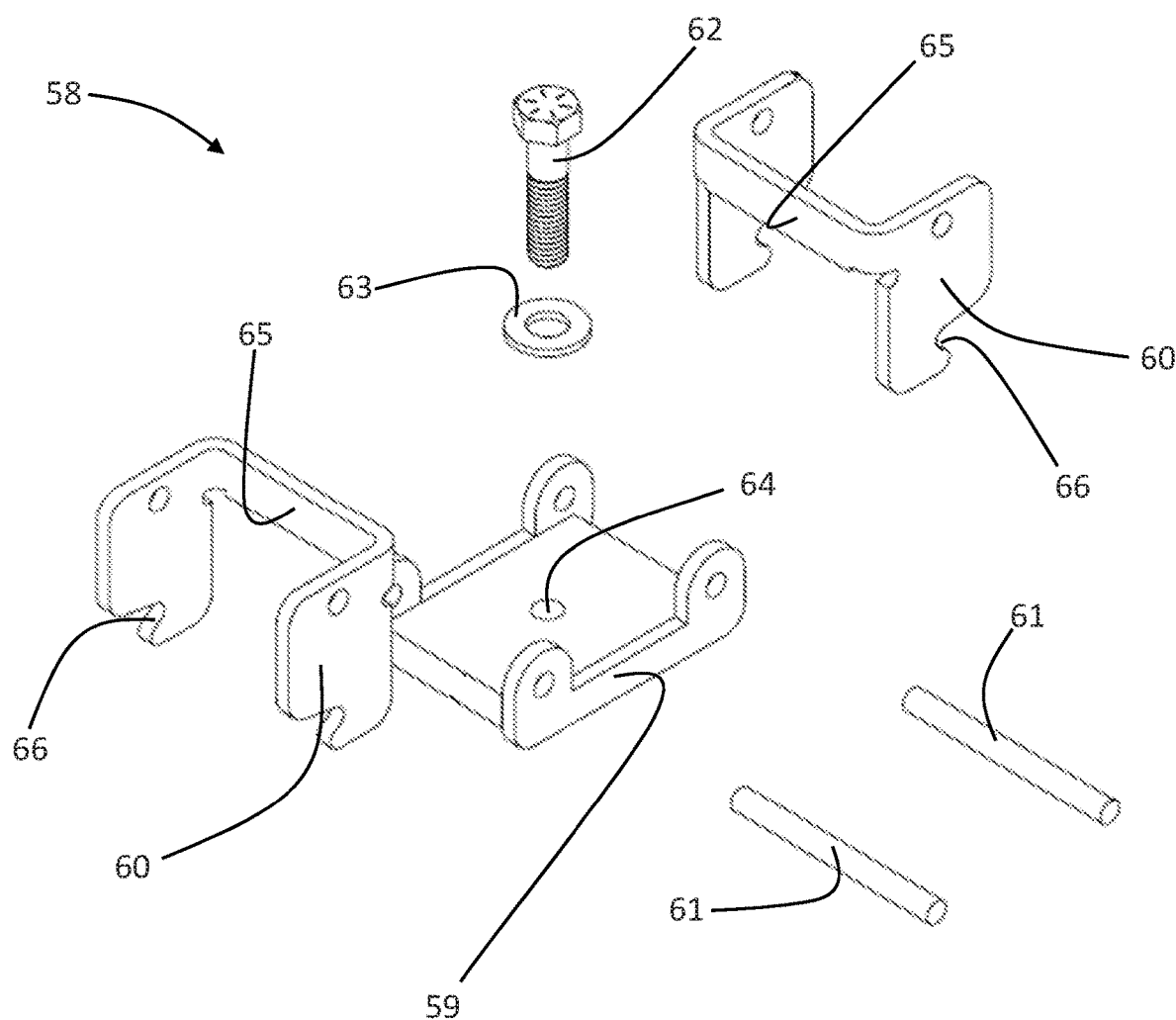
FIG. 11C is an exploded view of the spreader tool embodiment of FIG. 11A.
Figures 12A, 12B:
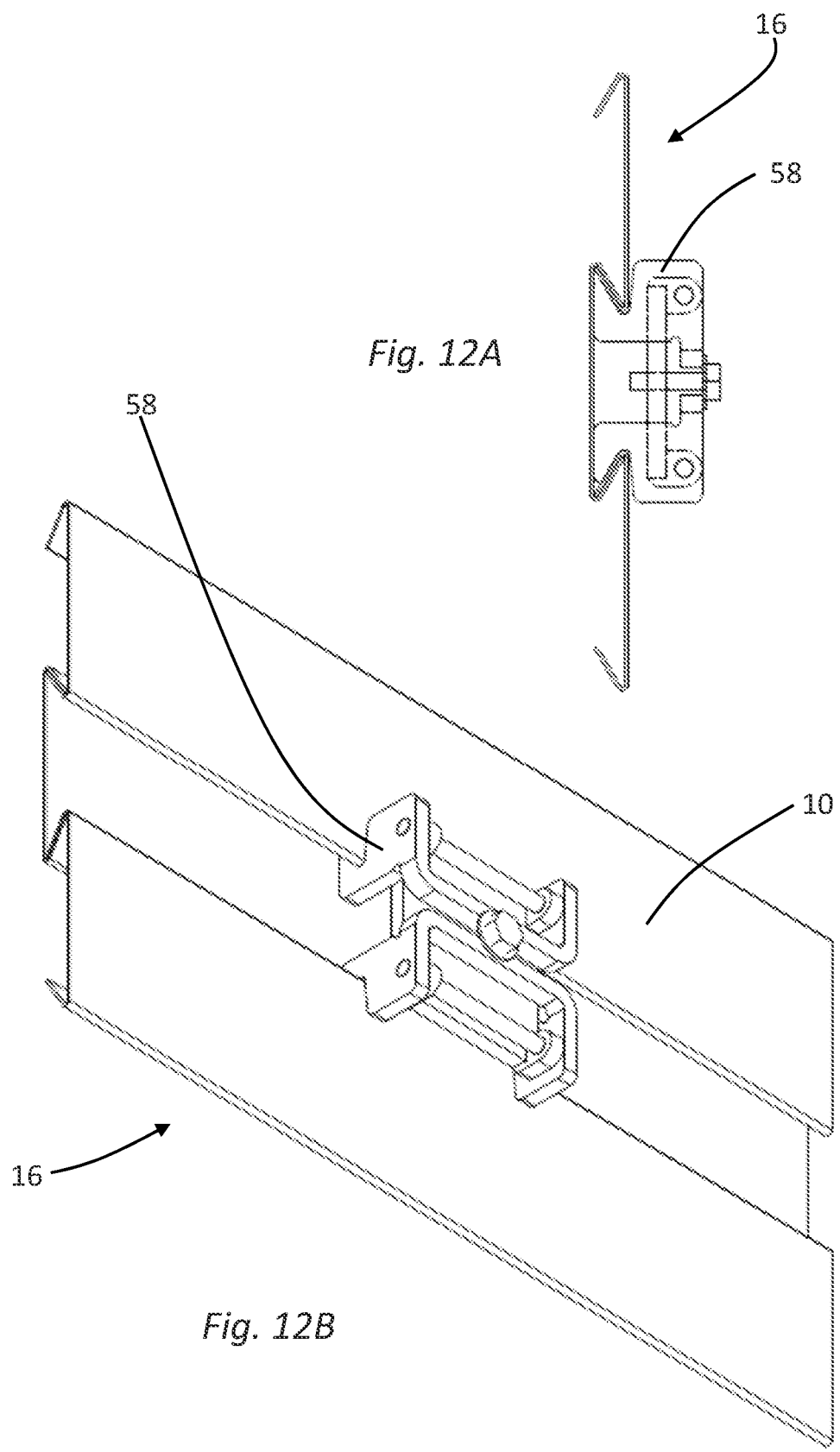
FIG. 12A is a side elevation view of the spreader tool embodiment of FIG. 11A engaged with a display.
FIG. 12B is a perspective view of the spreader tool embodiment of FIG. 11A engaged with a display.

As may be noted in FIGS. 11-12, each leg 60 opposite the leverage bar 65 includes one or more leg notches 66 facing away from the base. In use, these leg notches 66 are placed loosely over an upper corner edge 52 or a lower corner edge 54 during assembly of a display panel 16. When the assembly tool 58 is positioned, the bolt 62 may be threaded toward the threaded hole 64 causing the leg notches 66 on one side of the tool 58 to pivot away from the notches 66 on the other side of the tool 58. This in turn forces the upper and lower corner edges 52, 54 apart, while forcing the corresponding upper engagement and lower engagement portions 12, 14 into engagement. Nearby screws, bolts or other fasteners associated with the display panel 16 may then be secured to fasten the display panel to a frame, wall or other structure. The bolt 62 may then be threaded away from the base 59 loosening engagement between the leg notches 66 and corresponding corner edges 52, 54. The assembly tool 58 may then be slid along an opening 38 to an adjacent location or removed and placed in another opening 38 for additional assembly steps.

After a display panel 16 is fully assembled, the assembly tool 58 may be removed. Alternatively, the assembly tool 58 may be positioned at a desired location, engaged with the display panel by threading the bolt 62 into the base 59, thereby providing an additional attachment 22 to the display panel 16. As noted above, in certain embodiments, the assembly tool 58 may include an eyebolt, hook, loop or other structure providing an attachment point for large items or to secure the entire display panel 16 to a building, wall, or similar structure.

Figure 13A:
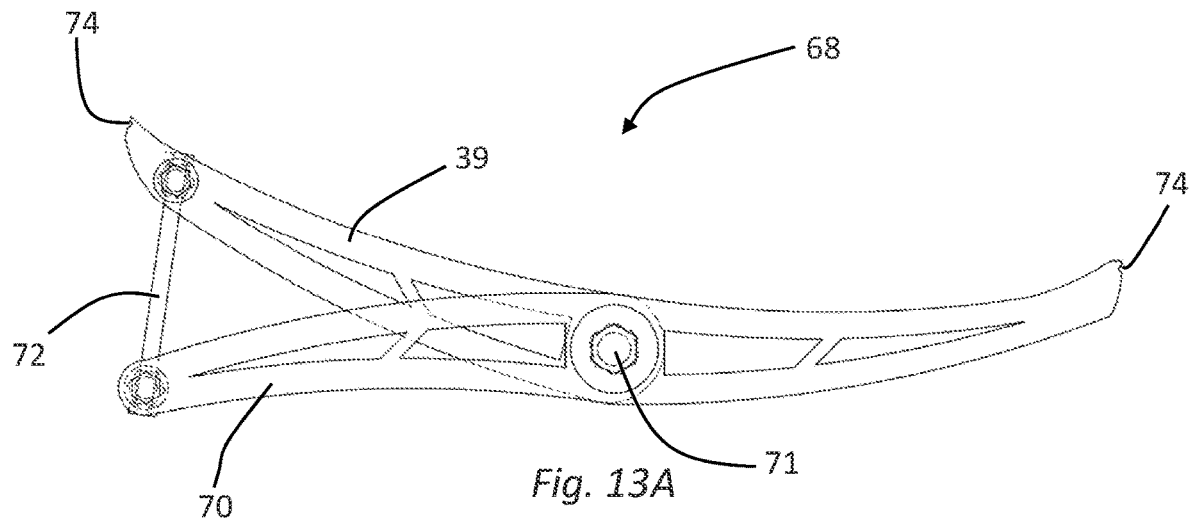
FIG. 13A is a front elevation view of an alternative spreader tool embodiment.
Figure 13B:
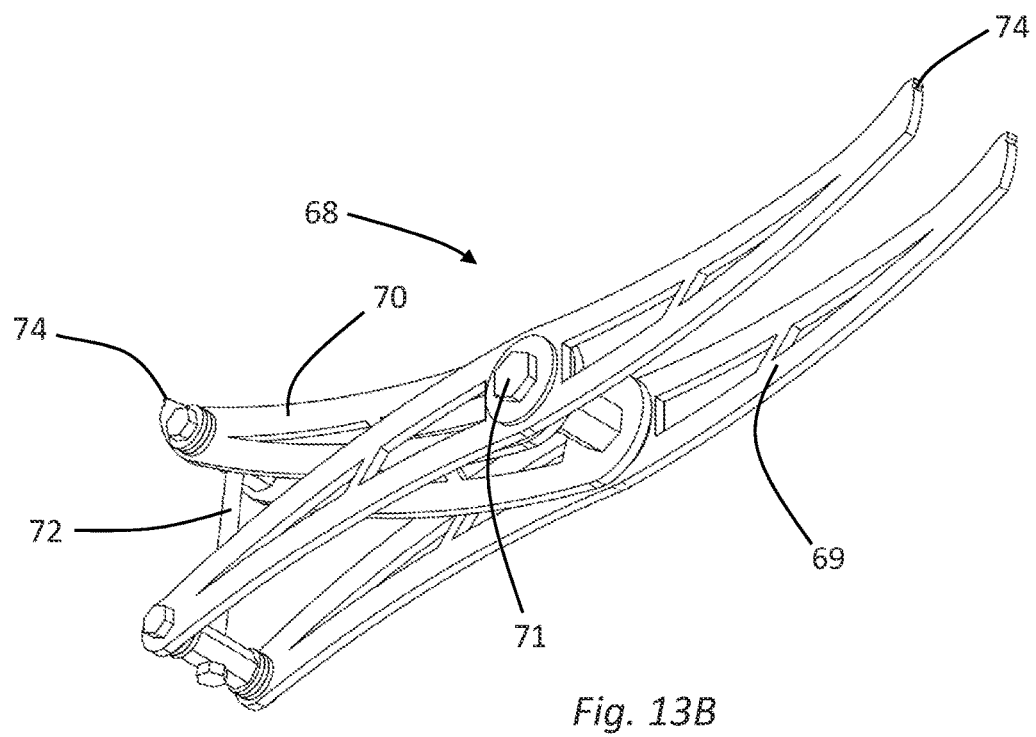
FIG. 13B is a perspective view of the alternative spreader tool embodiment of FIG. 13A.

FIGS. 13A, 13B, 14A and 14B show an alternative assembly tool 68 that may be used to force the upper and lower engagement portions 12, 14 of several slat members 10 into engagement simultaneously. The assembly tool 68 includes a first pair of full-length legs 69 and a second pair of half-length legs 70 joined together with a pivot bolt 71 so that each pairs of legs 69, 70 may pivot with respect to the other. One end of the half-length legs 70, away from the pivot bolt 71, is connected to a corresponding end of the full-length legs 69 with a jackscrew 72 as shown in FIG. 13B. The jackscrew 72 is held captive in a rod between either the half-length legs 70 or the full-length legs 69. The jackscrew 72 is held in threaded engagement with a rod between the other pair of legs. Thus, when the jackscrew is selectively turned in a first and second direction, the distance between the ends of the half-length legs 70 and the full-length legs 69 is increased or decreased. This in turn causes the opposite end of the full-length legs 69 to move nearer to or further away from the end of the half-length legs 70.

Figures 14A, 14B:
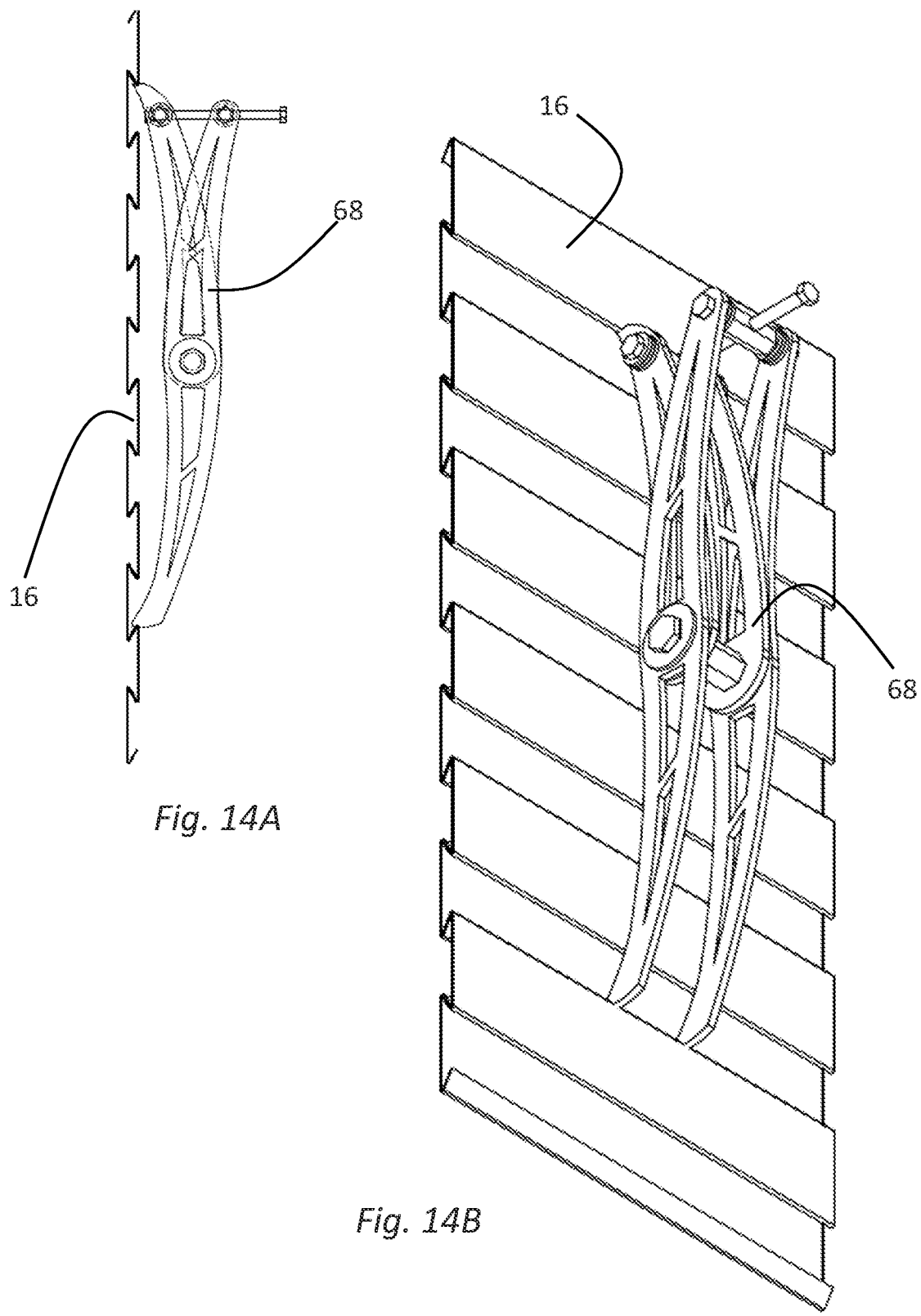
FIG. 14A is a side elevation view of the spreader tool embodiment of FIG. 13A engaged with a display.
FIG. 14B is a perspective view of the spreader tool embodiment of FIG. 13A engaged with a display.

As is best shown on FIGS. 14A and 14B, the ends of the full-length legs 69 and half-length legs 70 include spreader notches 74. In use, the spreader notches may be connected over an upper corner edge 52 and lower corner edge 54 associated with the top and bottom members of several interlinked slat members 10. Thus, when the jackscrew 70 is tightened causing the spreader notches 74 to move away from each other in the fashion of a scissor jack, the upper engagement portions 12 and lower engagement portions 14 of all slat members 10 between the spreader notches 74 are forced into engagement. The spread apart slat members 10 may then be secured to a frame or wall as desired. The assembly tool 68 may then be removed and repositioned during an installation process.

Figure 15A:
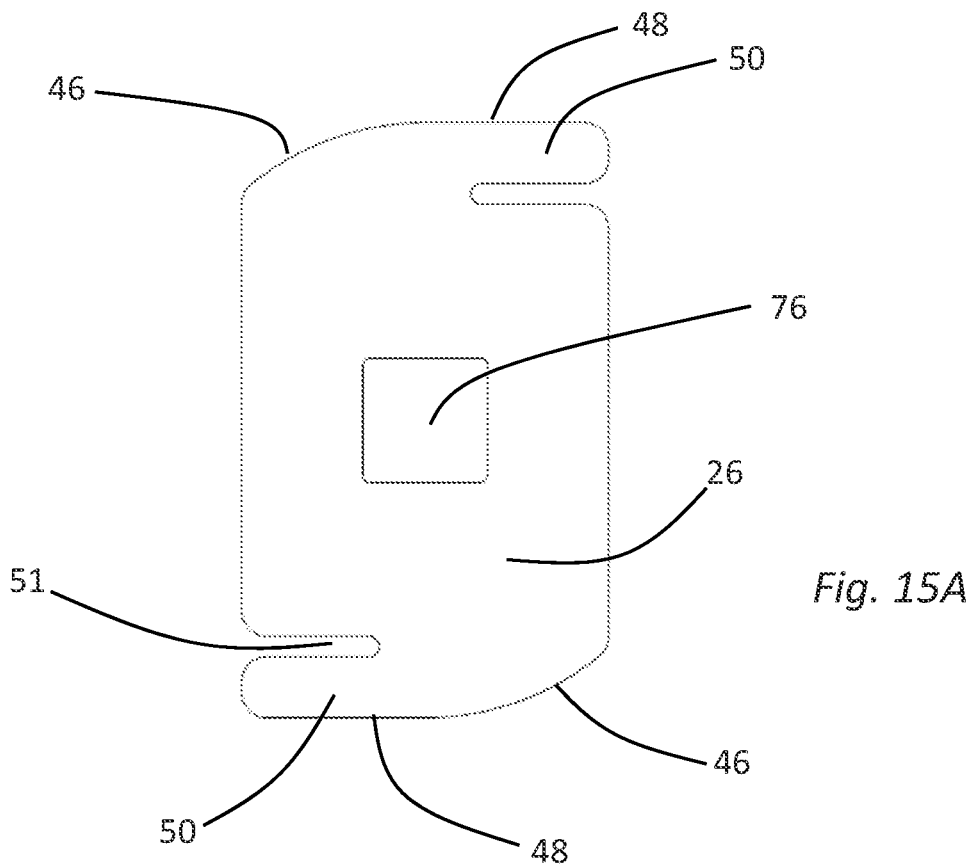
FIG. 15A is a front elevation view of an alternative baseplate embodiment having a socket.

The attachment 22 described above includes a hook 24 extending from the baseplate 26. A wide variety of alternative structures can extend from, or be attached to, a baseplate 26 in various alternative attachment 22 embodiments. Similarly, a baseplate 26 may be formed or provided in various alternative configurations to accomplish specific purposes. For example, FIG. 15A is a plan view of an alternative baseplate 26 having a central opening 76. The central opening 76 can serve as a socket to receive a tool used to rotate the baseplate 26 into an operative position. Alternatively, any type of hook, bolt, rod, extension, or similar structure may be attached to the baseplate 26 at the central opening 76. The illustrated central opening 76 is square, however, alternative central openings 76 may be circular, hexagonal, octagonal, triangular, or have another shape to fulfill a specific purpose.

Figure 15B:
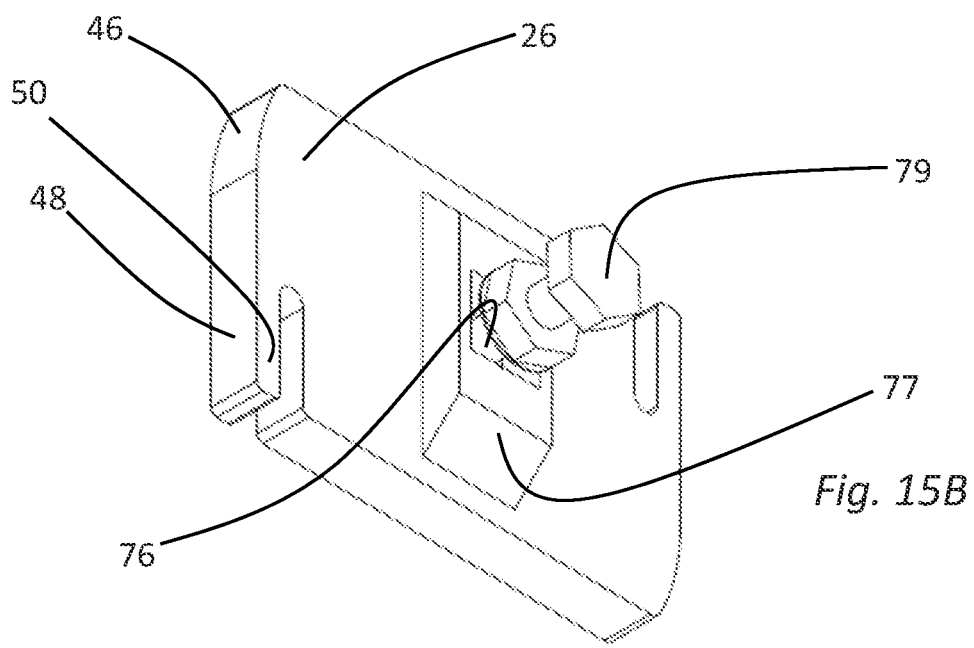
FIG. 15B is a perspective view of an alternative baseplate embodiment having a platform, central socket, and mounting bolt.

The baseplate 26 of FIGS. 15B, 15C and 15D includes a centrally located opening 76, positioned within raised platform 77. Either the raised platform 77 or the opening 76 may be engaged with an appropriate tool to rotate the baseplate 26 into an operative position. The baseplate 26 of FIGS. 15B-D also includes a threaded socket 78 accessible through the opening 76. A bolt 79, screw, threaded rod, or other threaded structure may be attached to the threaded socket to secure an auxiliary structure to the baseplate 26, as described in more detail below.

Figure 15E:
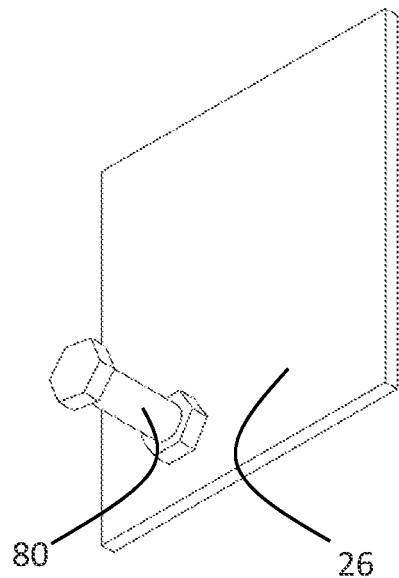
FIG. 15E is a front perspective view of an alternative baseplate embodiment having a locking bolt.
Figure 15F:
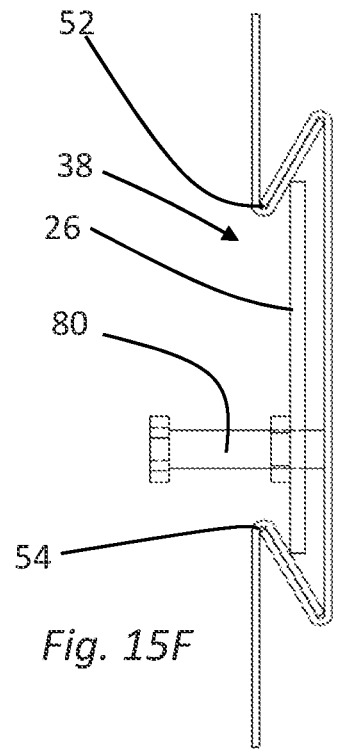
FIG. 15F is a side view of the baseplate embodiment of FIG. 15E engaged with a display.

The baseplate 26 of FIGS. 15E and 15F includes a locking bolt 80 that may be tightened to fully secure the baseplate 26 in an operative position. The baseplate 26 of FIGS. 15E and 15F is not rotated into an operative position, but instead is tipped into an opening 38 in a panel 16 after placing one edge of the baseplate 26 against either the upper or lower baseplate engagement region 40, 42. The baseplate 26 may then be moved toward the center of the opening 38 and secured at or near the upper corner edge 52 and lower corner edge 54 using the locking bolt 80 to force the baseplate 26 forward.

Figure 15G:
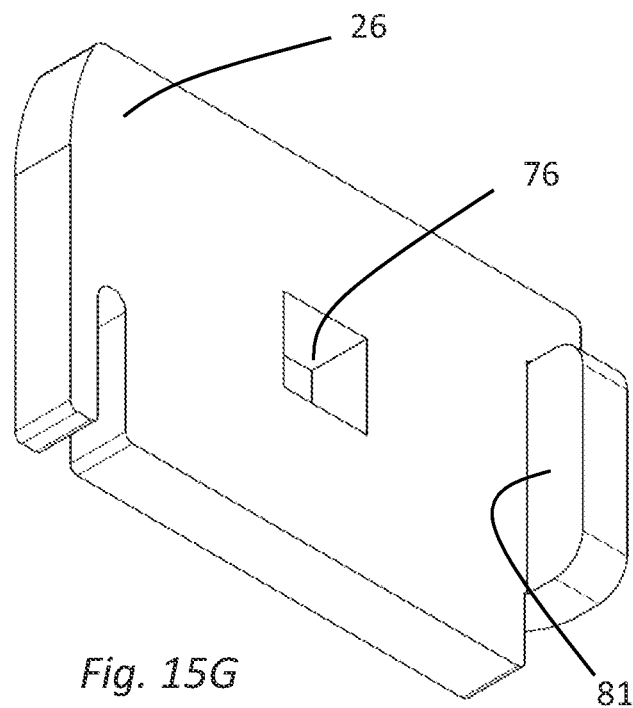
FIG. 15G is a front perspective view of an alternative baseplate embodiment having a central socket and flange.
Figure 16A:
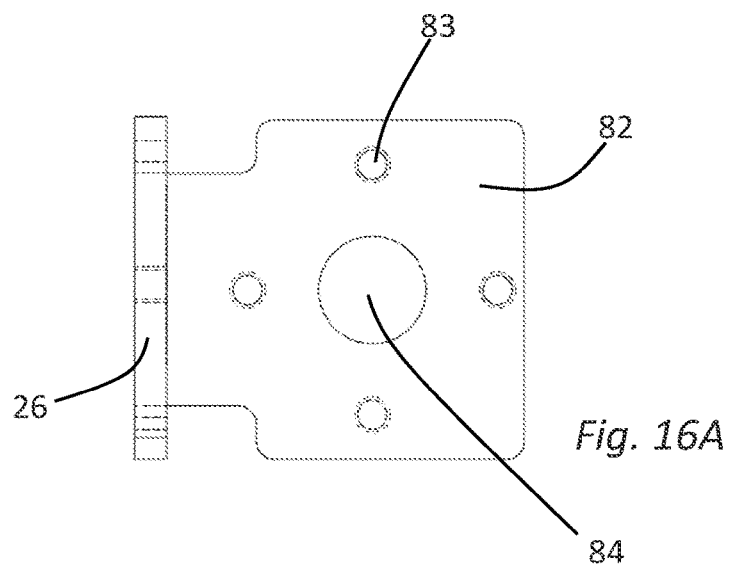
FIG. 16A is a side elevation view of a display attachment including a baseplate and an attachment flange.
Figure 16B:
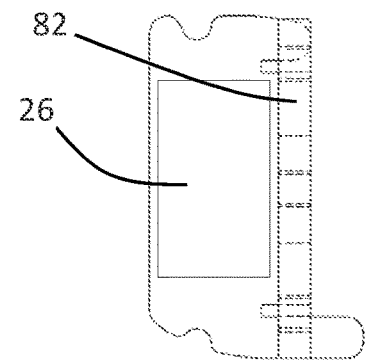
FIG. 16B is a rear elevation view of the display attachment of FIG. 16A.
Figure 16C:
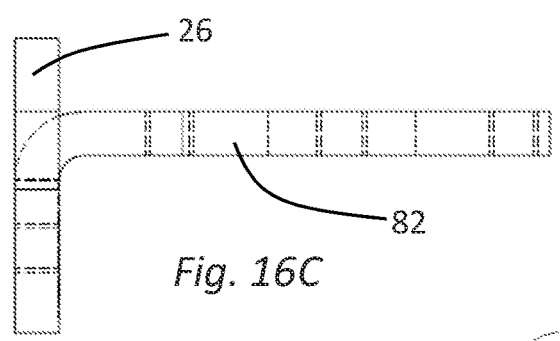
FIG. 16C is a plan view of the display attachment of FIG. 16A
Figure 16D:
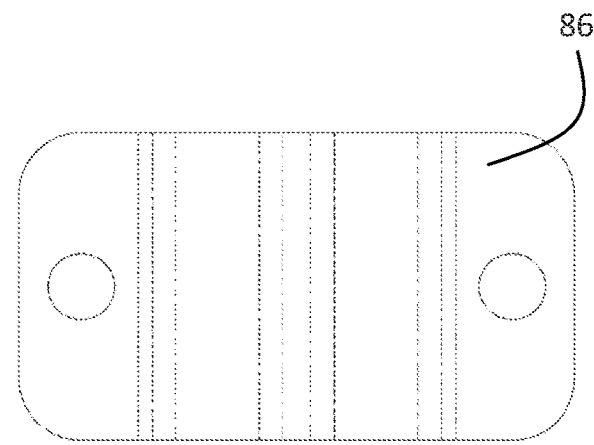
FIG. 16D is a front elevation view of a clamp plate.
Figure 16E:
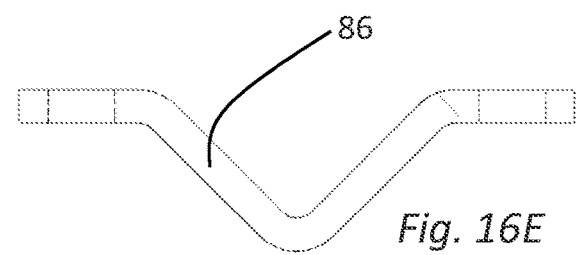
FIG. 16E is a plan view of the clamp plate of FIG. 16D.

The baseplate of FIG. 15G includes a lateral extension 81 to butt up against one of the upper corner edge 52 or lower corner edge 54 when the baseplate is rotated into an operative position.

Figure 17A:
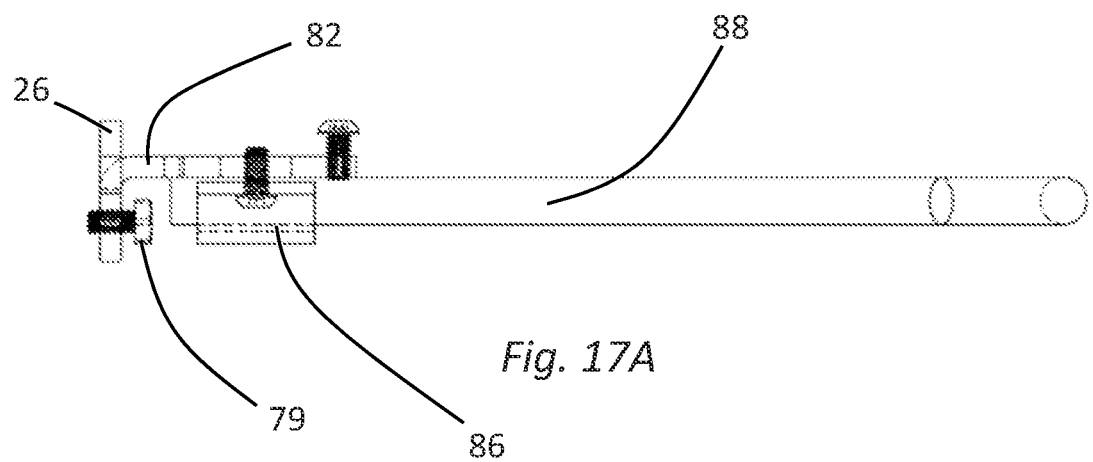
FIG. 17A is a plan view of the display attachment of FIG. 16A and the clamp plate of FIG. 16D securing a hook.
Figure 17B:
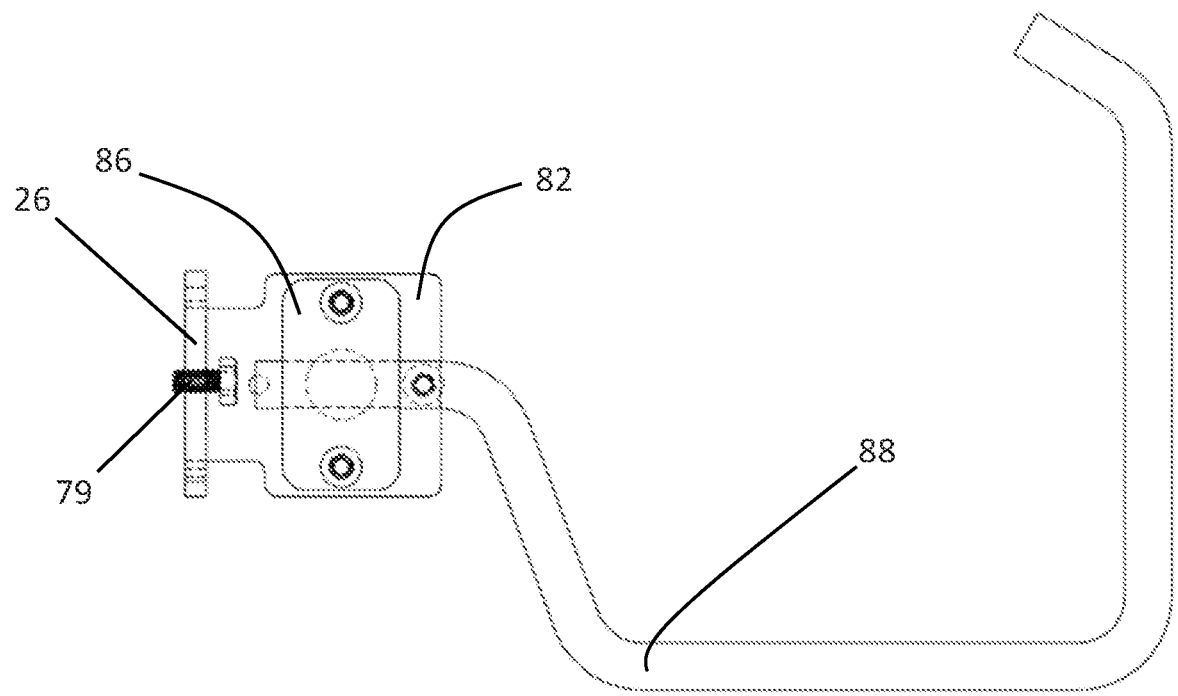
FIG. 17B is a plan side elevation view of the display attachment of FIG. 16A and the clamp plate of FIG. 16D securing a hook.
Figure 18A:
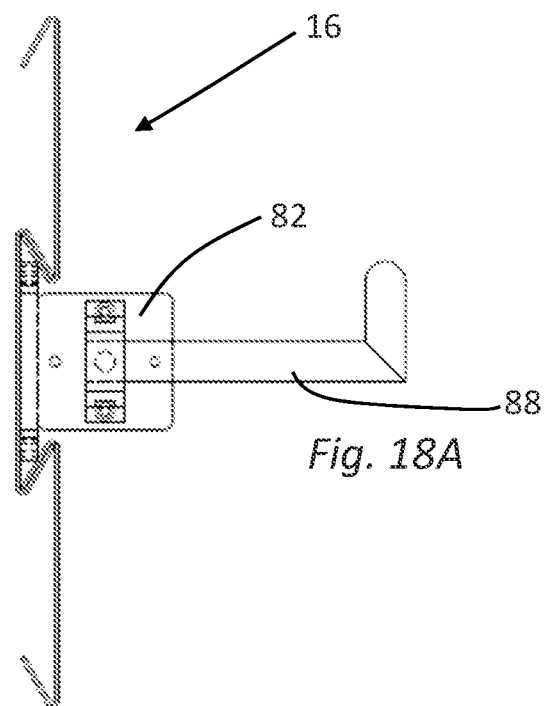
FIG. 18A is side elevation view of an alternative display attachment with flange and hook engaged with a display.
Figure 18B:
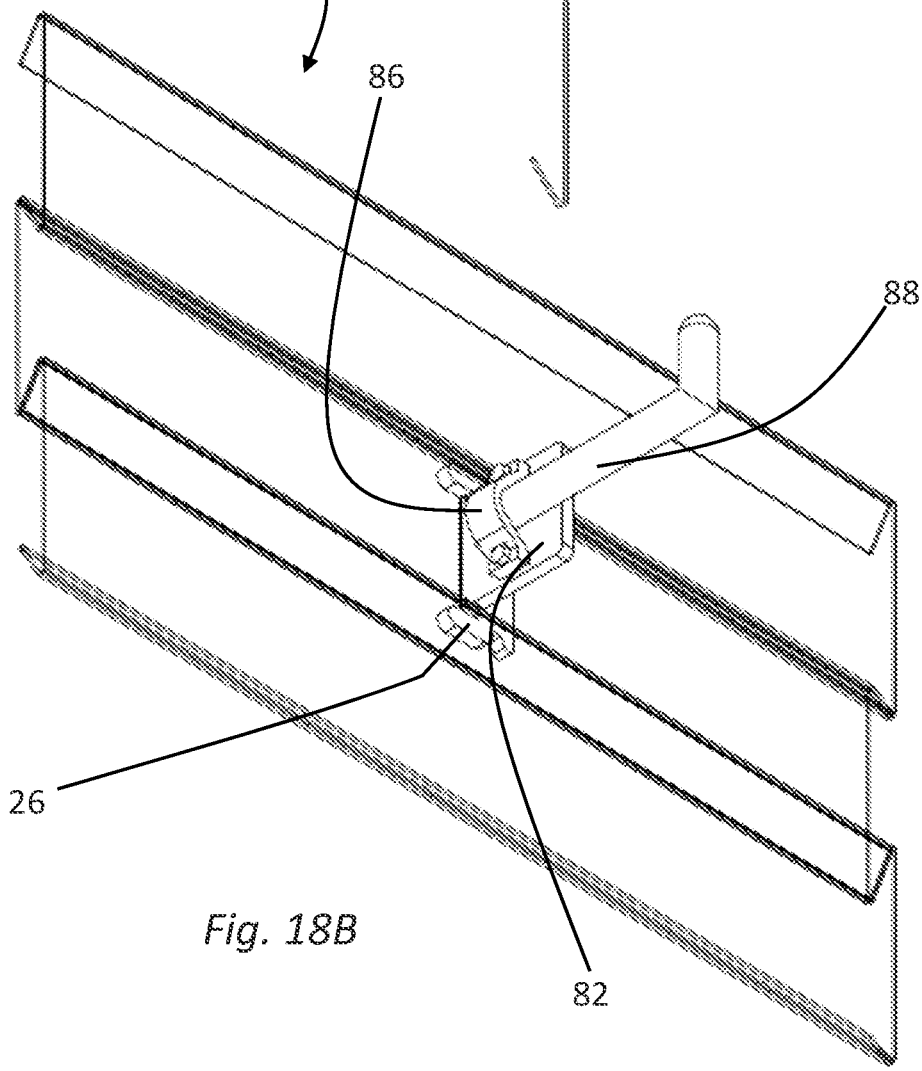
FIG. 18B is a front perspective view of the display attachment with flange and hook of FIG. 18A.
Figure 19A:
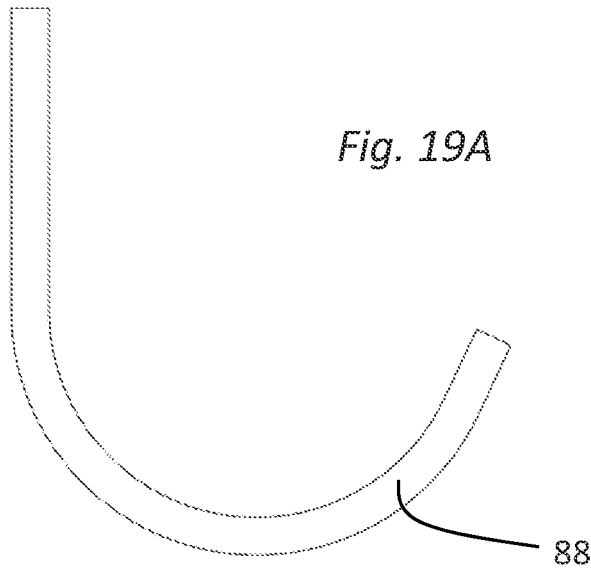
FIG. 19A as a plan view of an alternative hook embodiment.
Figure 19B:
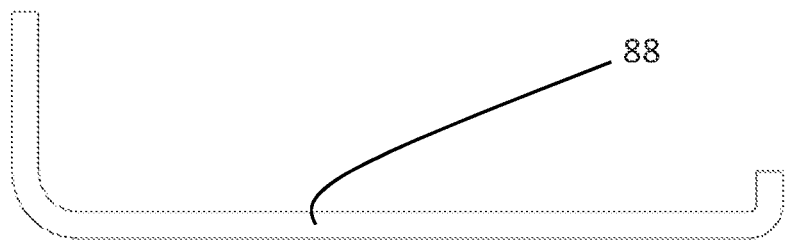
FIG. 19B as a plan view of another alternative hook embodiment.

FIG. 16A-E illustrates an attachment flange 82 extending from a baseplate 26. The attachment flange 82 includes threaded sockets 83 and a central opening 84 for the attachment of various ancillary structures. For example, as illustrated in FIGS. 17 and 18, a clamp plate 86 may be attached to the attachment flange 82 using bolts or screws threaded into one or more threaded sockets 83. The clamp plate 86 may secure a hook 88 having any desired configuration, as shown in FIGS. 17-19.

Figure 20A:
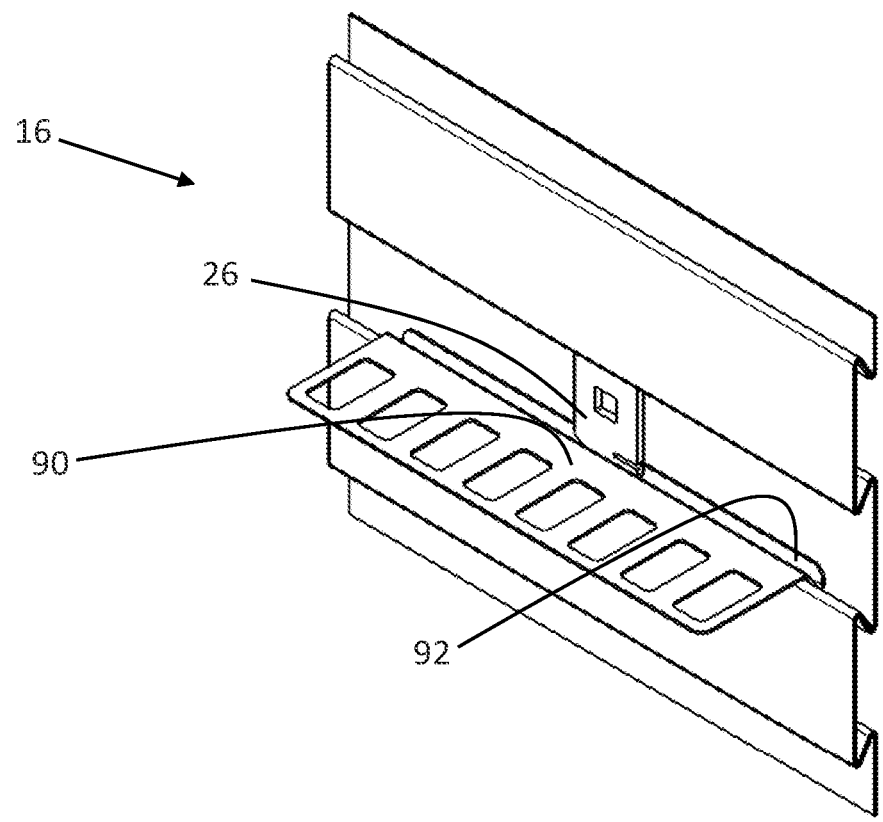
FIG. 20A is a front perspective view of an alternative baseplate securing a tool tray to a display.
Figure 20B:
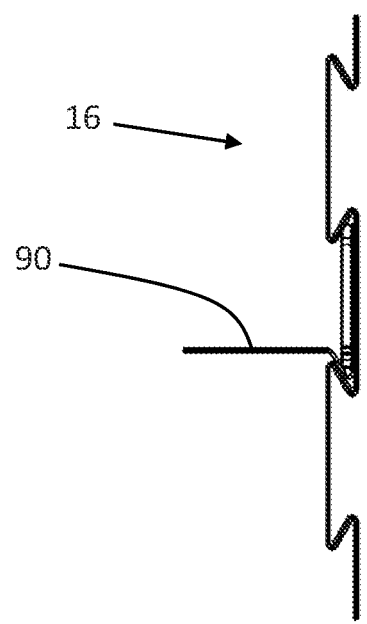
FIG. 20B is a side elevation view of the alternative baseplate securing the tray of FIG. 20A to a display.
Figure 21A:
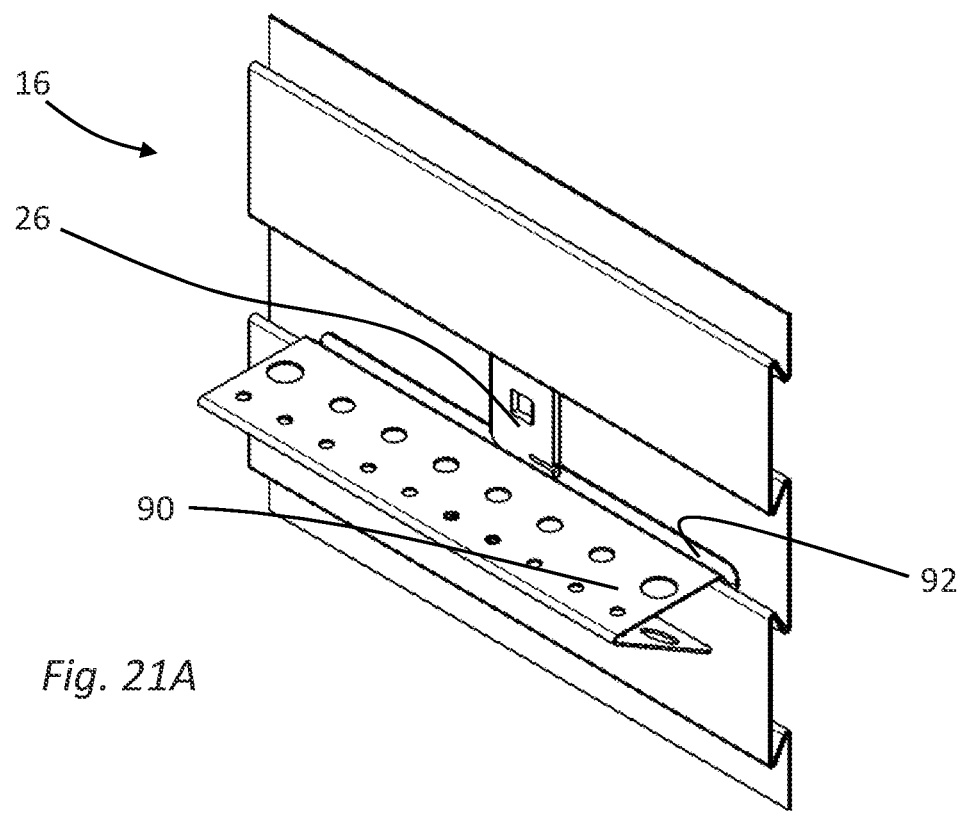
FIG. 21A is a front perspective view of an alternative baseplate securing a tray to a display.
Figure 21B:
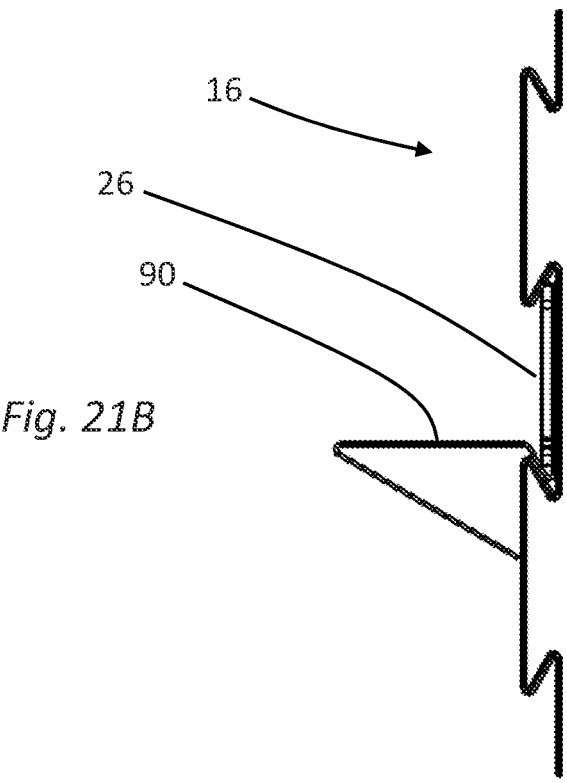
FIG. 21B is a side elevation view of the alternative baseplate securing the tray of FIG. 21A to a display.

FIGS. 20 and 21 illustrate a free-standing baseplate 26 used to secure a separate tray 90 to a display panel 16. The free-standing baseplate 26 may, for example, be the baseplate 26 of FIG. 15A, where the central opening 76 serves as a socket to receive an installation tool used to rotate the baseplate 26 into an operative position. Each tray 90 includes a distal groove 92 that can be operatively positioned over an upper corner edge 52, or reoriented to be supported by a lower corner edge 54. The freestanding baseplate 26 may then be rotated into an operative position between an upper surface of the distal groove 92 and the upper baseplate engagement region 40. In the operative position shown in FIGS. 20 and 21, the baseplate 26 functions to force the upper engagement portion 12 and lower engagement portion 14 at the top of the opening together, as described above, and also forces the engagement portions 12, 14 at the bottom of the opening together, through the distal groove 92. Therefore, the freestanding baseplate 26 of FIGS. 20 and 21 performs all baseplate functions described above, in addition to securing a tray 90 to the display panel 16.

Figure 22A:
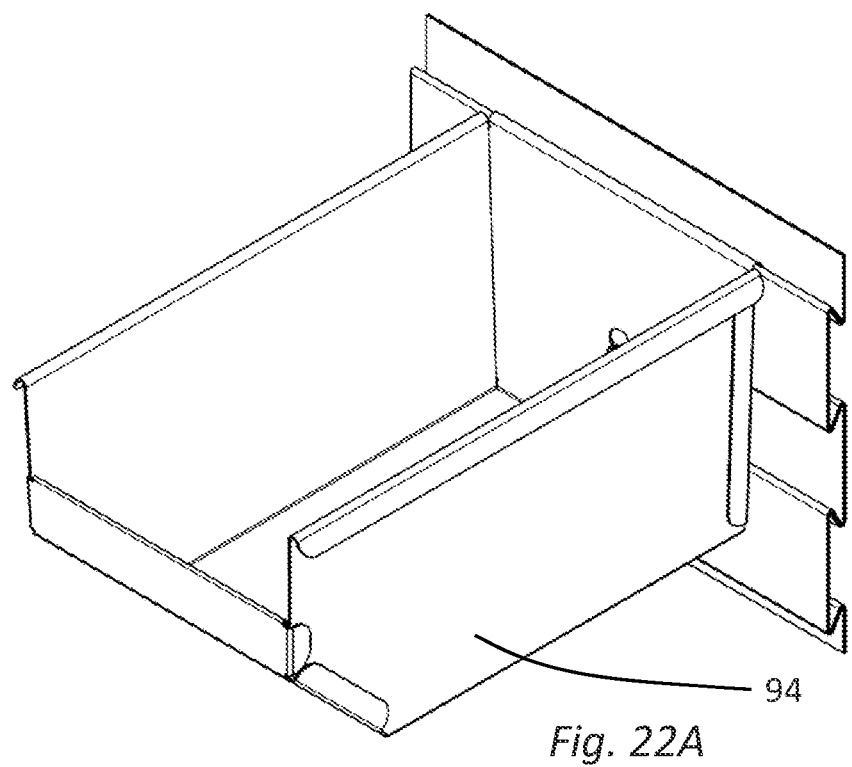
FIG. 22A is a front perspective view of an alternative baseplate securing a bin to a display.
Figure 22B:
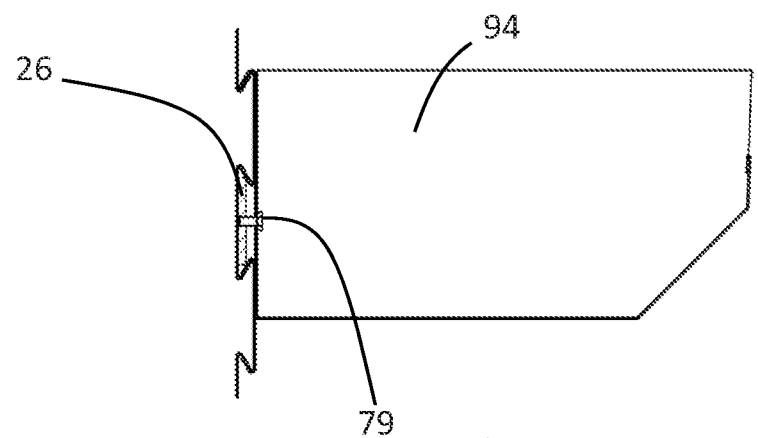
FIG. 22B is a side elevation view of the baseplate securing the bin of FIG. 22A to a display.

FIGS. 22A and 22B illustrate a bin 94 connected to a display panel 16 using the threaded baseplate 26 of FIGS. 15B-15D. In this embodiment, the bin 94 is connected to the threaded baseplate 26 using the bolt 79, a nut, or other fastener. The connection between the bin 94 and the baseplate 26 is stabilized by receipt of the platform 77 within a corresponding opening in the back of the bin 94.

Figure 22C:
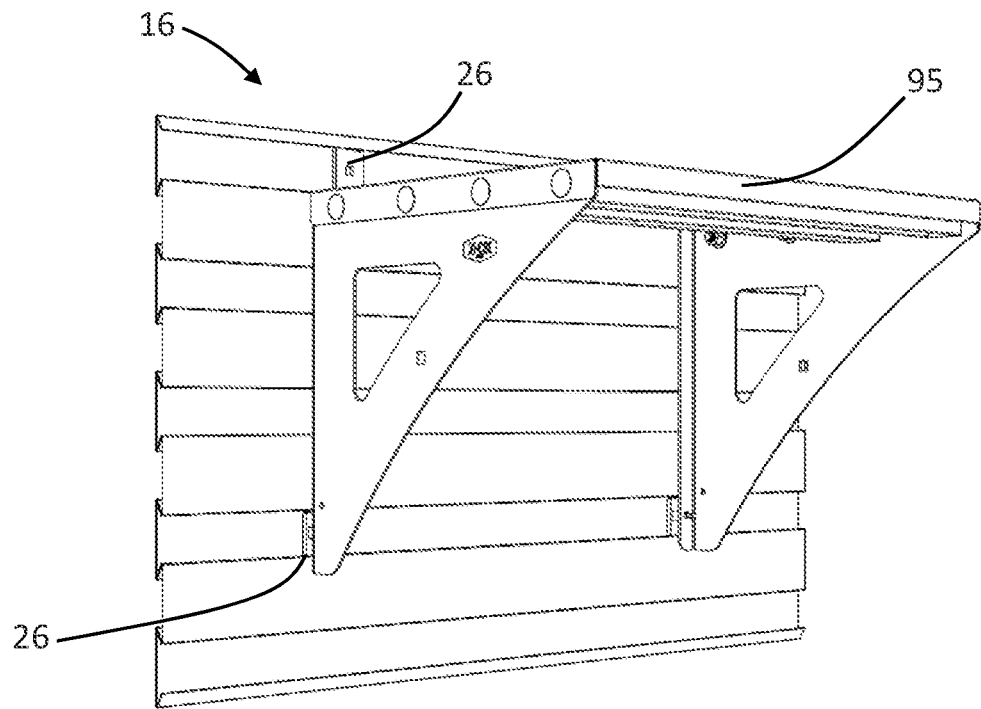
FIG. 22C is a front perspective view of multiple baseplates securing a shelf to a display.
Figure 22D:
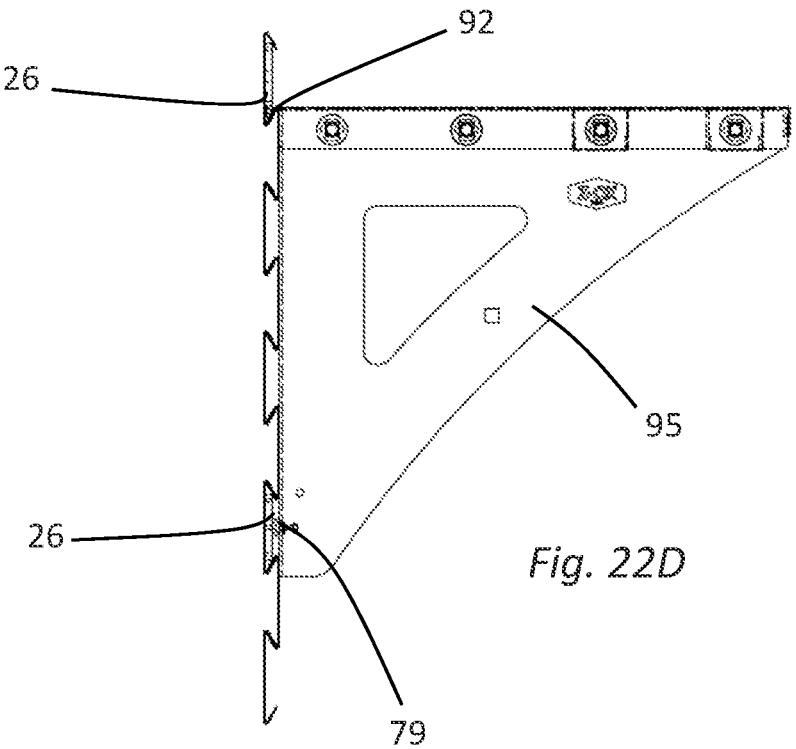
FIG. 22D is a side elevation view of multiple baseplates securing the shelf of FIG. 22C to a display.

Certain larger structures may be held to a display panel 16 with multiple base plates 26. For example, the shelf 95 illustrated in FIGS. 22C and 22D is secured at a top region by one or more freestanding baseplates 26 similar to that shown in FIG. 15A, placed into engagement with a distal groove 92 formed in the shelf 95. In addition, a lower portion of the shelf is attached to the display 16 with a bolt 79 engaged with a baseplate 26 like that shown in FIGS. 15B-15D.

In some embodiments, an attachment 22 does not include a baseplate 26 configured or fabricated as described above. These alternative attachments 22 also serve to add structural integrity to a display panel 16 and/or operate as an assembly tool or ancillary tool. For example, FIG. 23 illustrates an embodiment of spring hook 98 having an integrated base structure. The spring hook 98 can be fabricated from a length of wire, rod or a similar material. The wire used to fabricate a spring hook 98 can be of any suitable metal, plastic, or other suitable material. In one embodiment, the wire used to fabricate a spring hook 98 is a tempered metal such as a steel alloy with spring properties. Each spring hook 98 includes a base portion 102 and a hook portion 104. The base portion further includes one or more engagement segments 106 and at least one clearance segment 108.

The engagement segment 106 and clearance segment 108 of the spring hook 98 function similarly to the clearance portion 46 and engagement portion 48 of the baseplate 26 described above. Thus, the spring hook 98 may be inserted into an opening 38 in a display panel 16, rotated in a forward direction until one or both engagement segments 106 abuts an upper or lower baseplate engagement region 40, 42. The clearance segment 108 of the spring hook 98 can be compressed or flexed when the engagement segments 108 are engaged with one or both of the upper and lower baseplate engagement regions 40, 42. Therefore, the base portion 102 of a spring hook 98 also serves to drive the upper and lower engagement portions 12, 14 of a display panel 16 into tight engagement with each other, when the spring hook 98 is installed. Reverse rotation and removal of a spring hook 98 may be facilitated by further compressing or flexing the clearance segment 108 using the handle 110, permitting disengagement of the clearance segments 108 from the upper and lower engagement regions 40, 42.

Figure 27:
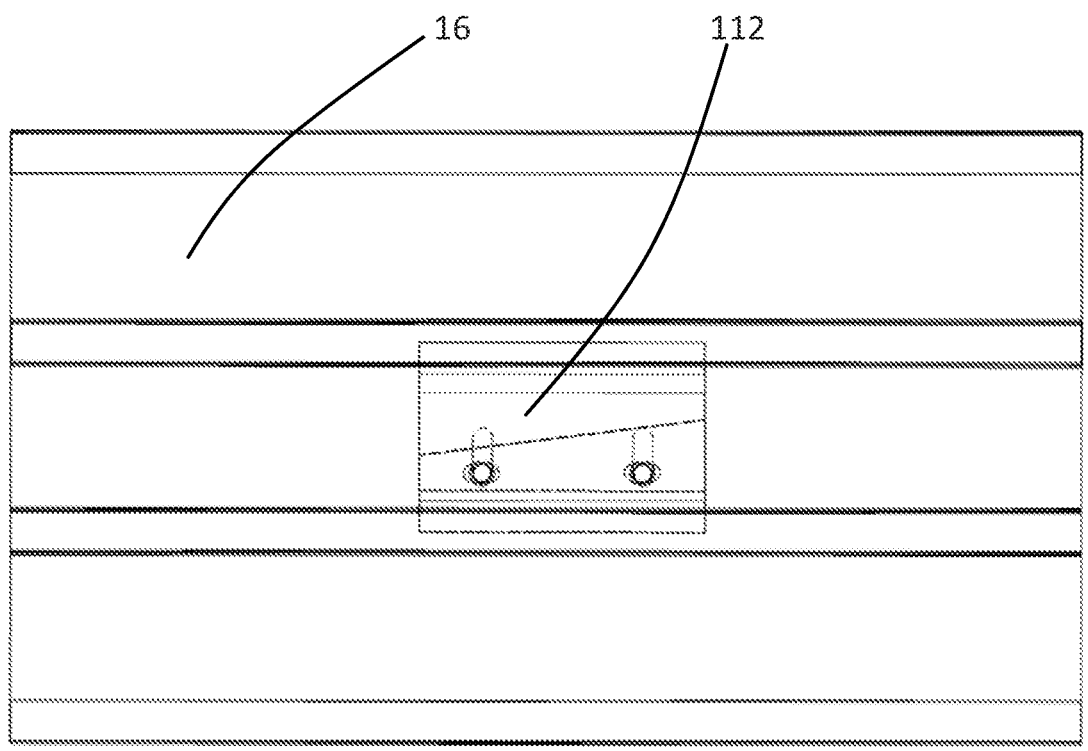
FIG. 27 is a front elevation view of a wedge baseplate engaged with a display.

Additional alternative baseplate structures are illustrated in FIGS. 24-29. The first is a wedge baseplate 112 illustrated in FIGS. 24-27. The wedge baseplate 112 includes a first body portion 114 and a second body portion 116. The first body portion defines a first ramp surface 118, whereas the second body portion defines a corresponding second ramp surface 120. As shown in FIG. 27, the first ramp surface 118 and the second ramp surface 120 are facing each other when the first and second body portions 114, 116 are assembled. The first body portion 114 includes one or more mounting slots 122, which, when the wedge baseplate is assembled, are positioned over corresponding mounting holes 124 in the second body portion 116. The mounting holes 124 may be threaded to receive a bolt, eyebolt, threaded hook 126 as shown in FIG. 24B, or a similar connector received through the mounting slots 122.

The mounting slots 122 permit the first body portion 114 to be displaced laterally with respect to the second body portion 116 over a selected distance defined by the length of the slots 122. The facing ramp surfaces 118, 120 slide across each other, causing the distance between engagement surfaces 128 on each of the first and second body portions 114, 116 to increase or decrease depending upon whether the first body portion 114 is displaced to the left or right. Therefore, the bolt, threaded hook 126, or other connector may be loosened when the wedge baseplate 112 is placed into an opening 38 in a display panel 16. Then, the first body portion may be displaced in the direction causing an increase in the distance between the engagement surfaces 128. When sufficient displacement has occurred to firmly seat the wedge baseplate 112 between the upper and lower based plate engagement regions 40, 42, the bolt or threaded hook 126 may be tightened to lock the wedge baseplate 112 into position. It is important to note that in the locked position, the engagement surfaces 128 are firmly pressed against the upper and lower baseplate engagement regions 40, 42, providing mechanical enhancement to the display panel 16 as described above. Although the embodiment of FIG. 24 shows threaded hooks 126 extending from the wedge baseplate 112, any suitable apparatus, bracket or connector may be attached to the wedge baseplate 112.

Figures 29A, 29B:
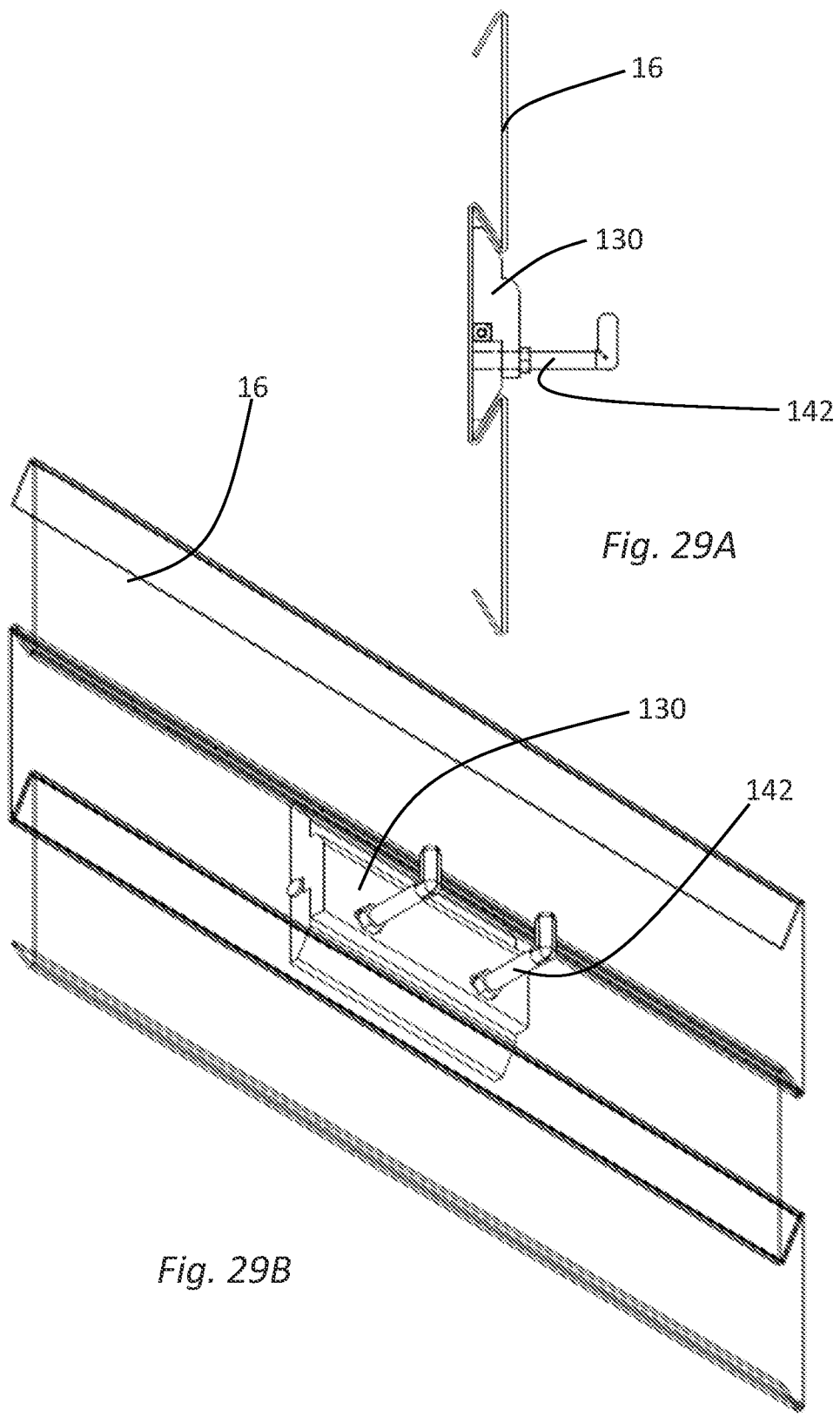
FIG. 29A is a side elevation view of a hinge baseplate engaged with a display.
FIG. 29B is a front perspective view of the hinge baseplate of FIG. 29A engaged with a display.

FIGS. 28-29 illustrate a hinge baseplate 130 including a first hinge portion 132 and a second hinge portion 134 connected with a hinge pin 136. The hinge pin 136 provides a hinged connection between the first and second hinge portions 132, 134 such that the first and second hinge portions 132, 134 may be folded toward each other to facilitate insertion of the hinge baseplate 130 into an opening 38. When the hinge baseplate 130 is positioned within an opening 38, the first and second hinge portions 132, 134 may be folded away from each other, driving the engagement surfaces 138 associated with each of the first and second hinge portions 132, 134 into firm engagement with the upper and lower baseplate engagement regions 40, 42 of a display panel 16. Thus, the hinged baseplate 130 includes engagement surfaces 138 that drive the upper and lower engagement portions 12, 14 of adjacent slat members 10 into firm engagement with each other, providing mechanical enhancement to the display panel 16.

Each of the first and second hinge portions 132, 134 include mounting holes 140. One or both of the mounting holes 140 may be threaded to receive a bolt, screw, threaded hook 142, or another fastener. In one embodiment, the mounting hole 140 associated with the underlying second hinge portion 134 is threaded, while the mounting hole 140 through the first hinge portion is unthreaded and slightly oversized. When the hinge baseplate 130 is flattened into an operative configuration within an opening 38, the first and second hinge portions 132, 134 may be locked into position by inserting a bolt, threaded hook 142, or similar fastener through the mounting hole 140 in the first hinge portion and threading it into secure engagement with the mounting hole 141 in the second hinge portion.

FIGS. 30-33 illustrate various embodiments of clamp brackets 144, 146 that may be attached to a display panel 16. The clamp brackets 144, 146 can serve to support a shelf, bin, drawer or similar apparatus. Alternatively, the clamp brackets 144, may be used to attach a display panel 16 to a structure, such as a wall or another display panel 16, at a selected offset distance. In addition, a clamp bracket 144, 146 may be used as a spreader/assembly tool similar to assembly tools 58 and 68, to aid in panel assembly. The clamp brackets 144, 146 illustrated in FIGS. 30-33 are relatively large and, suitable for attaching a display panel 16 to another structure. Relatively smaller clamp brackets 114, 146 can be used to support a hook, shelf or the like.

Figure 30:
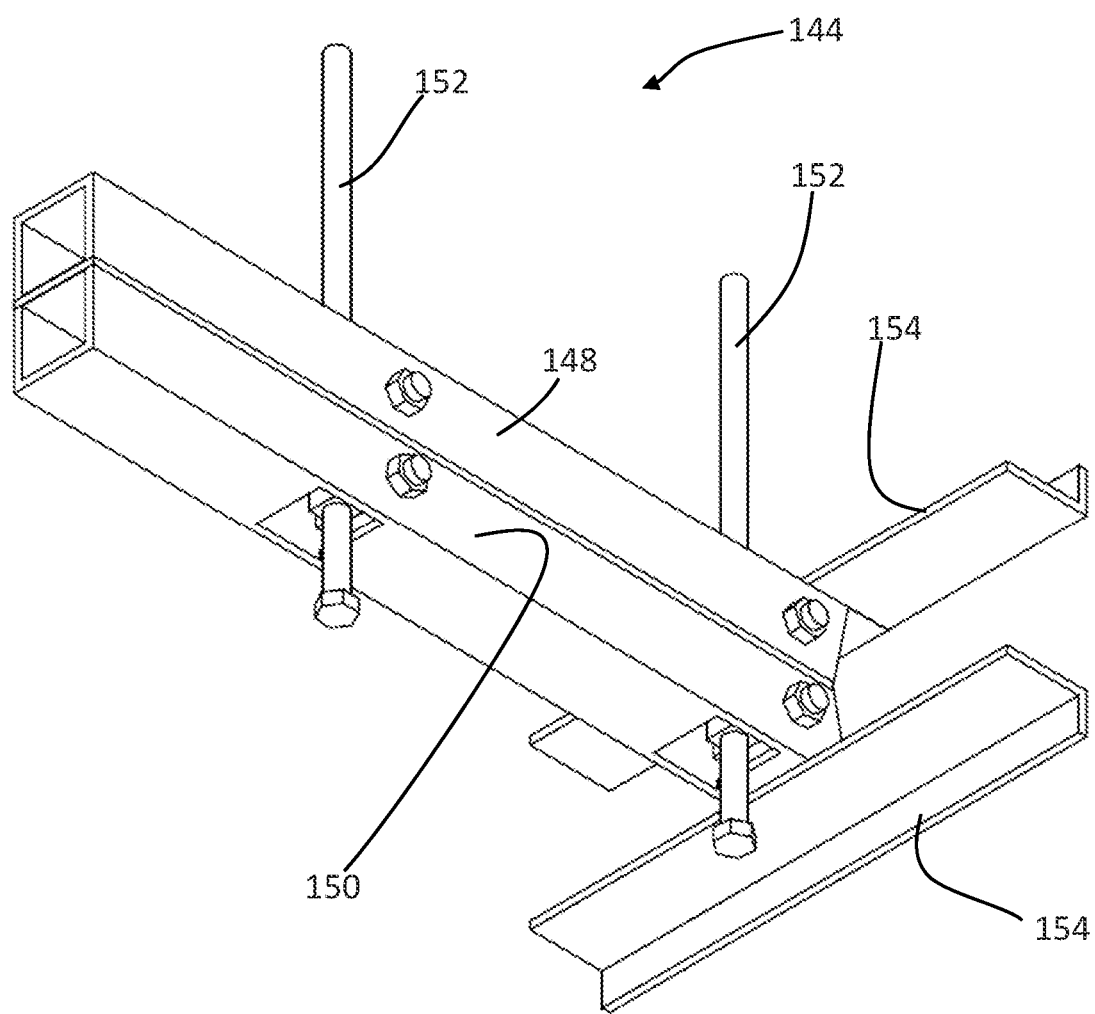
FIG. 30 is a front perspective view of a first embodiment of clamp bracket.

The clamp bracket 144 of FIG. 30 includes a first arm 148 and a second arm 150 connected to each other by transverse bolts 152. Each arm 148, 150 terminates at one or both ends in an internal engagement clip 154. In use, a portion of each internal engagement clip 154 is placed into the opening 38 in a display panel 16. The transverse bolts 152 between the arms 148, 150 are in threaded engagement with a nut or similar structure associated with one of the first and second arms 148, 150. The threaded bolts 152 are also captured, but allowed to freely rotate without threaded engagement, associated with the other of the first and second arms 148, 150. Therefore, rotation of the transverse bolts 152 in one direction drives the first and second arms 148, 150 away from each other while rotation of the transverse bolts 152 in the opposite direction draws the first and second arms 148, 150 together.

Figure 31A:
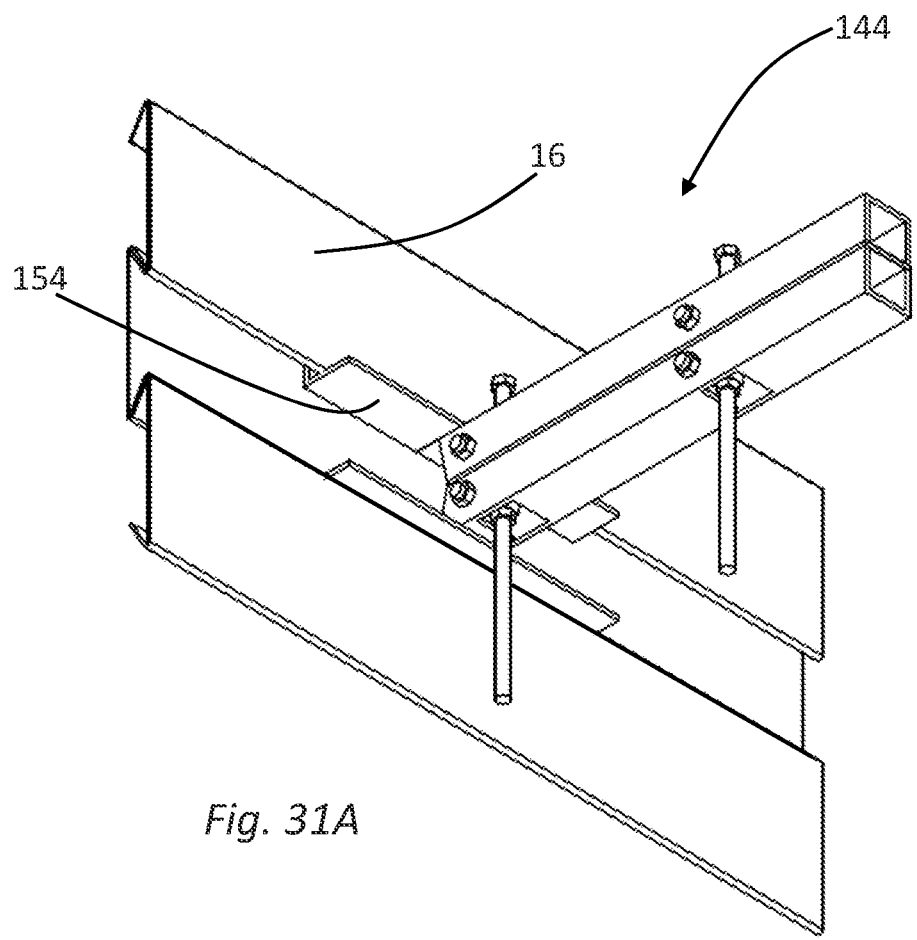
FIG. 31A is a front perspective view of the clamp bracket of FIG. 30 engaged with a display.
Figure 31B:
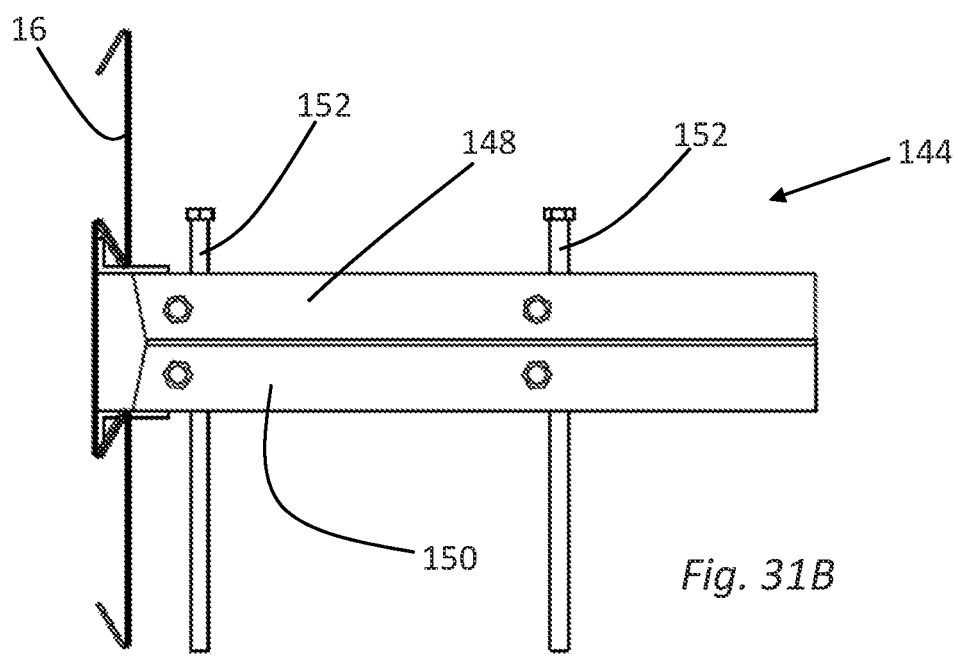
FIG. 31B is a side elevation view of the clamp bracket of FIG. 30 engaged with a display.

As illustrated in FIG. 31, a portion of an internal engagement clip 154 near the attachment to an arm 148, 150 abuts the upper or lower corner 52, 54 at the opening 38 when installed. In addition, a distal tip of each internal engagement clip 154 abuts one of the upper and lower baseplate engagement regions 40, 42. Therefore, when the transverse bolts 152 are rotated to move the first and second arms 148, 150 apart, the engagement clips 154 drive the upper and lower engagement portions 12, 14 of adjacent slat members 10 into tight engagement, thereby providing mechanical enhancement to the display panel 16. The internal engagement clips 154 of the illustrated embodiment contact both the corners 52, 54 and the baseplate engagement regions 40, 42. Alternative embodiments may contact one or the other of these regions on a display panel 16.

Figure 32:
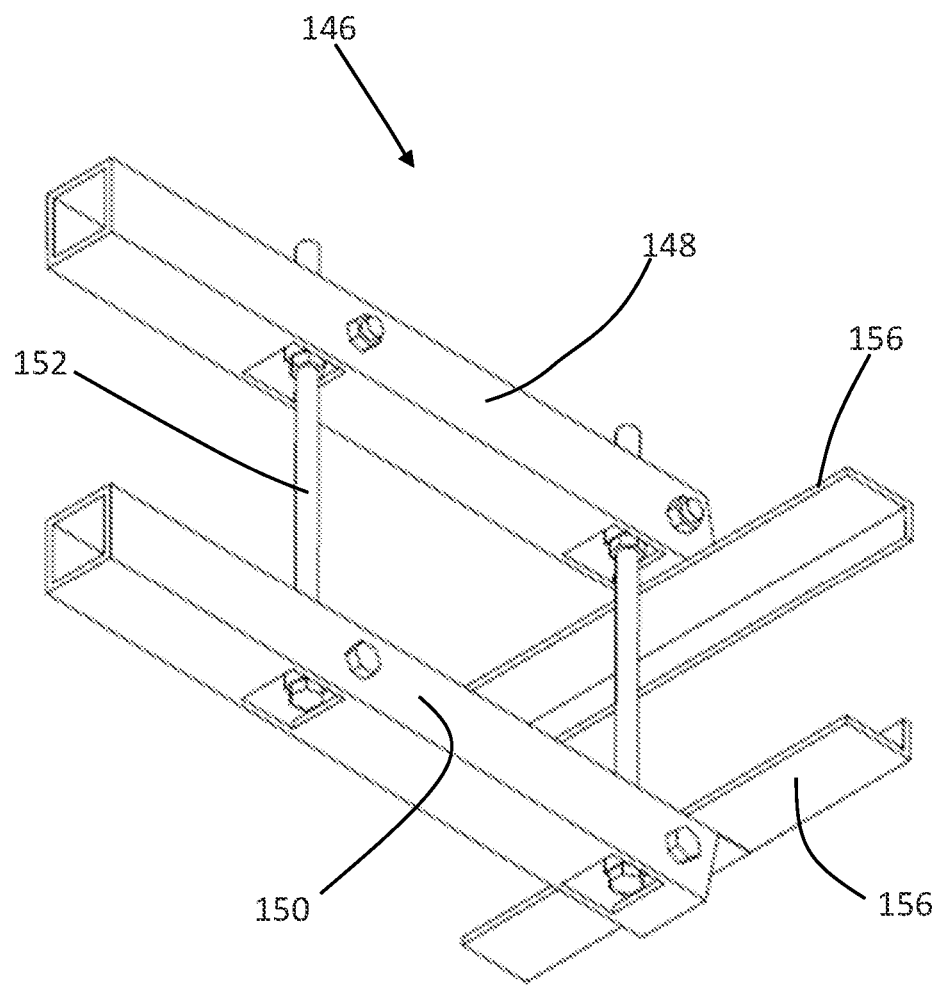
FIG. 32 is a front perspective view of a second embodiment of clamp bracket.
Figure 33A:
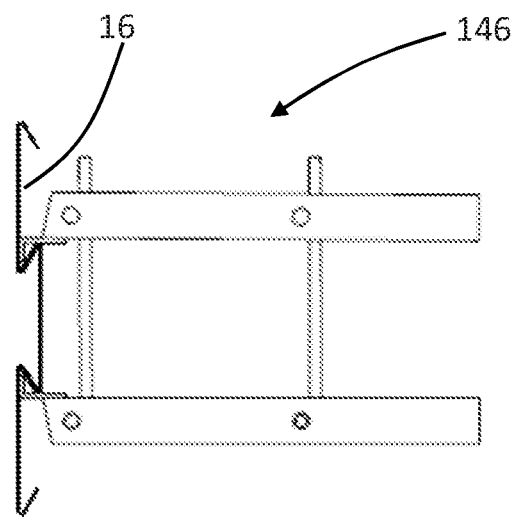
FIG. 33A is a side elevation view of the clamp bracket of FIG. 32 engaged with a display.
Figure 33B:
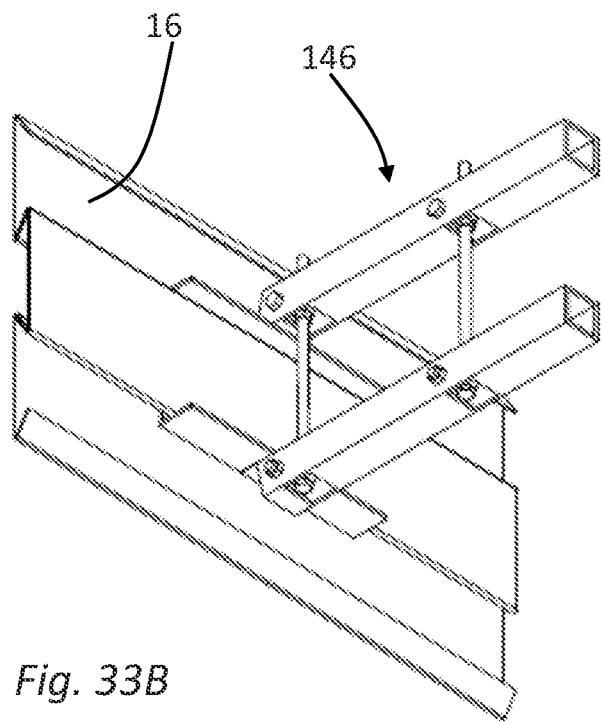
FIG. 33B is a front perspective view of the clamp bracket of FIG. 32 engaged with a display.

The clamp bracket 146 of FIG. 32 operates in a similar fashion, however this embodiment includes external engagement clips 156 which clamp the top and bottom edges of a slat 10, or top and bottom edges of a series of adjacent slats 10.

Figure 34A:
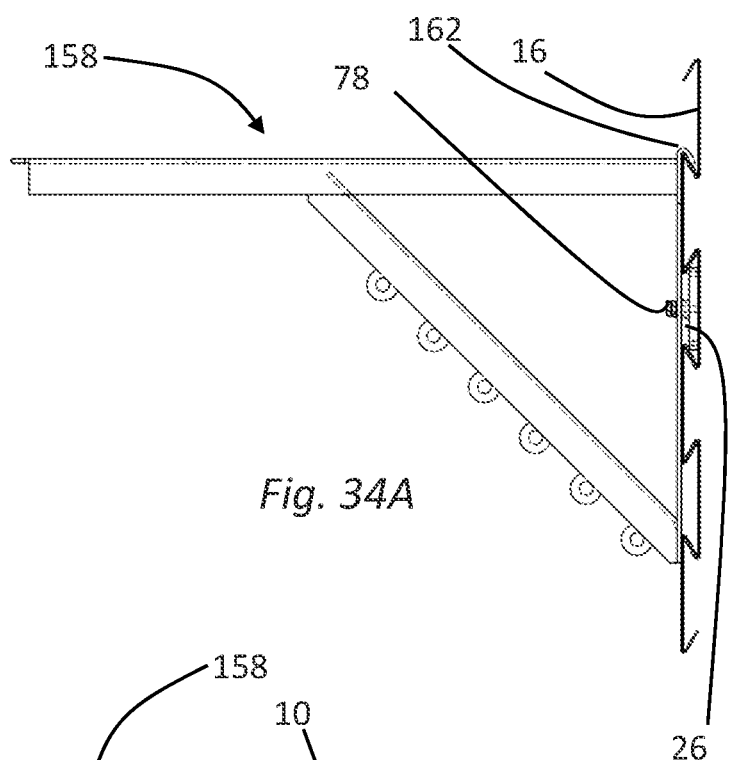
FIG. 34A is a side elevation view of a bracket engaged with the display.
Figure 34B:
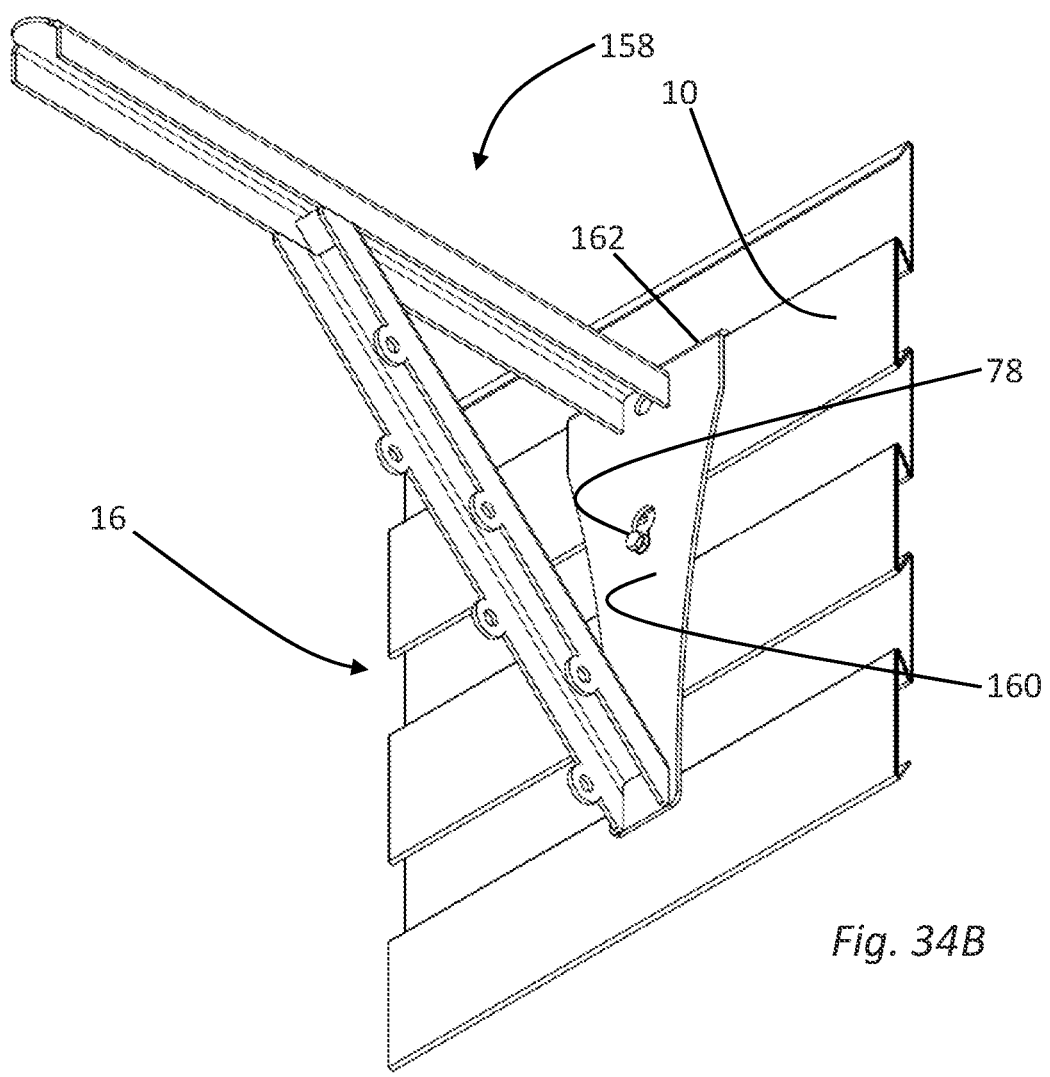
FIG. 34B as a front perspective view of the bracket of FIG. 34A engaged with a display.

FIGS. 34A and B illustrates a bracket 158 that may be mounted to a display panel 16 to support a shelf or similar structure. The bracket 158 includes a backplate 160 with a top hook surface 162 that may be operatively positioned over a selected upper corner edge 52. As illustrated in FIG. 34B, the central and lower portions of the backplate 160 rest, in the operative position, across the front surfaces of one or more slat members 10 below the top hook surface 162. The backplate 160 and therefore the bracket 158 may be secured to a display panel 16 using a freestanding baseplate, for example the baseplate 26 having a threaded insert 77 and bolt 78 as shown in FIG. 15B. Although the backplate 160 of FIG. 34 is shown connected to a bracket, a similar backplate 160 may be connected to any sort of fixture, connection, appliance or the like and attached to a display panel 16.

Figure 35A:
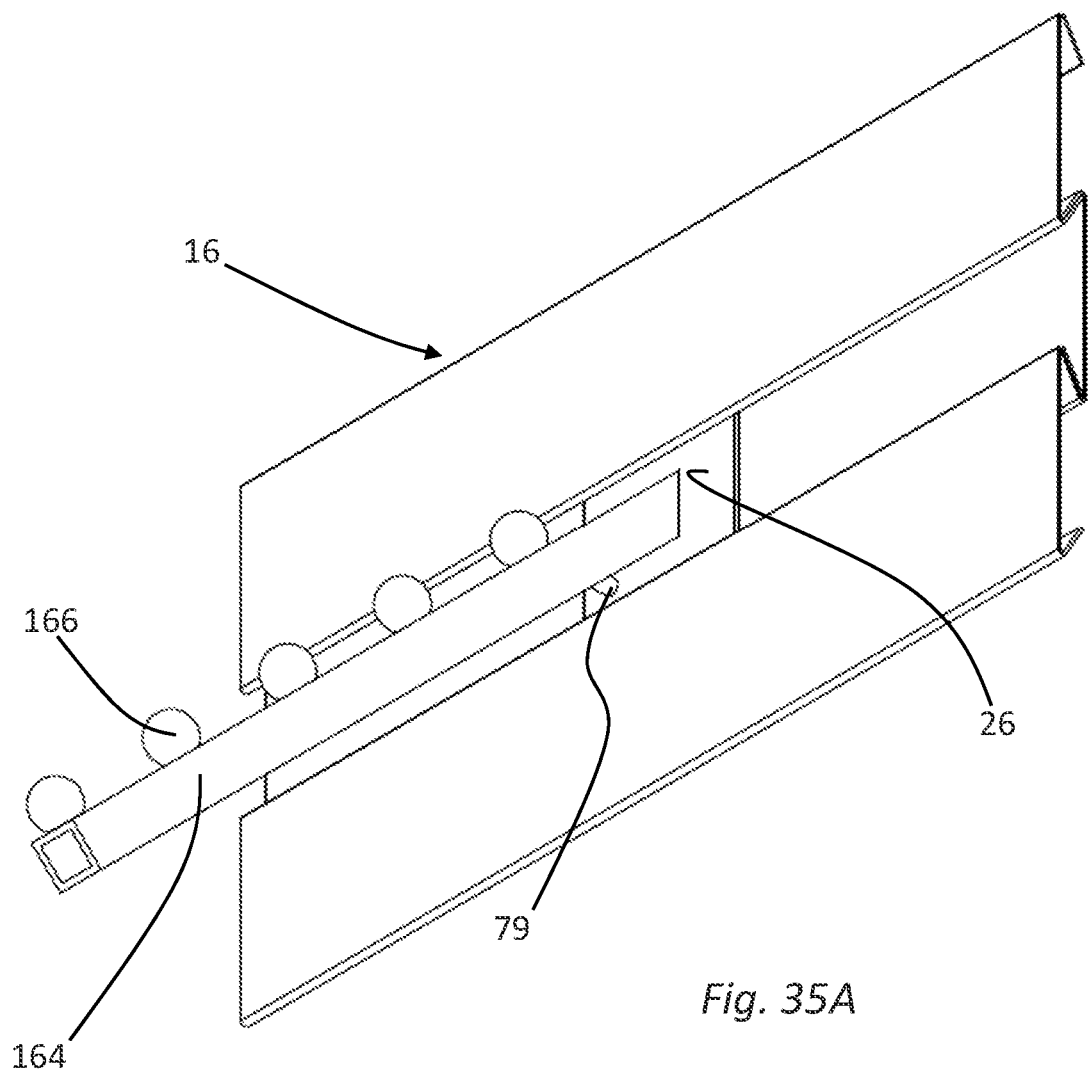
FIG. 35A is a front perspective view of a hanger engaged with a display.
Figure 35B:
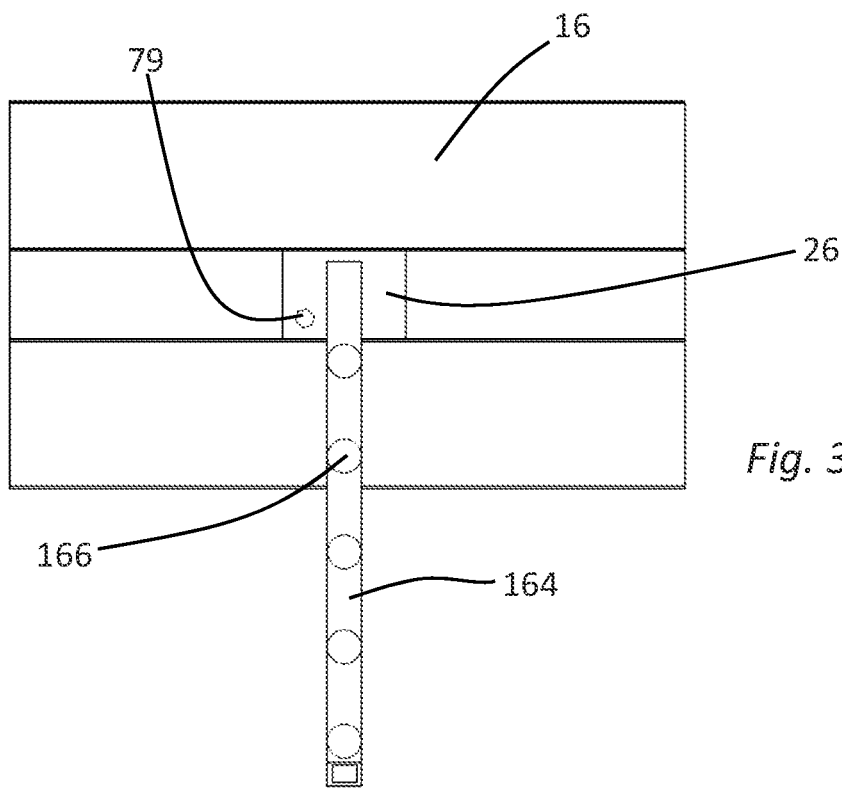
FIG. 35B is a front elevation view of the hanger of FIG. 35A engaged with a display.
Figure 35C:
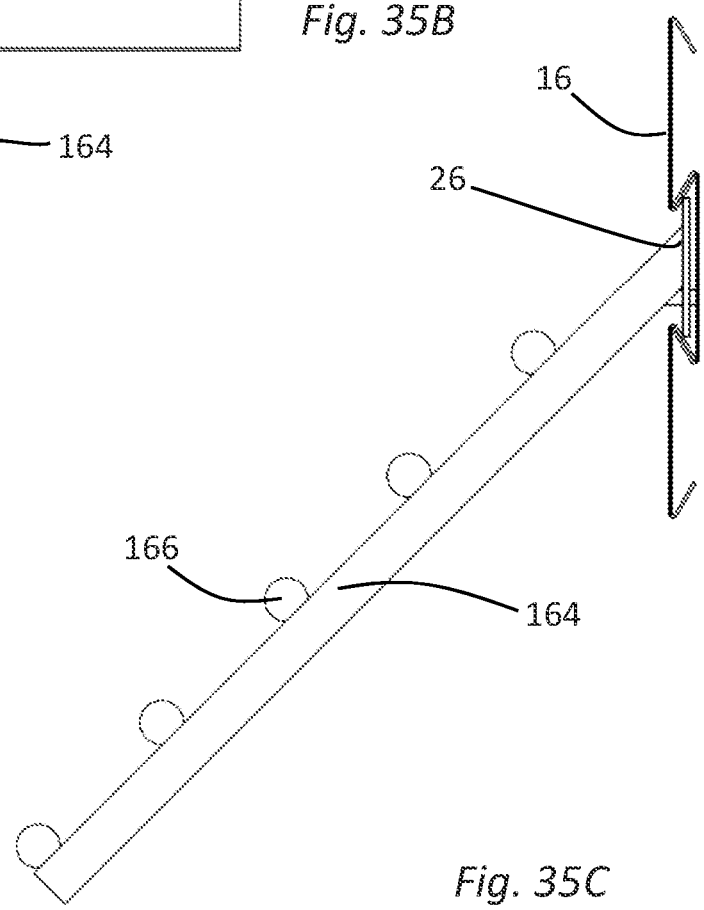
FIG. 35C is a side elevation view of the hanger of FIG. 35A engaged with a display.

FIGS. 35A-C illustrate a hanger rack 164 supported on a display panel 16 by a baseplate 26. The hanger rack 164 includes multiple spherical hanger stops 166 along the length of the hanger rack. The stops 166 serve to support and attractively space clothes hangers, for example in a retail display. Thus, the hanger rack 164 must support a great deal of weight. Accordingly, this type of fixture is well-suited to use with a baseplate 26 having a locking bolt 79 as illustrated in FIG. 15C, to fully secure the baseplate under load. Although the baseplate 26 of FIG. 35 is shown connected to a hanger rack, a similar baseplate 26 may be connected to any sort of fixture, connection, appliance or the like and attached to a display panel 16. The hanger rack 164 could also be secured with alternative styles of baseplate.

Figure 37:
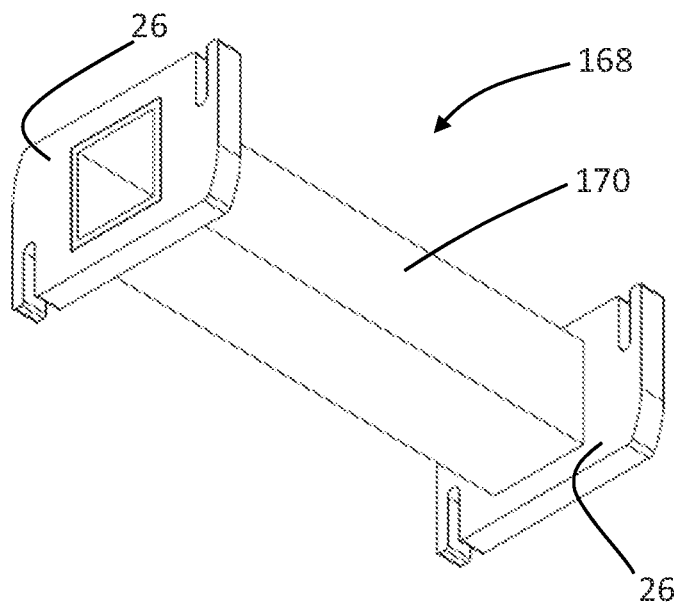
FIG. 37 is a perspective view of one embodiment of connecting rod assembly.
Figure 38:
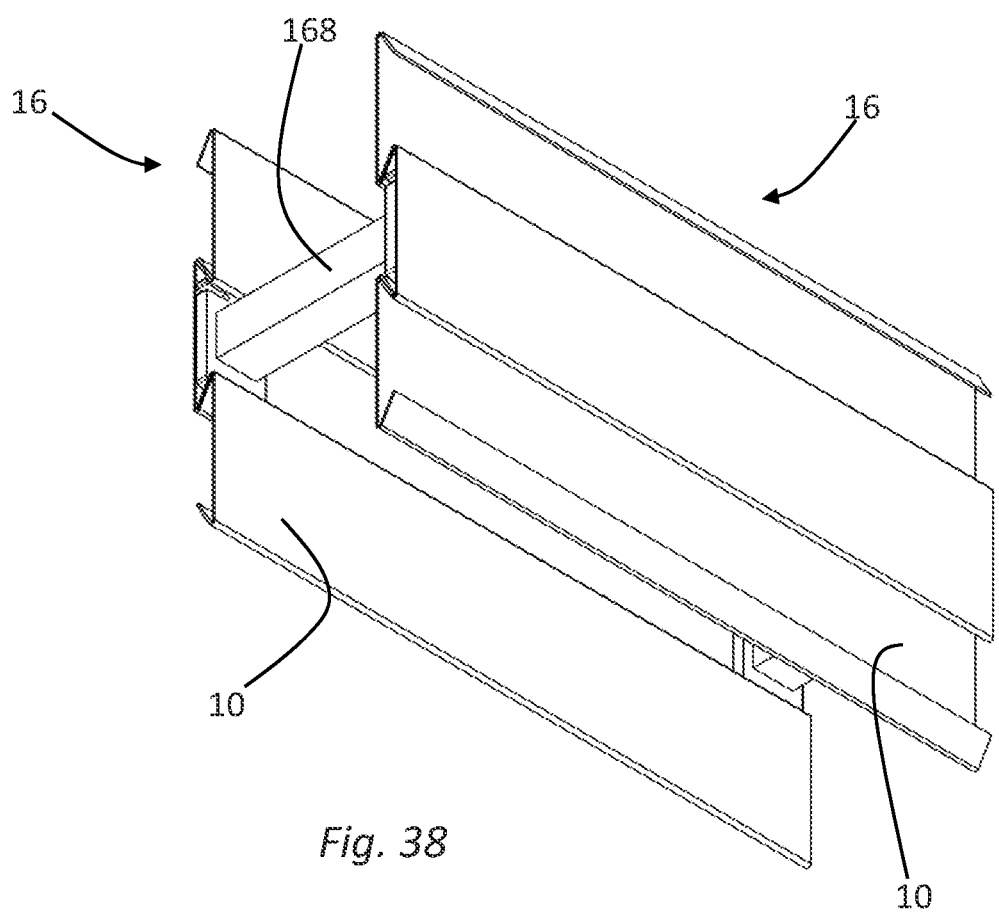
FIG. 38 is a perspective view of the connecting rod assembly of FIG. 37 engaged with two displays.

As noted above, display panels 16 of various sizes and shapes may be assembled into freestanding or partially freestanding structures. FIGS. 37-42 illustrate various types of connecting rod assemblies 168 featuring opposing terminal base plates 26 which may be used to attach one display 16 to another. For example, FIG. 37 illustrates a connecting rod assembly 168 having one baseplate 26 at each end. The base plates 26 may be of any type or style, the illustrated base plates are similar to those of FIG. 15A. The central rod portion 170 of the connecting rod assembly 168 may be any desired length or shape. The base plates 26 of the connecting rod assembly 168 are affixed to the central rod portion 170 such that the engagement portions 48 of each base plate 26 are parallel to each other. Therefore, as shown in FIG. 38, display panels 16 connected with the connecting rod assembly 168 will have slat members 10 that are substantially parallel to each other, in at least one plane. A similar connecting rod assembly may be fabricated to hold slat members at any selected angle with respect to each other.

Figure 39:
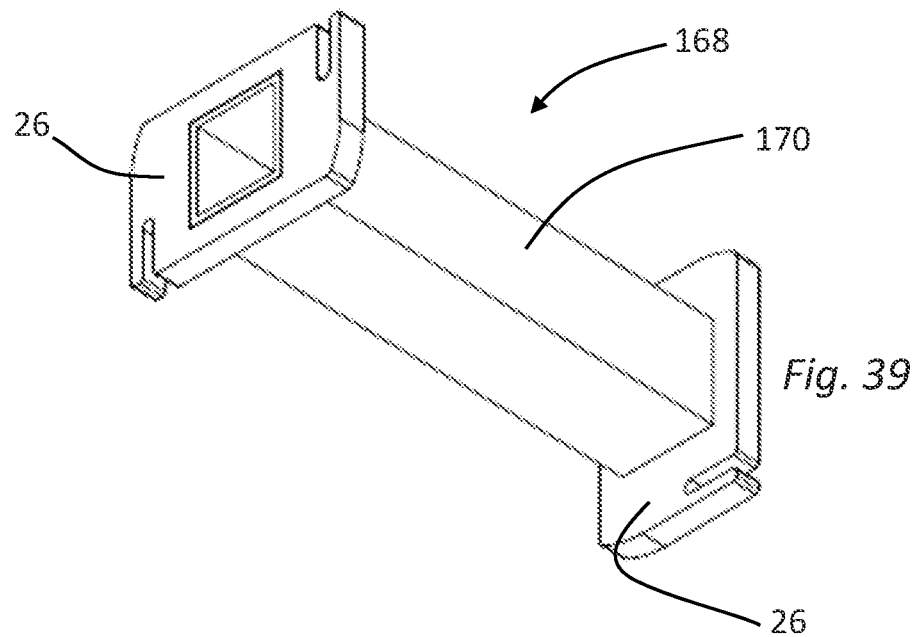
FIG. 39 is a perspective view of an alternative embodiment of connecting rod assembly.
Figure 40:
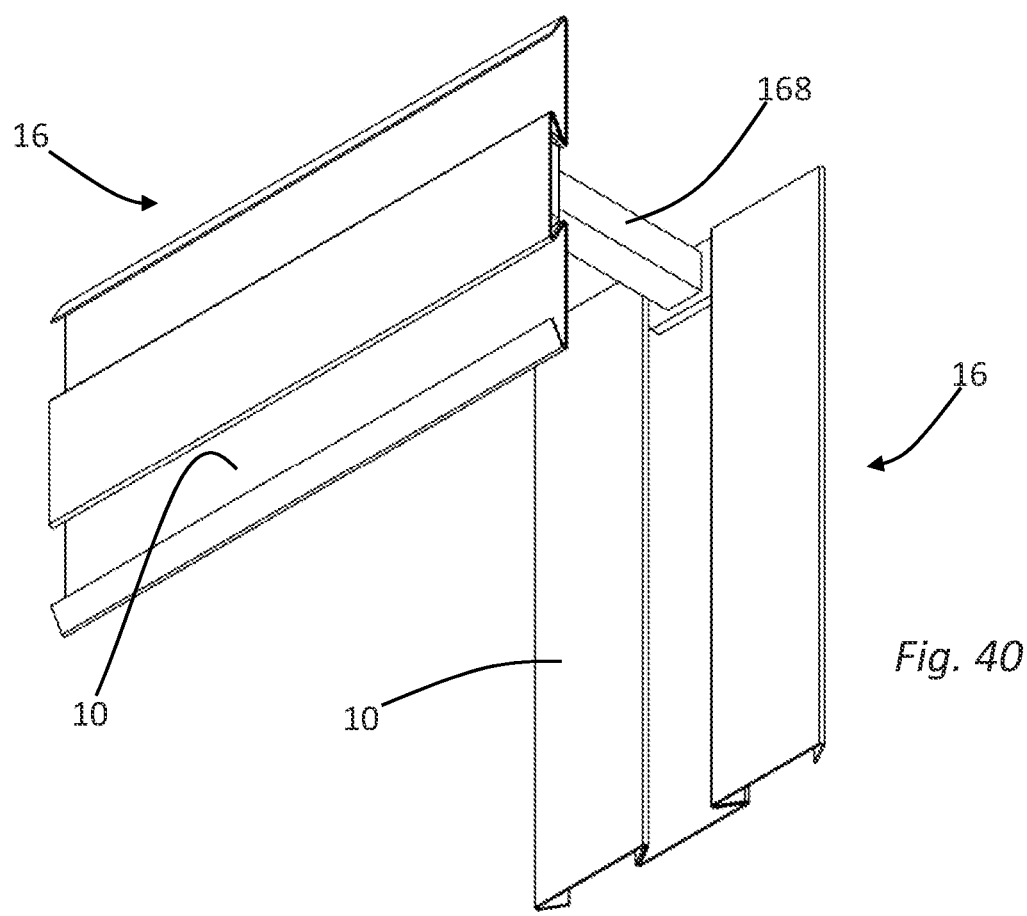
FIG. 40 is a perspective view of the connecting rod assembly of FIG. 40 engaged with two displays.

FIG. 39 illustrates a connecting rod assembly 168 having two base plates 26 with the engagement portion 48 of one baseplate 26 perpendicular to the engagement portion 48 of the other baseplate 26. Thus, as shown in FIG. 40 two display panels 16 connected with this connecting rod assembly 168 will have slat members 10 that are substantially perpendicular to each other after connection.

Figure 41A:
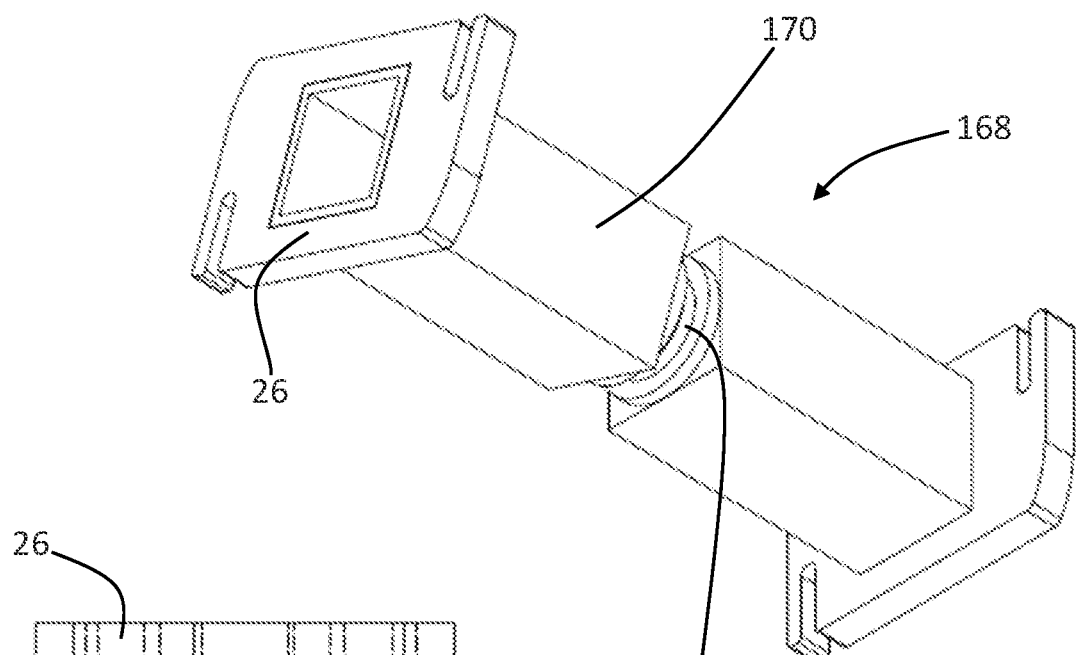
FIG. 41A is a perspective view of another alternative embodiment of connecting rod assembly.
Figure 41B:
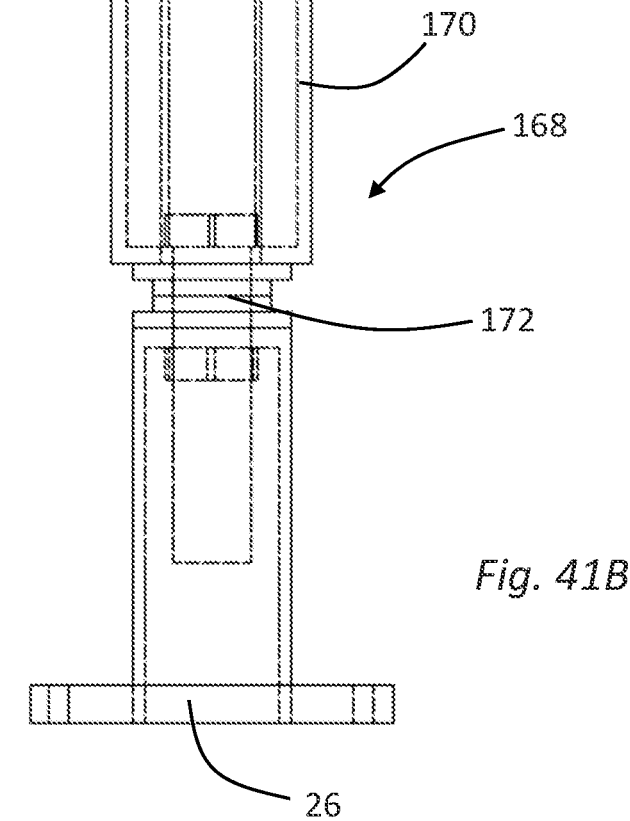
FIG. 41B is a sectioned front elevation view of the alternative connecting rod assembly of FIG. 41A.
Figure 42:
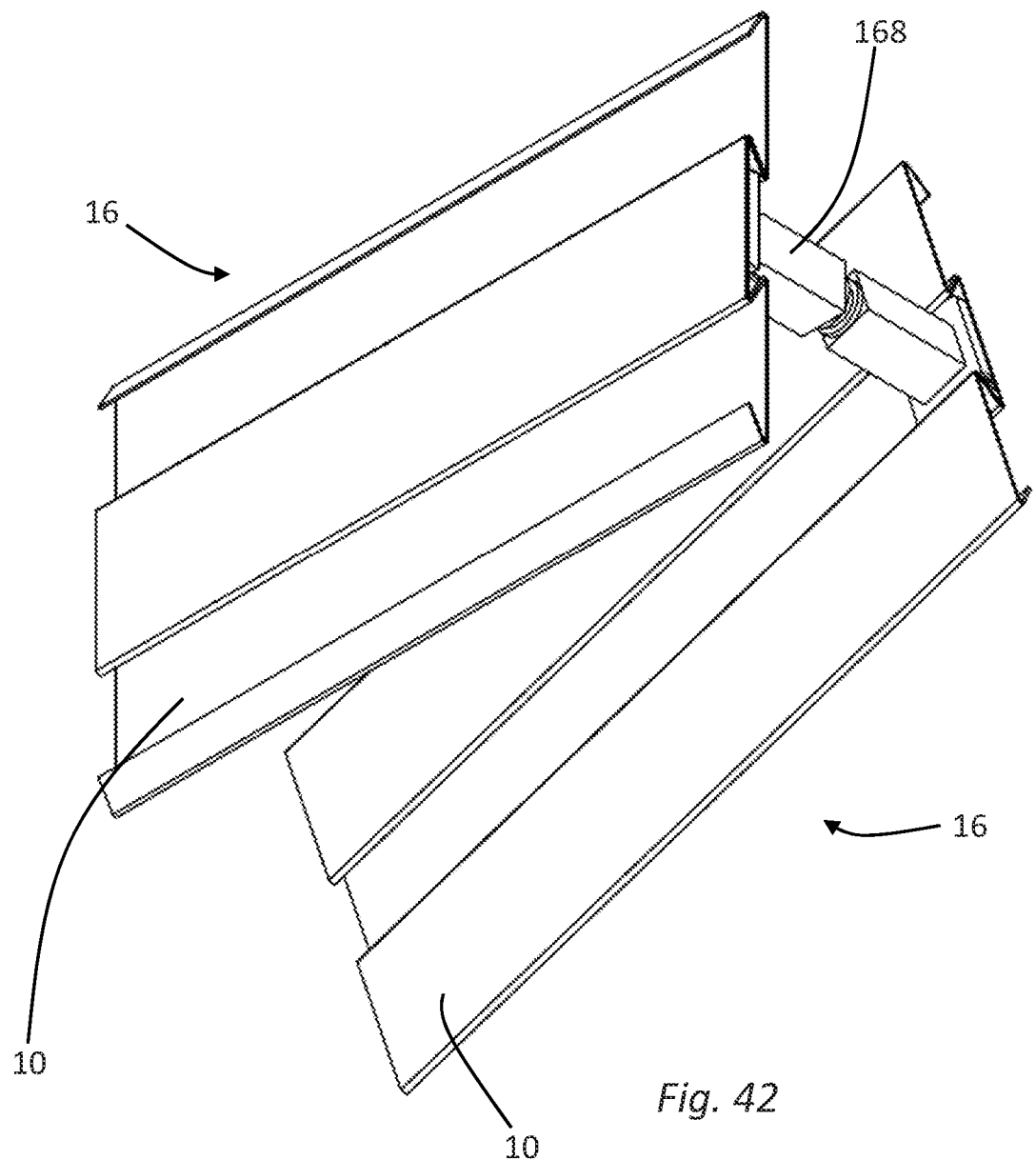
FIG. 42 is a perspective view of the connecting rod assembly of FIG. 41A engaged with two displays.

FIGS. 41A-B illustrate a third embodiment of connecting rod assembly 168. This embodiment includes a central pivot bearing 172 that permits the angular orientation of one baseplate 26 to be selectively rotated with respect to the other baseplate 26. Thus, this embodiment of connecting rod assembly 168 may be used to connect two display panels 16 together with the slat members 10 of each display panel 16 oriented at any desired angle with respect to each other.

Several alternative attachments 22 have been described herein. Alternative disclosed embodiments include systems including slats 10 or display panels 16 with one or more attachments 22. System embodiments may also include hardware, tools and a variety of attachments 22. Other alternative embodiments include methods of assembling slats 10 into display panels 16 using one or more attachments 22 or tools as described herein.

Having described certain exemplary embodiments, it will be understood by those skilled in the art that many changes in construction and widely differing embodiments and applications of the invention will suggest themselves without departing from the scope of the present invention.

Hence, while various embodiments are described with— or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A display panel connecting rod comprising:
   a central rod portion;
   a first terminal baseplate connected to a first end of the central rod portion, the first terminal further configured to couple to a first slatwall panel; and
   a second terminal baseplate connected to a second end of the central rod portion, positioned away from the first end of the central rod portion, the second terminal baseplate further configured to couple to a second slatwall panel;
   wherein the central rod portion comprises a pivot configured to allow the first terminal baseplate to be rotated with respect to the second terminal baseplate, wherein the pivot is configured to allow a first part of the central rod portion to rotate about an axis extending through the central rod portion from the first end to the second end.

2. A display panel connecting rod system comprising:
   a central rod portion;
   a first terminal baseplate connected to a first end of the central rod portion;
   a second terminal baseplate connected to a second end of the central rod portion, positioned away from the first end of the central rod portion;
   a first slatwall display panel engaged with the first terminal baseplate; and
   a second slatwall display panel engaged with the second terminal baseplate;
   wherein the central rod portion comprises a pivot configured to allow the first terminal baseplate to be rotated with respect to the second terminal baseplate, wherein the pivot is configured to allow a first part of the central rod portion to rotate about an axis extending through the central rod portion from the first end to the second end.

3. A method of assembling a display panel system comprising:
   providing a display panel connecting rod comprising;
      a central rod portion;
      a first terminal baseplate connected to a first end of the central rod portion;
      a second terminal baseplate connected to a second end of the central rod portion, positioned away from the first end of the central rod portion;
   engaging a first slatwall display panel with the first terminal baseplate; and
   engaging a second slatwall display panel with the second terminal baseplate;
   wherein the central rod portion comprises a pivot configured to allow the first terminal baseplate to be rotated with respect to the second terminal baseplate, wherein the pivot is configured to allow a first part of the central rod portion to rotate about an axis extending through the central rod portion from the first end to the second end.

4. The display panel connecting rod of claim 1, wherein a plane defined by the first terminal baseplate is parallel to a plane defined by the second terminal baseplate.

5. The display panel connecting rod of claim 1, wherein the plane defined by first terminal baseplate is perpendicular to the plane defined by second terminal baseplate.

6. The display panel connecting rod of claim 1, wherein the pivot is configured to allow the first terminal baseplate to be selectively rotated with respect to the second terminal baseplate.

7. The display panel connecting rod of claim 6, wherein the pivot is in a middle portion of the central rod portion.

8. The display panel connecting rod of claim 1, wherein at least one of the first terminal baseplate or the second terminal baseplate are configured to engage with a slatwall display, wherein at least one of the first terminal baseplate or the second terminal baseplate comprise:
   a front surface;
   a back surface spaced away from the front surface;
   a rotational axis around which at least one of the first terminal baseplate or the second terminal baseplate may be rotated; and
   a perimeter edge between the front and back surfaces.

9. The display panel connecting rod of claim 8, wherein the perimeter edge defines:
   at least one clearance portion configured to provide clearance between the perimeter edge and an engagement region of the slatwall display when at least one of the first terminal baseplate or the second terminal baseplate is rotated in a forward rotational direction around the rotational axis; and
   at least one engagement portion, the at least one engagement portion configured to limit at least one of the first terminal baseplate or the second terminal baseplate from being rotated around the rotational axis in the forward rotational direction, upon engagement of the engagement portion with the engagement region of the slatwall display.

10. The display panel connecting rod of claim 8, wherein the at least one clearance portion is at least two clearance portions, wherein a first clearance portion of the at least two clearance portions is located on a first side of at least one of the first terminal baseplate or the second terminal baseplate and a second clearance portion of the at least two clearance portions is located on a second side of at least one of the first terminal baseplate or the second terminal baseplate opposite the first side of at least one of the first terminal baseplate or the second terminal baseplate.

11. The display panel connecting rod of claim 8, wherein at least one of the first terminal baseplate or the second terminal baseplate comprises one or more spreader notches defined by the perimeter edge.

12. The display panel connecting rod system of claim 2, wherein a plane defined by the first terminal baseplate is parallel to a plane defined by the second terminal baseplate, wherein the first slatwall display panel is parallel to the second slatwall display panel.

13. The display panel connecting rod system of claim 2, wherein the plane defined by the first terminal baseplate is perpendicular to the plane defined by the second terminal baseplate, wherein the first slatwall display panel is perpendicular to the second slatwall display panel.

14. The display panel connecting rod system of claim 2, wherein the pivot is configured to allow the first terminal baseplate to be selectively rotated with respect to the second terminal baseplate.

15. The display panel connecting rod system of claim 14, wherein the pivot is in a middle portion of the central rod portion.

16. The display panel connecting rod system of claim 14, wherein the pivot comprises a bearing.

17. The display panel connecting rod system of claim 2, wherein the first slatwall display panel and the second slatwall display panel each comprise:
 a first slat;
 a second slat removably connected to the first slat and engaged with a corresponding baseplate of the first terminal baseplate or the second terminal baseplate;
 a third slat removably connected to the second slat;
 a first engagement region defined by the interconnected first and second slats; and
 a second engagement region defined by the interconnected second and third slats.

18. The display panel connecting rod system of claim 17, wherein at least one of the first terminal baseplate or the second terminal baseplate comprise:
 a front surface;
 a back surface spaced away from the front surface;
 a rotational axis around which at least one of the first terminal baseplate or the second terminal baseplate may be rotated; and
 a perimeter edge between the front and back surfaces.

19. The display panel connecting rod system of claim 18, wherein the perimeter edge defines:
 at least one clearance portion configured to provide clearance between the perimeter edge and the first engagement region when at least one of the first terminal baseplate or the second terminal baseplate is rotated in a forward rotational direction around the rotational axis; and
 at least one engagement portion, the at least one engagement portion configured to limit at least one of the first terminal baseplate or the second terminal baseplate from being rotated around the rotational axis in the forward rotational direction, upon engagement of the engagement portion with the first engagement region.

20. The method of claim 3, wherein the central rod portion further comprises a pivot point configured to allow the first terminal baseplate to be selectively rotated with respect to the second terminal baseplate, the method further comprising:
 rotating, about the pivot point, the first terminal baseplate relative to the second terminal baseplate.

\* \* \* \* \*